US010018492B2

(12) United States Patent
Morino et al.

(10) Patent No.: US 10,018,492 B2
(45) Date of Patent: Jul. 10, 2018

(54) THERMAL FLOW METER WITH DRAINAGE PASSAGE AT INLET OF BYPASS PASSAGE

(71) Applicant: Hitachi Automotive Systems, Ltd., Hitachinaka-shi, Ibaraki (JP)

(72) Inventors: Takeshi Morino, Hitachinaka (JP); Shinobu Tashiro, Hitachinaka (JP); Noboru Tokuyasu, Hitachinaka (JP); Keiji Hanzawa, Hitachinaka (JP); Atsushi Inoue, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 436 days.

(21) Appl. No.: 14/407,520

(22) PCT Filed: May 15, 2013

(86) PCT No.: PCT/JP2013/063478
§ 371 (c)(1),
(2) Date: Dec. 12, 2014

(87) PCT Pub. No.: WO2013/187169
PCT Pub. Date: Dec. 19, 2013

(65) Prior Publication Data
US 2015/0122011 A1 May 7, 2015

(30) Foreign Application Priority Data
Jun. 15, 2012 (JP) .................................. 2012-135306

(51) Int. Cl.
*G01F 1/684* (2006.01)
*G01F 1/692* (2006.01)
(Continued)

(52) U.S. Cl.
CPC .......... *G01F 1/6842* (2013.01); *G01F 1/6845* (2013.01); *G01F 1/692* (2013.01);
(Continued)

(58) Field of Classification Search
CPC ............................... G01F 1/684; G01F 1/8845
See application file for complete search history.

(56) References Cited

U.S. PATENT DOCUMENTS 5,644,079 A * 7/1997 Rilling .................... G01F 1/684
73/114.34
6,526,822 B1 * 3/2003 Maeda .................. G01F 1/6842
73/204.21
(Continued)

FOREIGN PATENT DOCUMENTS

CN 1636132 A 7/2005
CN 101424555 A 5/2009
(Continued)

OTHER PUBLICATIONS

Chinese-language Office Action issued in counterpart Chinese Application No. 201380031631.3 dated Jul. 5, 2016 (Eight (8) pages).
(Continued)

*Primary Examiner* — Daniel J Colilla
(74) *Attorney, Agent, or Firm* — Crowell & Moring LLP

(57) ABSTRACT

Provided is a thermal flow meter through which a measurement with high accuracy and has a discharge function. In a thermal flow meter 300 of the invention, a part of a measurement target gas 30 flowing through the main passage 124 flows into a bypass passage. A drainage passage 3528 is provided in the bypass passage to communicate a bypass passage 4232 on the inlet port (between the inlet port 350 and the measurement surface 430 serving as the air flow sensing portion) and a bypass passage 4234 on the outlet
(Continued)

port (between the measurement surface 430 serving as the air flow sensing portion and the outlet port 352). The drainage passage 3528 includes a through hole 3512. The through hole 3512 includes an inlet port 3542 which penetrates a wall surface 4212 forming the bypass passage 4232 on the inlet port and is opened in the bypass passage 4232 on the inlet port, and an outlet port 3544 which is opened in a rear surface 4213 of the wall surface. Water 3552 flowing into the bypass passage is guided to the through hole 3512, and guided to the bypass passage 4234 on the outlet port through the drainage passage 3528, and discharged to the main passage 124. Therefore, an influence of the water flowing into a measuring portion can be reduced, and the measurement accuracy can be improved.

5 Claims, 22 Drawing Sheets

(51) Int. Cl.
  *G01F 5/00* (2006.01)
  *G01F 1/696* (2006.01)
  *F02D 41/18* (2006.01)
  *F02D 31/00* (2006.01)
  *F02D 37/02* (2006.01)

(52) U.S. Cl.
  CPC .............. *G01F 1/6965* (2013.01); *G01F 5/00* (2013.01); *F02D 31/005* (2013.01); *F02D 37/02* (2013.01); *F02D 41/182* (2013.01); *F02D 2200/101* (2013.01)

(56) References Cited

U.S. PATENT DOCUMENTS

| | | | |
|---|---|---|---|
| 2001/0052260 A1* | 12/2001 | Kikawa | G01F 1/6842 73/202 |
| 2003/0089168 A1* | 5/2003 | Lenzing | G01F 15/12 73/202.5 |
| 2003/0159501 A1 | 8/2003 | Renninger et al. | |
| 2009/0173151 A1 | 7/2009 | Morino et al. | |
| 2012/0060599 A1 | 3/2012 | Morino et al. | |

FOREIGN PATENT DOCUMENTS

| | | |
|---|---|---|
| CN | 102435242 A | 5/2012 |
| JP | 2006-162631 A | 6/2006 |
| JP | 2007-327790 A | 12/2007 |
| JP | 2012-58075 A | 3/2012 |

OTHER PUBLICATIONS

International Search Report dated Jun. 25, 2013 with English translation (three (3) pages).

\* cited by examiner

THERMAL FLOW METER WITH DRAINAGE PASSAGE AT INLET OF BYPASS PASSAGE

TECHNICAL FIELD

The present invention relates to a thermal flow meter which measures a flow rate of a gas.

BACKGROUND ART

A thermal flow meter is used under very severe environments in some cases. For example, in a case where the thermal flow meter is mounted on a vehicle to measure a flow rate of an intake air to an internal combustion engine, water together with the intake air may enters a bypass passage through which a measurement target gas of the thermal flow meter flows. In some cases, the water may remain inside the bypass passage.

The thermal flow meter measures the flow rate by performing heat transfer between the measurement target gas flowing through the bypass passage and a flow rate detection circuit. Therefore, when the water enters the bypass passage, it is difficult to accurately measure the flow rate. In addition, the flow rate detection circuit may be damaged (for example, erosion) due to the water. For this reason, there is a known technology in which a through hole penetrating the bypass passage from the inside thereof to the outside is provided in order to discharge the water in the bypass passage to the outside of the thermal flow meter, so that the water in the bypass passage is discharged to the outside of the thermal flow meter through the through hole. Such a technology is disclosed, for example, in JP 2006-162631 A.

CITATION LIST

Patent Literature

PTL 1: JP 2006-162631 A

SUMMARY OF INVENTION

Technical Problem

A thermal flow meter disclosed in PTL 1 shows a brilliant evolution, and the measurement accuracy in recent years has been significantly improved. As disclosed in PTL 1, when a through hole is provided to directly connect the inside and the outside of the bypass passage, not only the water but also the measurement target gas in the bypass passage is discharged to the outside of the thermal flow meter, but it is not preferable in view of the measurement accuracy. In particular, a flow velocity of the measurement target gas in the outside of the thermal flow meter is larger than that in the bypass passage, and a pressure easily becomes lower than that in the bypass passage. Such a state is appropriate for the discharge, but even the measurement target gas is discharged, so that the state is not preferable for maintaining the measurement accuracy at a high level.

The present invention has been made to provide a thermal flow meter which can perform measurement with high accuracy and has a discharge function.

Solution to Problem

In order to solve the above problem, there is provided a thermal flow meter of the invention. The thermal flow meter includes a bypass passage for flowing a part of a measurement target gas flowing through a main passage, and a flow rate detection circuit for measuring a flow rate of the measurement target gas flowing through the main passage by performing heat transfer with the measurement target gas flowing through the bypass passage. The bypass passage includes an inlet port for flowing the measurement target gas, an outlet port for returning the measurement target gas to the main passage, and an air flow sensing portion which is arranged between the inlet port and the outlet port and measures the flow rate by performing heat transfer between the flow rate detection circuit and the measurement target gas. A second passage is further provided to communicate a bypass passage on the inlet port between the inlet port of the bypass passage and the air flow sensing portion and a bypass passage on the outlet port between the air flow sensing portion in the bypass passage and the outlet port. The second passage includes an inlet port which passes through a wall surface forming the bypass passage on the inlet port of the bypass passage and is opened in the bypass passage on the inlet port, and an outlet port which is opened in a rear side of the wall surface forming the bypass passage on the inlet port.

In addition, there is provided a thermal flow meter including a bypass passage for flowing a part of a measurement target gas flowing through a main passage, an air flow sensing portion for measuring a flow rate of the measurement target gas flowing through the main passage by performing heat transfer with the measurement target gas flowing through the bypass passage, and a housing which includes a resin bypass passage for forming the bypass passage and protects the air flow sensing portion. The bypass passage includes an inlet port for flowing the measurement target gas, and an outlet port for returning the measurement target gas to the main passage. The air flow sensing portion is arranged between the inlet port of the bypass passage and the outlet port of the bypass passage and performs heat transfer with the measurement target gas to measure the flow rate. A bypass passage on the inlet port for connecting the inlet port of the bypass passage and the air flow sensing portion is provided in one surface of the bypass passage of the housing. A bypass passage on the outlet port for connecting the air flow sensing portion and the outlet port of the bypass passage is provided in the other surface of the bypass passage of the housing. A drain passage is provided in a wall between the bypass passage on the inlet port and the bypass passage on the outlet port to penetrate the wall.

Advantageous Effects of Invention

According to the present invention, it is possible to provide a thermal flow meter which can perform measurement with high accuracy and has a discharge function.

BRIEF DESCRIPTION OF DRAWINGS

FIGS. 2(A) and 2(B) are diagrams illustrating an appearance of the thermal flow meter, in which FIG. 2(A) is a left side view, and FIG. 2(B) is a front view.

FIGS. 3(A) and 3(B) are diagrams illustrating an appearance of the thermal flow meter, in which FIG. 3(A) is a right side view, and FIG. 3(B) is a rear view.

FIGS. 4(A) and 4(B) are diagrams illustrating an appearance of the thermal flow meter, in which FIG. 4(A) is a plan view, and FIG. 4(B) is a bottom view.

FIGS. 5(A) and 5(B) are diagrams illustrating a housing of the thermal flow meter, in which FIG. 5(A) is a left side view of the housing, and FIG. 5(B) is a front view of the housing.

FIGS. 6(A) and 6(B) are diagrams illustrating a housing of the thermal flow meter, in which FIG. 6(A) is a right side view of the housing, and FIG. 6(B) is a rear view of the housing.

FIGS. 8(A) to 8(C) are diagrams illustrating an appearance of a front cover, in which FIG. 8(A) is a left side view, FIG. 8(B) is a front view, and FIG. 8(C) is a plan view.

FIGS. 9(A) to 9(C) are diagrams illustrating an appearance of a rear cover 304, in which FIG. 9(A) is a left side view, FIG. 9(B) is a front view, and FIG. 9(C) is a plan view.

FIGS. 11(A) to 11(C) are exterior views illustrating a circuit package, in which FIG. 11(A) is a left side view, FIG. 11(B) is a front view, and FIG. 11(C) is a rear view.

FIGS. 15(A) and 15(B) are diagrams illustrating another embodiment of the circuit package of FIG. 11, in which FIG. 15(A) is a front view of the circuit package, and FIG. 15(B) is a rear view.

FIGS. 21(A) to 21(C) are diagrams illustrating another embodiment of the thermal flow meter, in which FIG. 21(A) is a front view, FIG. 21(B) is a left side view, and FIG. 21(C) is a rear view.

FIGS. 22(A) and 22(B) are partially enlarged views illustrating still another embodiment, in which FIG. 22(A) is a left side view, and FIG. 22(B) is a partially enlarged rear view.

FIGS. 23(A) and 23(B) are partially enlarged views illustrating still another embodiment, in which FIG. 23(A) is a left side view, and FIG. 23(B) is a partially enlarged rear view.

DESCRIPTION OF EMBODIMENTS

Figure 1:
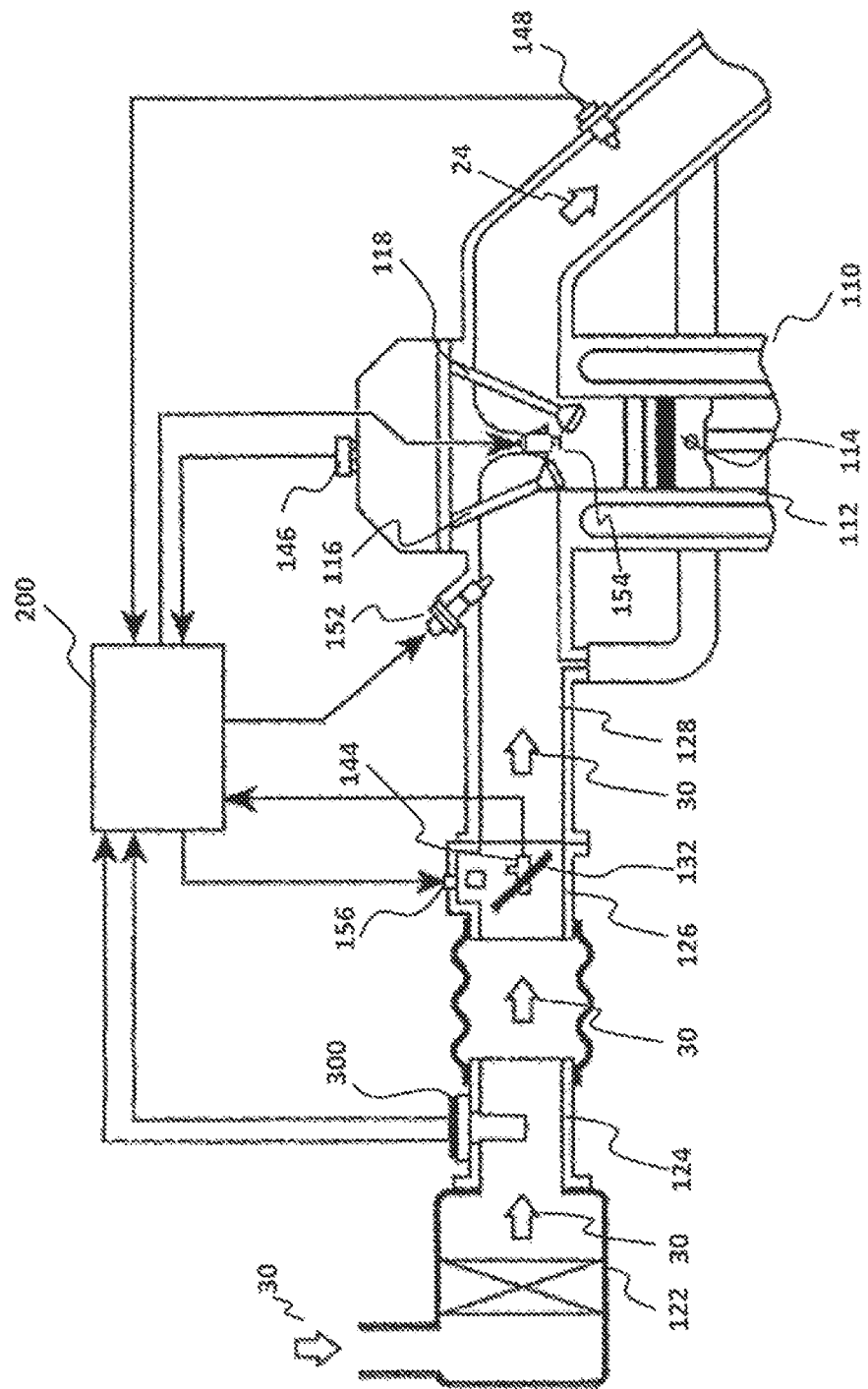
FIG. 1 is a system diagram illustrating an internal combustion engine control system where a thermal flow meter according to an embodiment of the invention is used.

In the following description, modes (refer to as embodiments) for carrying out the invention is to significantly improve a measurement accuracy of a flow rate and to solve a new problem caused by the measurement accuracy. These matters will be described below in detail using the following embodiments, and the overview is as follows.

The thermal flow meter of the invention measures the flow rate such that a part of a measurement target gas for measuring the flow rate flows through a bypass passage and the flow rate detection circuit performs heat transfer with the measurement target gas flowing the bypass passage. It is very important that a relationship between the bypass passage and the flow rate detection circuit is maintained at a high accuracy to be a defined relationship to improve the measurement accuracy of the flow rate. In the following embodiments, at the time when a bypass passage trench for forming the bypass passage, the flow rate detection circuit is fixed to the housing having the bypass passage trench. Specifically, the circuit package formed by a resin enveloping the flow rate detection circuit is covered by a part of the housing having the bypass passage trench, and thus the circuit package is fixed to the bypass passage in an accurate positional relationship. In such a method, it is possible to improve the measurement accuracy of the flow rate.

Embodiments described below are to solve various problems desired as a practical product. In particular, the embodiments are given to solve various problems for use in a measurement device for measuring an intake air amount of a vehicle and exhibit various effects. One of various problems addressed by the following embodiments is described in the "Problems to Be Solved by the Invention" described above, and one of various effects obtained by the following embodiments is described in the "Effects of the Invention". Various problems solved by the following embodiments and various effects obtained by the following embodiments will be further described in the "Description of Embodiments". Therefore, it would be appreciated that the following embodiments also include other effects or problems obtained or addressed by the embodiments than those described in "Problems to Be Solved by the Invention" or "Effects of the Invention".

In the following embodiments, like reference numerals denote like elements even when they are inserted in different drawings, and they have the same functional effects. The components that have been described in previous paragraphs may not be described by denoting reference numerals and signs in the drawings.

1. Internal Combustion Engine Control System Having Thermal Flow Meter According to One Embodiment of the Invention 1.1 Configuration of Internal Combustion Engine Control System FIG. 1 is a system diagram illustrating an electronic fuel injection type internal combustion engine control system having a thermal flow meter according to one embodiment of the invention. Based on the operation of an internal combustion engine 110 having an engine cylinder 112 and an engine piston 114, an intake air as a measurement target gas 30 is inhaled from an air cleaner 122 and is guided to a combustion chamber of the engine cylinder 112 through a main passage 124 including, for example, an intake body, a throttle body 126, and an intake manifold 128. A flow rate of the measurement target gas 30 as an intake air guided to the combustion chamber is measured by a thermal flow meter 300 according to the invention. A fuel is supplied from a fuel injection valve 152 based on the measured flow rate and is mixed with the measurement target gas 30 as an intake air, so that the mixed gas is guided to the combustion chamber. It is noted that, in this embodiment, the fuel injection valve 152 is provided in an intake port of the internal combustion engine, and the fuel injected to the intake port is mixed with the measurement target gas 30 as an intake air to form a mixed gas, so that the mixed gas is guided to the combustion chamber through an inlet valve 116 to generate mechanical energy by burning.

In recent years, in many vehicles, a direct fuel injection method having excellent effects in exhaust gas purification or fuel efficiency improvement is employed, in which a fuel injection valve 152 is installed in a cylinder head of the internal combustion engine, and fuel is directly injected into each combustion chamber from the fuel injection valve 152. The thermal flow meter 300 may be similarly used in a type in which fuel is directly injected into each combustion chamber as well as a type in which fuel is injected into the intake port of the internal combustion engine of FIG. 1. A method of measuring control parameters, including a method of using the thermal flow meter 300, and a method of controlling the internal combustion engine, including a fuel supply amount or an ignition timing, are similar in basic concept between both types. A representative example of both types, a type in which fuel is injected into the intake port is illustrated in FIG. 1.

The fuel and the air guided to the combustion chamber have a fuel/air mixed state and are explosively combusted by spark ignition of the ignition plug 154 to generate mechanical energy. The gas after combustion is guided to an exhaust pipe from the exhaust valve 118 and is discharged to the outside of the vehicle from the exhaust pipe as an exhaust gas 24. The flow rate of the measurement target gas 30 as an intake air guided to the combustion chamber is controlled by the throttle valve 132 of which opening level changes in response to manipulation of an accelerator pedal. The fuel supply amount is controlled based on the flow rate of the intake air guided to the combustion chamber, and a driver controls an opening level of the throttle valve 132, so that the flow rate of the intake air guided to the combustion chamber is controlled. As a result, it is possible to control mechanical energy generated by the internal combustion engine.

1.2 Overview of Control of Internal Combustion Engine Control System

The flow rate and the temperature of the measurement target gas 30 as the intake air that is received from the air cleaner 122 and flows through the main passage 124 are measured by the thermal flow meter 300, and electric signals representing the flow rate and the temperature of the intake air are input to a control device 200 from the thermal flow meter 300. In addition, an output of a throttle angle sensor 144 that measures an opening level of the throttle valve 132 is input to the control device 200, and an output of a rotation angle sensor 146 is input to the control device 200 to measure a position or a condition of the engine piston 114, the inlet valve 116, or the exhaust valve 118 of the internal combustion engine and a rotational speed of the internal combustion engine. In order to measure a mixed ratio state between the fuel amount and the air amount from the condition of the exhaust gas 24 in the exhaust pipe of the internal combustion engine, the oxygen sensor 148 is provided. An output of the oxygen sensor 148 is input to the control device 200.

The thermal flow meter 300 for measuring the flow rate and the temperature of the intake air (described as the measurement target gas 30 which is guided to the internal combustion engine) is attached to an actual vehicle in various states. An intake pipe serving as the main passage 124 is actually arranged in an engine room in a bent shape rather than a linear shape depicted in FIG. 1. The thermal flow meter 300 is inserted from the side surface of the intake pipe (the main passage 124) into the inside, or may be inserted from the upside along a gravitational direction, or may be inserted in a horizontal or inclined direction with respect to the gravitational direction. In a case where the insertion is made in the horizontal or inclined direction, an inlet port of the below-described bypass passage of the thermal flow meter 300 is mounted to be arranged above in the gravitational direction from an outlet port of the bypass passage.

In a case where the bypass passage is bent rather than linear and the inlet port of the bypass passage of the thermal flow meter 300 is positioned above the outlet port of the bypass passage, the bypass passage of the thermal flow meter 300 comes to contain water between the inlet port of the bypass passage and the outlet port of the bypass passage. When water flows from the inlet port, the water remains in the bypass passage so that various adverse effects arise. It is preferable that a below-described drain passage be provided to discharge the water.

The control device 200 computes a fuel injection amount or an ignition timing based on a flow rate of the intake air as an output of the thermal flow meter 300 and a rotational speed of the internal combustion engine measured from an output of the rotation angle sensor 146. Based on the computation result of them, a fuel amount supplied from the fuel injection valve 152 and an ignition timing for igniting the ignition plug 154 are controlled. In practice, the fuel supply amount or the ignition timing is further accurately controlled based on a change of the intake temperature or the throttle angle measured by the thermal flow meter 300, a change of the engine rotation speed, and an air-fuel ratio state measured by the oxygen sensor 148. In the idle driving state of the internal combustion engine, the control device 200 further controls the air amount bypassing the throttle valve 132 using an idle air control valve 156 and controls a rotation speed of the internal combustion engine under the idle driving state.

1.2 Improvement of Measurement Accuracy and Environment of Mounting Thermal Flow Meter Both the fuel supply amount and the ignition timing as a main control amount of the internal combustion engine are computed by using an output of the thermal flow meter 300 as a main parameter. In addition, as needed, a control parameter is corrected based on a temperature of the intake air, or the fuel supply amount and the ignition timing to be supplied to the internal ignition engine are corrected. Improvement of the measurement accuracy, suppression of aging, and improvement of reliability of the thermal flow meter 300 are very important for obtainment of reliability or improvement of control accuracy of a vehicle on which the internal ignition engine is mounted. Particularly, in recent years, there are a lot of demands for fuel saving of vehicles and exhaust gas purification. In order to satisfy such demands, it is significantly important to improve the measurement accuracy of the flow rate of the measurement target gas 30 as the intake air measured by the thermal flow meter 300. In addition, it is also important to maintain high reliability of the thermal flow meter 300.

A vehicle having the thermal flow meter 300 is used under an environment where a temperature change is significant or a coarse weather such as a storm or snow. When a vehicle travels a snowy road, it travels through a road on which an anti-freezing agent is sprayed. It is preferable that the thermal flow meter 300 be designed considering a countermeasure for the temperature change or a countermeasure for dust or pollutants under such a use environment. Furthermore, the thermal flow meter 300 is installed under an environment where the internal combustion engine is subjected to vibration. It is also desired to maintain high reliability for vibration.

The vehicle may be put into a bad weather condition or a very severe environment condition. For example, in an extreme case, the vehicle is likely to run on a wet road in a rainy season. In a case where the thermal flow meter 300 is used in a bad condition, water may flow into from the inlet port of the bypass passage of the below-described thermal flow meter 300. The bypass passage is formed in an arc shape bent between the inlet port of the bypass passage and the outlet port of the bypass passage. In a case where the intake pipe (the main passage 124) is arranged in a vertical direction, the water flowing into from the inlet port of the bypass passage may be remained in the arc portion. The water is discharged from the drain passage to be described below.

The thermal flow meter 300 is installed in the main passage 124 as the intake pipe influenced by heat from the internal combustion engine. For this reason, the heat generated from the internal combustion engine is transferred to the thermal flow meter 300 via the intake pipe which is the main passage 124. Since the thermal flow meter 300 is operated in a manner of measuring the flow rate of the measurement target gas by transferring heat with the measurement target gas, it is important to suppress influence of the heat from the outside as much as possible.

The thermal flow meter 300 mounted on a vehicle solves the problems described in "Problems to Be Solved by the Invention" and provides the effects described in "Effects of the Invention" as described below. In addition, as described below, it solves various problems demanded as a product and provides various effects considering various problems described above. Specific problems or effects solved or provided by the thermal flow meter 300 will be described in the following description of embodiments.

2. Configuration of Thermal Flow Meter 300

2.1 Exterior Structure of Thermal Flow Meter 300

Figure 2:
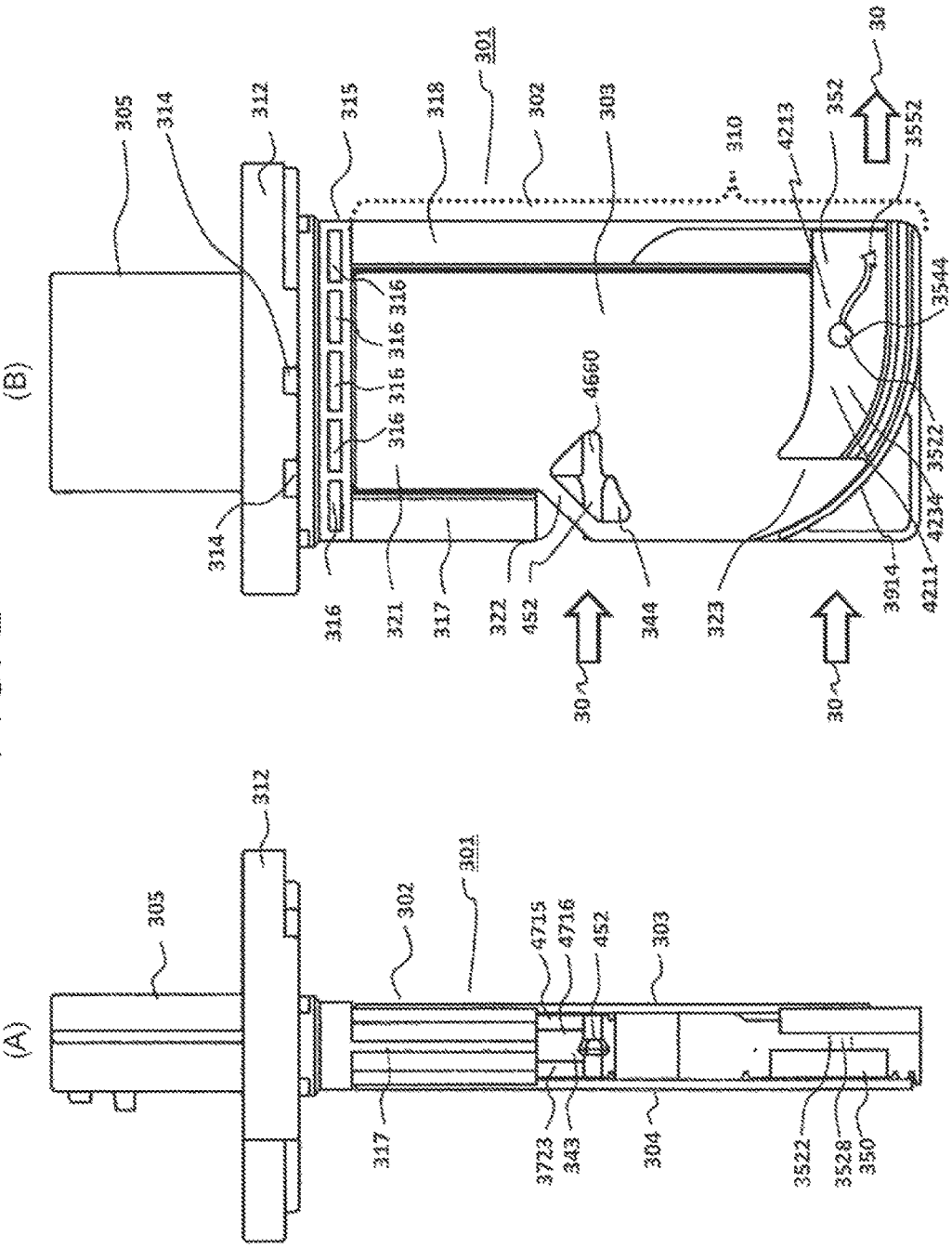
Figure 3:
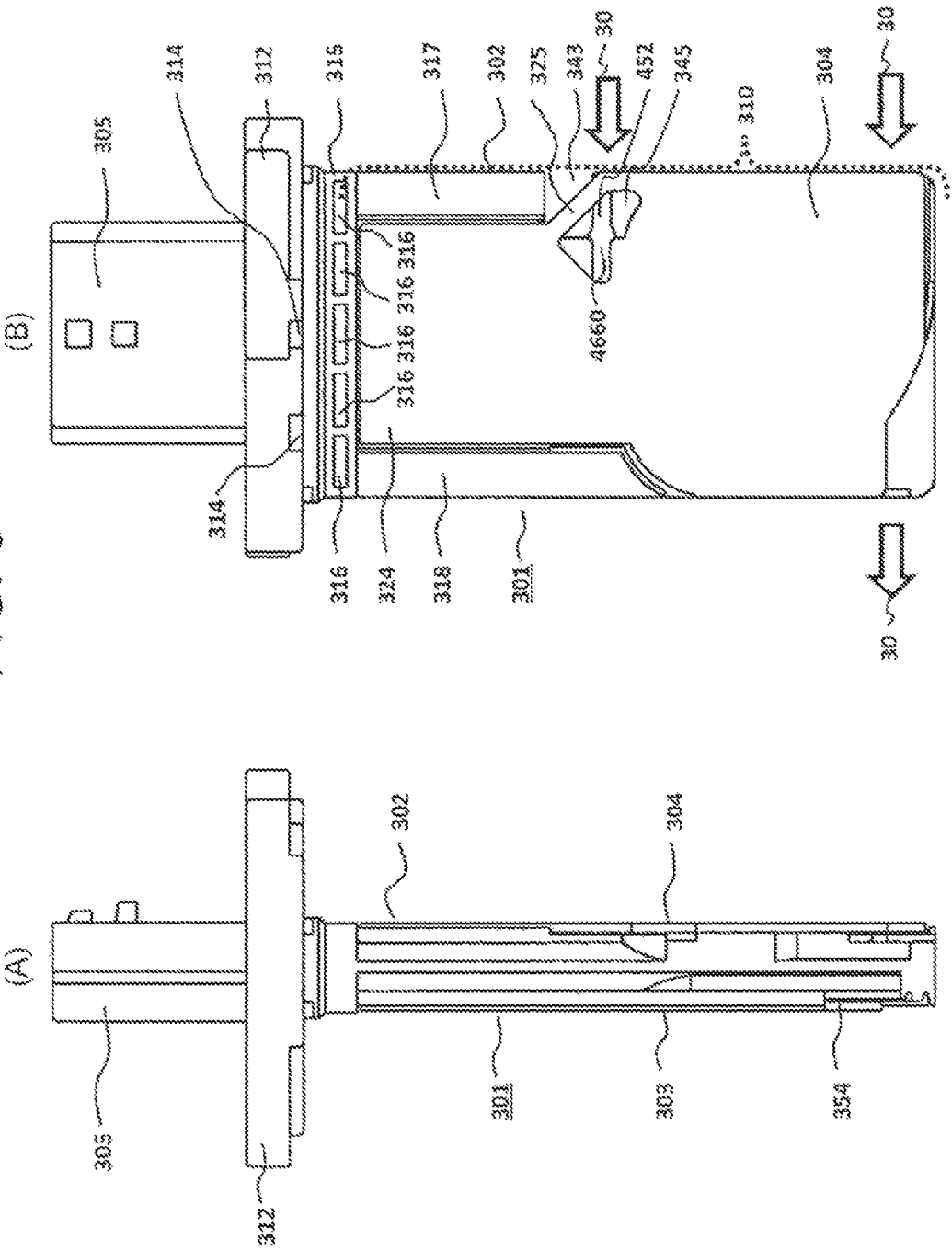
Figure 4:
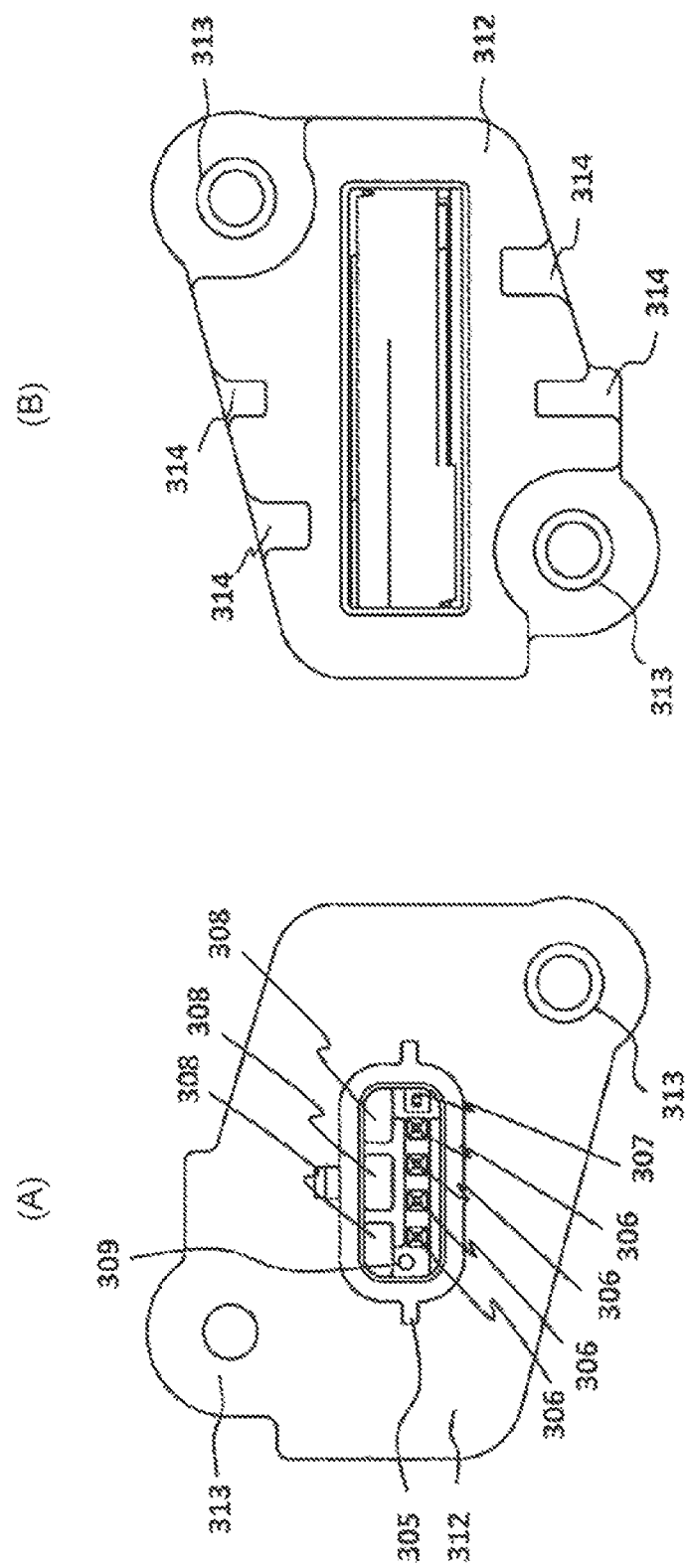

FIGS. 2(A), 2(B), 3(A), 3(B), 4(A), and 4(B) are diagrams illustrating the exterior of the thermal flow meter 300, in which FIG. 2(A) is left side view of the thermal flow meter 300, FIG. 2(B) is a front view, FIG. 3(A) is a right side view, FIG. 3(B) is a rear view, FIG. 4(A) is a plan view, and FIG. 4(B) is a bottom view. The thermal flow meter 300 has a case 301. The case 301 includes a housing 302, a front cover 303, and a rear cover 304. The housing 302 includes a flange 312 for fixing the thermal flow meter 300 to an intake body serving as a main passage 124, an external connector 305 having an external terminal 306 for electrical connection to external devices, and a measuring portion 310 for measuring a flow rate and the like. The measuring portion 310 is internally provided with a bypass passage trench for making a bypass passage. In addition, the measuring portion 310 is internally provided with a circuit package 400 having an air flow sensing portion 602 (refer to FIG. 19) for measuring the flow rate of the measurement target gas 30 flowing through the main passage 124 or a temperature detecting portion 452 for measuring a temperature of the measurement target gas 30 flowing through the main passage 124.

2.2 Exterior Structure of Thermal Flow Meter 300 and Effects Thereof

Since the inlet port 350 of the thermal flow meter 300 is provided on the leading end side of the measuring portion 310 extending toward the center direction of the main passage 124 from the flange 312, the measurement target gas 30 in the vicinity of the center portion distant from the inner wall surface instead of the vicinity of the inner wall surface of the main passage 124 may be input to the bypass passage. For this reason, the thermal flow meter 300 can measure a flow rate or a temperature of the measurement target gas 30 in a portion separated from the inner wall surface of the main passage 124 of the thermal flow meter 300, so that it is possible to suppress a decrease of the measurement accuracy caused by influence of heat and the like. In the vicinity of the inner wall surface of the main passage 124, the thermal flow meter 300 is easily influenced by the temperature of the main passage 124, so that the temperature of the measurement target gas 30 has a different condition from an original temperature of the gas and exhibits a condition different from an average condition of the main gas inside the main passage 124. In particular, if the main passage 124 serves as an intake body of the engine, it may be influenced by the heat from the engine and remains at a high temperature. For this reason, the gas in the vicinity of the inner wall surface of the main passage 124 has a temperature higher than the original temperature of the main passage 124 in many cases, so that it causes degradation in the measurement accuracy.

In the vicinity of the inner wall surface of the main passage 124, a fluid resistance increases, and a flow velocity decreases compared to an average flow velocity in the main passage 124. For this reason, if the gas in the vicinity of the inner wall surface of the main passage 124 is input to the bypass passage as the measurement target gas 30, a decrease of the flow velocity from the average flow velocity in the main passage 124 may generate a measurement error. In the thermal flow meter 300 illustrated in FIGS. 2(A), 2(B), 3(A), 3(B), and 4(A) to 4(C), since the inlet port 350 is provided in the leading end of the thin and long measuring portion 310 extending to the center of the main passage 124 from the flange 312, it is possible to reduce a measurement error relating to a decrease of the flow velocity in the vicinity of the inner wall surface. In the thermal flow meter 300 illustrated in FIGS. 2(A), 2(B), 3(A), 3(B), and 4(A) to 4(C), in addition to the inlet port 350 provided in the leading end of the measuring portion 310 extending to the center of the main passage 124 from the flange 312, an outlet port of the bypass passage is also provided in the leading end of the measuring portion 310. Therefore, it is possible to further reduce the measurement error.

The measuring portion 310 of the thermal flow meter 300 has a shape extending from the flange 312 to the center direction of the main passage 124, and its leading end is provided with the inlet port 350 for inputting a part of the measurement target gas 30 such as the intake air to the bypass passage and the outlet port 352 for returning the measurement target gas 30 from the bypass passage to the main passage 124. While the measuring portion 310 has a shape extending along an axis directed to the center from the outer wall of the main passage 124, its width has a narrow shape as illustrated in FIGS. 2(A) and 3(A). That is, the measuring portion 310 of the thermal flow meter 300 has a front surface having an approximately rectangular shape and a side surface having a thin width. As a result, the thermal flow meter 300 can have a bypass passage having a sufficient length, and it is possible to suppress a fluid resistance to a small value for the measurement target gas 30. For this reason, using the thermal flow meter 300, it is possible to suppress the fluid resistance to a small value and measure the flow rate of the measurement target gas 30 with high accuracy.

2.3 Structure of Measuring Portion 310 and Effects Thereof

In a direction of the flow of the measurement target gas 30 flowing through the main passage 124, an upstream-side protrusion 317 and a downstream-side protrusion 318 are provided in the upstream-side side surface and the downstream-side side surface, respectively, of the measuring portion 310 included in the thermal flow meter 300. The upstream-side protrusion 317 and the downstream-side protrusion 318 have a shape narrowed as it goes along the leading end to the base, so that it is possible to reduce a fluid resistance of the measurement target gas 30 flowing through the main passage 124. The upstream-side protrusion 317 is provided between the thermal insulation 315 and the inlet port 343. The upstream-side protrusion 317 has a large cross section and receives a large heat conduction from the flange 312 or the thermal insulation 315. However, the upstream-side protrusion 317 is cut near the inlet port 343, and a length of the temperature detecting portion 452 from the temperature detecting portion 452 of the upstream-side protrusion 317 increases due to the hollow of the upstream-side outer wall of the housing 302 as described below. For this reason, the heat conduction is suppressed from the thermal insulation 315 to the support portion of the temperature detecting portion 452.

The temperature of the measurement target gas 30 received from the inlet port 343 is measured by the temperature detecting portion 452 and the measurement target gas flows through a flow path for measuring the temperature of an outer wall hollow portion 366 (described below with reference to FIG. 5) of the housing 302, and discharged from the front side outlet port 344 or the rear side outlet port 345 to the main passage 124. With the cooling passage trench, since the measurement target gas 30 received from the inlet port 343 is guided along the protrusion 424 (refer to FIG. 11) having the temperature detecting portion 452, the temperature of not only the temperature detecting portion 452 but also the protrusion 424 approaches the temperature of the measurement target gas 30. Therefore, it is possible to reduce an influence of heat transmitted from other heating portions to the protrusion 424, and it leads to improvement of measurement accuracy of the temperature of the measurement target gas 30.

A gap 382 including the terminal connector 320 and the terminal connector 320 described below is formed between the flange 312 or the thermal insulation 315 and the temperature detecting portion 452. For this reason, a distance between the flange 312 or the thermal insulation 315 and the temperature detecting portion 452 increases, and the front cover 303 or the rear cover 304 is provided in this long portion, so that this portion serves as a cooling surface. Therefore, it is possible to reduce influence of the temperature of the wall surface of the main passage 124 to the temperature detecting portion 452. In addition, as the distance between the flange 312 or the thermal insulation 315 and the temperature detecting portion 452 increases, it is possible to guide a part of the measurement target gas 30 input to the bypass passage to the vicinity of the center of the main passage 124. It is possible to suppress a decrease of the measurement accuracy relating to the wall surface of the main passage 124.

As illustrated in FIG. 2(B) or 3(B), both side surfaces of the measuring portion 310 inserted into the main passage 124 have a very narrow shape, and a leading end of the downstream-side protrusion 318 or the upstream-side protrusion 317 has a narrow shape relative to the base where the air resistance is reduced. For this reason, it is possible to suppress an increase of the fluid resistance caused by insertion of the thermal flow meter 300 into the main passage 124. Furthermore, in the portion where the downstream-side protrusion 318 or the upstream-side protrusion 317 is provided, the upstream-side protrusion 317 or the downstream-side protrusion 318 protrudes toward both sides relative to both side portions of the front cover 303 or the rear cover 304. Since the upstream-side protrusion 317 or the downstream-side protrusion 318 is formed of a resin molding, they are easily formed in a shape having an insignificant air resistance. Meanwhile, the front cover 303 or the rear cover 304 is shaped to have a wide cooling surface. For this reason, the thermal flow meter 300 has a reduced air resistance and can be easily cooled by the measurement target air flowing through the main passage 124.

2.4 Structure and Effects of Flange 312

The flange 312 is provided with a plurality of hollows 314 on its lower surface which is a portion facing the main passage 124, so as to reduce a heat transfer surface with the main passage 124 and make it difficult for the thermal flow meter 300 to receive influence of the heat. The screw hole 313 of the flange 312 is provided to fix the thermal flow meter 300 to the main passage 124, and a space is formed between a surface facing the main passage 124 around each screw hole 313 and the main passage 124 such that the surface facing the main passage 124 around the screw hole 313 recedes from the main passage 124. As a result, the flange 312 has a structure capable of reducing heat transfer from the main passage 124 to the thermal flow meter 300 and preventing degradation of the measurement accuracy caused by heat. Furthermore, in addition to the heat conduction reduction effect, the hollow 314 can reduce influence of contraction of the resin of the flange 312 during the formation of the housing 302.

The thermal insulation 315 is provided in the measuring portion 310 side of the flange 312. The measuring portion 310 of the thermal flow meter 300 is inserted into the inside from an installation hole provided in the main passage 124 so that the thermal insulation 315 faces the inner surface of the installation hole of the main passage 124. The main passage 124 serves as, for example, an intake body, and is maintained at a high temperature in many cases. Conversely, it is conceived that the main passage 124 is maintained at a significantly low temperature when the operation is activated in a cold district. If such a high or low temperature condition of the main passage 124 affects the temperature detecting portion 452 or the measurement of the flow rate described below, the measurement accuracy is degraded. For this reason, a plurality of hollows 316 are provided side by side in the thermal insulation 315 adjacent to the hole inner surface of the main passage 124, and a width of the thermal insulation 315 adjacent to the hole inner surface between the neighboring hollows 316 is significantly thin, which is equal to or smaller than 1/3 of the width of the fluid flow direction of the hollow 316. As a result, it is possible to reduce influence of temperature. In addition, a portion of the thermal insulation 315 becomes thick. During a resin molding of the housing 302, when the resin is cooled from a high temperature to a low temperature and is solidified, volumetric shrinkage occurs so that a deformation is generated as a stress occurs. By forming the hollow 316 in the thermal insulation 315, it is possible to more uniformize the volumetric shrinkage and reduce stress concentration.

The measuring portion 310 of the thermal flow meter 300 is inserted into the inside from the installation hole provided in the main passage 124 and is fixed to the main passage 124 using the flange 312 of the thermal flow meter 300 with screws. The thermal flow meter 300 is preferably fixed to the installation hole provided in the main passage 124 with a predetermined positional relationship. The hollow 314 provided in the flange 312 may be used to determine a positional relationship between the main passage 124 and the thermal flow meter 300. By forming the convex portion in the main passage 124, it is possible to provide an insertion relationship between the convex portion and the hollow 314 and fix the thermal flow meter 300 to the main passage 124 in an accurate position.

2.5 Structures and Effects of External Connector 305 and Flange 312

FIG. 4(A) is a plan view illustrating the thermal flow meter 300. Four external terminal 306 and a calibration terminal 307 are provided inside the external connector 305. The external terminals 306 include terminals for outputting the flow rate and the temperature as a measurement result of the thermal flow meter 300 and a power terminal for supplying DC power for operating the thermal flow meter 300. The calibration terminal 307 is used to measures the produced thermal flow meter 300 to obtain a calibration value of each thermal flow meter 300 and store the calibration value in an internal memory of the thermal flow meter 300. In the subsequent measurement operation of the thermal flow meter 300, the calibration data representing the calibration value stored in the memory is used, and the calibration terminal 307 is not used. Therefore, in order to prevent the calibration terminal 307 from hindering connection between the external terminals 306 and other external devices, the calibration terminal 307 has a shape different from that of the external terminal 306. In this embodiment, since the calibration terminal 307 is shorter than the external terminal 306, the calibration terminal 307 does not hinder connection even when the connection terminal connected to the external terminal 306 for connection to external devices is inserted into the external connector 305. In addition, since a plurality of hollows 308 are provided along the external terminal 306 inside the external connector 305, the hollows 308 reduce stress concentration caused by shrinkage of resin when the resin as a material of the flange 312 is cooled and solidified.

Since the calibration terminal 307 is provided in addition to the external terminal 306 used during the measurement operation of the thermal flow meter 300, it is possible to measure characteristics of each thermal flow meter 300 before shipping to obtain a variation of the product and store a calibration value for reducing the variation in the internal memory of the thermal flow meter 300. The calibration terminal 307 is formed in a shape different from that of the external terminal 306 in order to prevent the calibration terminal 307 from hindering connection between the external terminal 306 and external devices after the calibration value setting process. In this manner, using the thermal flow meter 300, it is possible to reduce a variation of each thermal flow meter 300 before shipping and improve measurement accuracy.

3. Entire Structure of Housing 302 and its Effects 3.1 Structures and Effects of Bypass Passage and Air Flow Sensing Portion FIGS. 5(A), 5(B), 6(A), and 6(B) illustrate a state of the housing 302 when the front and rear covers 303 and 304 are removed from the thermal flow meter 300. FIG. 5(A) is a left side view illustrating the housing 302, FIG. 5(B) is a front view illustrating the housing 302, FIG. 6(A) is a right side view illustrating the housing 302, and FIG. 6(B) is a rear view illustrating the housing 302. In the housing 302, the measuring portion 310 extends from the flange 312 to the center direction of the main passage 124, and a bypass passage trench for forming the bypass passage is provided in its leading end side. In this embodiment, the bypass passage trench is provided on both frontside and backside of the housing 302. FIG. 5(B) illustrates a bypass passage trench on frontside 332, and FIG. 6(B) illustrates a bypass passage trench on backside 334. Since an inlet trench 351 for forming the inlet port 350 of the bypass passage and an outlet port trench 353 for forming the outlet port 352 are provided in the leading end of the housing 302, the gas distant from the inner wall surface of the main passage 124, that is, the gas flow through the vicinity of the center of the main passage 124 can be received as the measurement target gas 30 from the inlet port 350. The gas flowing through the vicinity of the inner wall surface of the main passage 124 is influenced by the temperature of the wall surface of the main passage 124 and has a temperature different from the average temperature of the gas flowing through the main passage 124 such as the measurement target gas 30 in many cases. In addition, the gas flowing through the vicinity of the inner wall surface of the main passage 124 has a flow velocity lower than the average flow velocity of the gas flowing through the main passage 124 in many cases. Since the thermal flow meter 300 according to the embodiment is resistant to such influence, it is possible to suppress a decrease of the measurement accuracy.

The bypass passage formed by the bypass passage trench on frontside 332 or the bypass passage trench on backside 334 described above is connecter to the thermal insulation 315 of the flange 312 through the outer wall hollow portion 366, the upstream-side outer wall 335, or the downstream-side outer wall 336. In addition, the upstream-side outer wall 335 is provided with the upstream-side protrusion 317, and the downstream-side outer wall 336 is provided with the downstream-side protrusion 318. In this structure, since the thermal flow meter 300 is fixed to the main passage 124 using the flange 312, the measuring portion 310 having the circuit package 400 is fixed to the main passage 124 with high reliability.

In this embodiment, the housing 302 is provided with the bypass passage trench for forming the bypass passage, and the covers are installed on the frontside and backside of the housing 302, so that the bypass passage is formed by the bypass passage trench and the covers. In this structure, it is possible to form overall bypass passage trenches as a part of the housing 302 in the resin molding process of the housing 302. In addition, since the dies are provided in both surfaces of the housing 302 during formation of the housing 302, it is possible to form both the bypass passage trench on frontside 332 and bypass passage trench on backside 334 as a part of the housing 302 by using the dies for both the surfaces. Since the front and rear covers 303 and 304 are provided in both the surfaces of the housing 302, it is possible to obtain the bypass passages in both surfaces of the housing 302. Since the front bypass passage trench on frontside 332 and the bypass passage trench on backside 334 are formed on both the surfaces of the housing 302 using the dies, it is possible to form the bypass passage with high accuracy and obtain high productivity.

As can be seen from FIGS. 2(A), 2(B), 3(A), and 3(B) and also FIGS. 5(A), 5(B), 6(A), and 6(B), the upstream-side outer wall 335 and the downstream-side outer wall 336 protruding in the frontside direction and the backside direction from the front side and the rear side of the housing 302, a connecting portion of the upstream-side outer wall 335 and the downstream-side outer wall 336 along the thermal insulation 315, the top portions of the inside wall of bypass passage on backside 391 and an outside wall of bypass passage on backside 392, and the top portions of an inside wall of bypass passage on frontside 393 and an outside wall of bypass passage on frontside 394 come into close contact with the front cover 303 or the rear cover 304. A space and a bypass passage closed by the housing 302 and the front cover 303 or the rear cover 304 are formed.

In the closed space, the circuit package 400 is provided as described below in detail, and the gap 382 is formed. The housing 302 and the front cover 303 or the rear cover 304 are bonded through a laser welding method. However, when the housing 302 and the front cover 303 or the rear cover 304 are completely closed, there may cause a problem on expansion of the gas according to a temperature change. Therefore, the closing is made, but a ventilative structure is provided. With the ventilative structure, a difference in pressure with respect to the outside is reduced based on the temperature change in the closed space.

Referring to FIG. 6(B), a part of the measurement target gas 30 flowing through the main passage 124 is input to the inside of the bypass passage trench on backside 334 from the inlet trench 351 that forms the inlet port 350 and flows through the inside of the bypass passage trench on backside 334. The bypass passage trench on backside 334 gradually deepens as the gas flows, and the measurement target gas 30 slowly moves to the front direction as it flows along the trench. In particular, the bypass passage trench on backside 334 is provided with a steep slope portion 347 that steeply deepens near a hole 342, so that a part of the air having a light mass moves along the steep slope portion 347 and then flows to the side of the measurement surface 430 illustrated in FIG. 5(B) from the hole 342. Meanwhile, since a foreign object having a heavy mass has difficulty in steeply changing its path, it moves to the side of the backside of measurement surface 431 illustrated in FIG. 6(B). Then, the foreign object flows to the measurement surface 430 illustrated in FIG. 5(B) through a hole 341.

In the bypass passage trench on frontside 332 of FIG. 5(B), the air as a measurement target gas 30 moving from the hole 342 to the bypass passage trench on frontside 332 side flows along the measurement surface 430, and heat transfer is performed with the air flow sensing portion 602 for measuring the flow rate using the heat transfer surface exposing portion 436 provided in the measurement surface 430 in order to measure the flow rate. Both the measurement target gas 30 passing through the measurement surface 430 and the air flowing from the hole 341 to the bypass passage trench on frontside 332 flow along the bypass passage trench on frontside 332 and are discharged from the outlet port trench 353 for forming the outlet port 352 to the main passage 124.

A substance having a heavy mass such as a contaminant mixed in the measurement target gas 30 has a high inertial force and has difficulty in steeply changing its path to the deep side of the trench along the surface of the steep slope portion 347 of FIG. 6(B) where a depth of the trench steeply deepens. For this reason, since a foreign object having a heavy mass moves through the side of the backside of measurement surface 431, it is possible to suppress the foreign object from passing through the vicinity of the heat transfer surface exposing portion 436. In this embodiment, since most of foreign objects having a heavy mass other than the gas pass through the backside of measurement surface 431 which is a rear surface of the measurement surface 430, it is possible to reduce influence of contamination caused by a foreign object such as an oil component, carbon, or a contaminant and suppress degradation of the measurement accuracy. That is, since the path of the measurement target gas 30 steeply changes along an axis across the flow axis of the main passage 124, it is possible to reduce influence of a foreign object mixed in the measurement target gas 30.

In this embodiment, the flow path including the bypass passage trench on backside 334 is directed to the flange from the leading end of the housing 302 along a curved line, and the gas flowing through the bypass passage in the side closest to the flange flows reversely to the main passage 124, so that the bypass passage in the rear surface side as one side of this reverse flow is connected to the bypass passage formed in the front surface side as the other side. As a result, it is possible to easily fix the heat transfer surface exposing portion 436 of the circuit package 400 to the bypass passage and easily receive the measurement target gas 30 in the position close to the center of the main passage 124.

In this embodiment, there is provided the hole 342 and the hole 341 which penetrate the bypass passage trench on backside 334 and the bypass passage trench on frontside 332 in the front and rear sides of the flow direction of the measurement surface 430 for measuring the flow rate. By providing the penetrating holes 342 and 341, the bypass passage is formed such that the measurement target gas 30 moves from the bypass passage trench on backside 334 formed in one surface of the housing 302 to the bypass passage trench on frontside 332 formed in the other surface of the housing 302. With this configuration, it is possible to form the bypass passage trench on both surfaces of the housing 302 through a single resin molding process and perform molding according to a structure connecting the both surfaces.

In addition, since the holes 342 and 341 are provided on both sides of the measurement surface 430 molded in the circuit package 400, it is possible to prevent an inflow of the resin into the heat transfer surface exposing portion 436 molded in the measurement surface 430 by using dies for molding the holes 342 and 341 on the both sides. In addition, since the holes 342 and 341 are molded on the upstream side and on the downstream side of the measurement surface 430, when the circuit package 400 is fixed to the housing 302 by the resin molding process, the dies are arranged using these holes, so that the circuit package 400 can be positioned and fixed by the dies.

In the embodiment, two holes (the holes 342 and 341) are provided as the holes penetrating the bypass passage trench on backside 334 and the bypass passage trench on frontside 332. However, even when the two holes including the holes 342 and 341 are not provided, in a case where any one of the holes is used, it is possible to form the structure of the bypass passage connecting the bypass passage trench on backside 334 and the bypass passage trench on frontside 332 by the single resin molding process.

The inside wall of bypass passage on backside 391 and the outside wall of bypass passage on backside 392 are provided in both sides of the bypass passage trench on backside 334, and the inner side surface of the rear cover 304 abuts on the leading end portions of the height direction of each of the inside wall of bypass passage on backside 391 and the outside wall of bypass passage on backside 392, so that the bypass passage on backside is formed in the housing 302. In addition, the inside wall of bypass passage on frontside 393 and the outside wall of bypass passage on frontside 394 are provided in both sides of the bypass passage trench on frontside 332, and the inner side surface of the rear cover 304 abuts on the leading end portions of the height direction of the inside wall of bypass passage on frontside 393 and the outside wall of bypass passage on frontside 394, so that the bypass passage on frontside is formed in the housing 302.

In this embodiment, the measurement target gas 30 dividingly flows through the measurement surface 430 and its rear surface, and the heat transfer surface exposing portion 436 for measuring the flow rate is provided in one of them. However, the measurement target gas 30 may pass through only the front surface side of the measurement surface 430 instead of dividing the measurement target gas 30 into two passages. By curving the bypass passage to follow a second axis across a first axis of the flow direction of the main passage 124, it is possible to gather the foreign object mixed in the measurement target gas 30 to the side where the curve of the second axis is insignificant. By providing the measurement surface 430 and the heat transfer surface exposing portion 436 in the side where the curve of the second axis is significant, it is possible to reduce influence of the foreign object.

In this embodiment, the measurement surface 430 and the heat transfer surface exposing portion 436 are provided in a link portion between the bypass passage trench on frontside 332 and the bypass passage trench on backside 334. However, the measurement surface 430 and the heat transfer surface exposing portion 436 may be provided in the bypass passage trench on frontside 332 or the bypass passage trench on backside 334 instead of the link portion between the bypass passage trench on frontside 332 and the bypass passage trench on backside 334.

An orifice shape is formed in a part of the heat transfer surface exposing portion 436 provided in the measurement surface 430 to measure a flow rate, so that the flow velocity increases due to the orifice effect, and the measurement accuracy is improved. In addition, even if a vortex is generated in a flow of the gas in the upstream side of the heat transfer surface exposing portion 436, it is possible to eliminate or reduce the vortex using the orifice and improve measurement accuracy.

Referring to FIGS. 5(A), 5(B), 6(A), and 6(B), an outer wall hollow portion 366 is provided, where the upstream-side outer wall 335 has a hollow shape hollowed to the downstream side in a neck portion of the temperature detecting portion 452. Due to this outer wall hollow portion 366, a distance between the temperature detecting portion 452 and the outer wall hollow portion 366 increases, so that it is possible to reduce influence of the heat transferred via the upstream-side outer wall 335.

Since the outer wall hollow portion 366 is provided in a neck portion of the temperature detecting portion 452, it is possible to reduce influence of the heat transferred from the flange 312 or the thermal insulation 315 through the upstream-side outer wall 335. Furthermore, the outer wall hollow portion 366 for measuring a temperature formed by a notch between the upstream-side protrusion 317 and the temperature detecting portion 452 is provided. Using the outer wall hollow portion 366, it is possible to reduce heat transfer to the temperature detecting portion 452 through the upstream-side protrusion 317. As a result, it is possible to improve detection accuracy of the temperature detecting portion 452. In particular, since the upstream-side protrusion 317 has a large cross section, it easily transfers heat, and a functionality of the outer wall hollow portion 366 that suppress heat transfer becomes important.

In addition, in the embodiment, a drainage passage 3528 is further provided in the bypass passage to communicate a bypass passage 4232 on the inlet port (between the inlet port 350 and the measurement surface 430 serving as the air flow sensing portion) and a bypass passage 4234 on the outlet port (between the measurement surface 430 serving as the air flow sensing portion and the outlet port 352). The drainage passage 3528 includes a through hole 3522. The through hole 3522 includes an inlet port 3542 which passes through a wall surface 4212 forming the bypass passage 4232 on the inlet port of the bypass passage and is opened in the bypass passage 4232 on the inlet port, and an outlet port 3544 which is opened in a rear surface 4213 of the wall surface 4212 forming the bypass passage 4232 on the inlet port.

The thermal flow meter 300 is attached at an angle crossing the gravitational direction. By the drainage passage 3528, water 3552 flowing into from the inlet port 350 of the bypass passage flows along a bypass outer wall 3914 and is guided to the through hole 3522 of the drainage passage 3528 provided in the wall surface of the bypass passage 4232 on the inlet port. The water is guided to a bypass passage 3544 on the outlet port through the drainage passage 3528, and discharged from the bypass passage 3544 on the outlet port to the main passage 124. On the other hand, the measurement target gas 30 flowing into from the inlet port 350 of the bypass passage is guided to the bypass passage 3544 on the outlet port through the drainage passage 3528, but the discharge amount is less. The reason is that in the conventional structure where the drainage passage is communicated to the outside of the thermal flow meter 300, the flow velocity of the measurement target gas 30 outside the thermal flow meter 300 becomes easily faster than that in the bypass passage, and the pressure of the measurement target gas 30 outside the thermal flow meter 300 becomes easily lower than that in the bypass passage.

On the other hand, there is little difference in flow velocity of the measurement target gas between the inside of the bypass passage 4232 on the inlet port and the inside of the bypass passage 3544 on the outlet port. In other words, there is little difference in pressure of the measurement target gas 30 between the inside of the bypass passage 4232 on the inlet port and the inside of the bypass passage 3544 on the outlet port. Therefore, in the structure where the drainage passage 3528 communicates the bypass passage 4232 on the inlet port and the bypass passage 4234 on the outlet port, a less measurement target gas 30 inside the bypass passage 4232 on the inlet port is leaked into the bypass passage 3544 on the outlet port. For this reason, it is possible to maintain high measurement accuracy.

In FIG. 5(B), the outlet port 3544 of the drainage passage 3528 is provided on the downstream side near an outlet port trench 353 of the bypass passage. The vicinity of the outlet port trench 353 of the bypass passage has a large cross-sectional area of the bypass passage, so that the flow velocity of the flowing measurement target gas 30 is low. Therefore, the center of the bypass passage shows a high pressure of the flowing measurement target gas 30. Since the outlet port 3544 of the through hole 3522 communicating the inside of the bypass passage 4232 on the inlet port and the inside of the bypass passage 3544 on the outlet port is provided in a portion having a low flow velocity of measurement target gas 30, it is possible to make the amount of the measurement target gas 30 leaking through the drainage passage 3528 reduced. It is preferable to maintain high measurement accuracy.

As described above, the water in the bypass passage 4232 on the inlet port flowing into from the inlet port 350 of the bypass passage moves as depicted with the arrow 3552. As described with reference to FIGS. 6(B) and 5(B), the water is guided to the bypass passage 3544 on the outlet port through the through hole 3522 of the drainage passage 3528 provided on a side near the bypass passage 4232 on the inlet port, and the water is guided as depicted with the arrow 3552 and discharged to the main passage 124. In this way, the water is suppressed from flowing into the measurement surface 430 of the circuit package 400, and the measurement surface 430 is suppressed from permeating with the water 3552.

In other words, the drainage passage 3528 is provided such that the bypass passage 4232 on the inlet port between the inlet port 350 in the bypass passage and the measurement surface 430 serving as the air flow sensing portion is communicated with the bypass passage 4234 on the outlet port between the measurement surface 430 serving as the air flow sensing portion in the bypass passage and the outlet port 352. Therefore, the water 3552 flowing into from the inlet port 350 of the bypass passage is suppressed from flowing into the measurement surface 430 of the circuit package 400, and the measurement surface 430 is suppressed from permeating with the water 3552. Accordingly, it is possible to suppress a measurement error of the flow rate and suppress damage such as corrosion of the flow rate detection circuit, so that a high reliability of the thermal flow meter 300 can be obtained. As described above, by providing the drainage passage 3528, the measurement target gas 30 and the water 3552 flowing into from the inlet port 350 of the bypass passage are separated from each other before reaching the measurement surface 430. Among them, the water 3552 is discharged to the main passage 124 through the drainage hole 3528 without passing the measurement surface 430.

Figure 5:
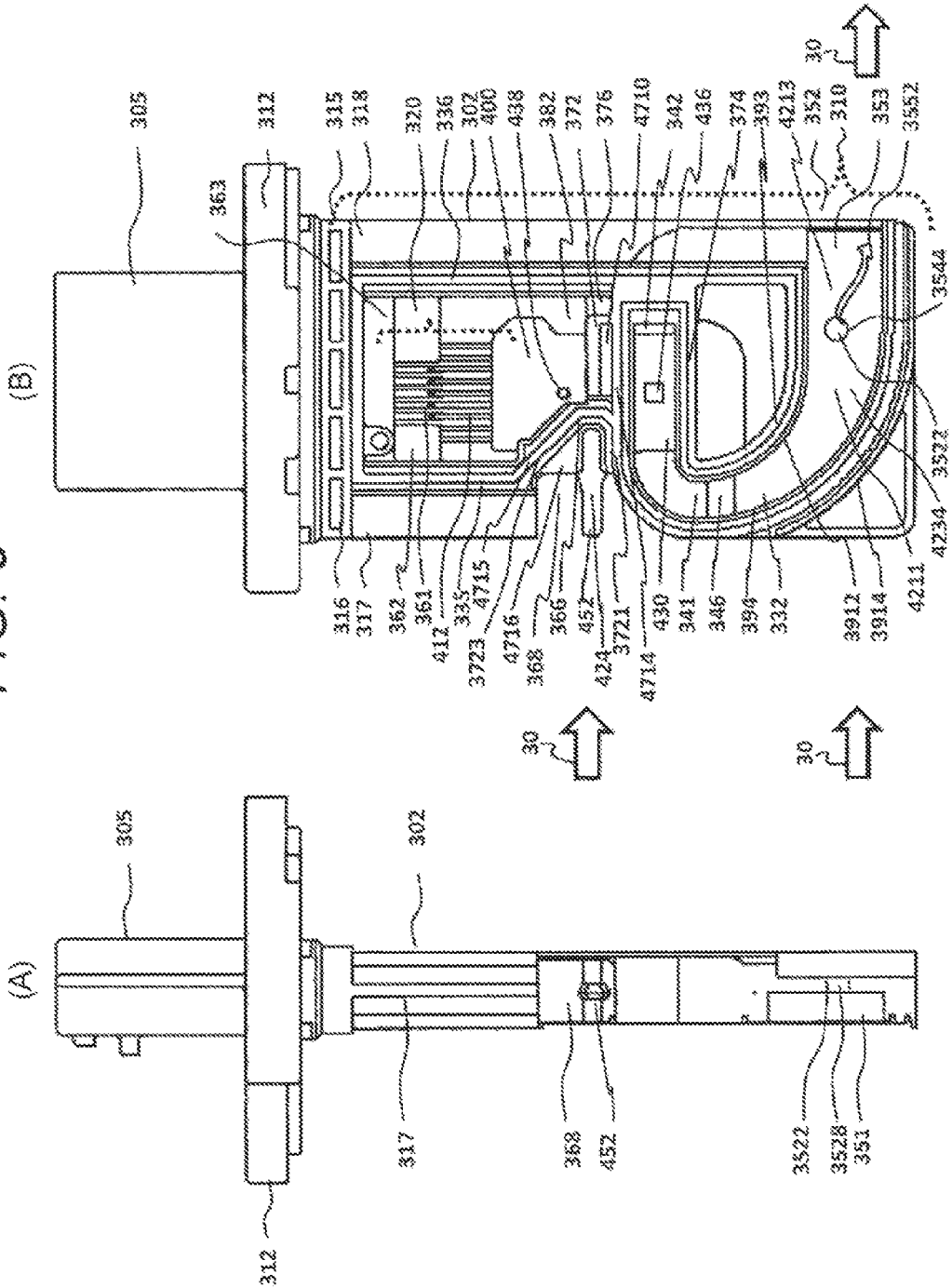
Figure 6:
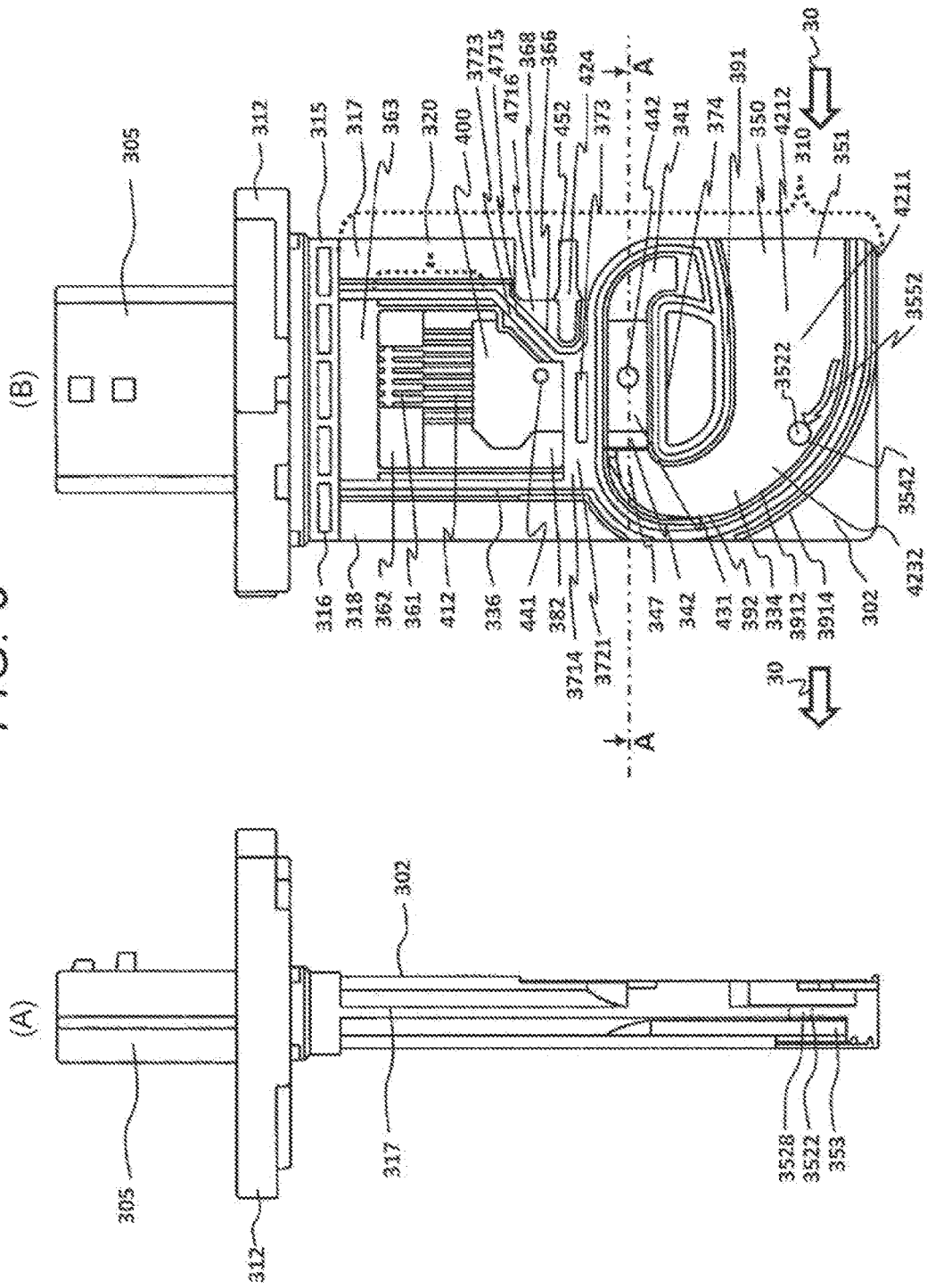

In addition, in the embodiment, as illustrated in FIG. 5, the inlet port 350 and the outlet port 352 of the bypass passage are arranged in the end portion of the thermal flow meter 300 in a direction opposite to the flange 312. The measurement surface 430 serving as the air flow sensing portion is arranged in the direction of the flange 312 from the inlet port 350 and the outlet port 352. The bypass passage 4232 on the inlet port is formed to approach the measurement surface 430 serving as the air flow sensing portion from the inlet port 350 of the bypass passage while being curved in the direction of the flange 312. The bypass passage 4232 on the inlet port is formed by the bypass passage trench 332 on the inlet port and the cover 304 which covers the bypass passage trench 332 on the inlet port. The through hole 3522 of the drainage passage 3528 is provided in a wall surface 4213 positioned on a direction opposite to the flange 312 of the bypass passage trench 332 on the inlet port. With such a configuration, the measurement target gas 30 flowing into from the inlet port 350 of the bypass passage is regulated in its flow to be guided toward the measurement surface 430 serving as the air flow sensing portion. Simultaneously, the water 3552 flowing into from the inlet port 350 is guided to the bypass passage 3544 on the outlet port without flowing toward the measurement surface 430 serving as the air flow sensing portion through the drainage 3528, and discharged to the passage 124. Therefore, it is possible to perform the measurement with high accuracy.

In addition, in the embodiment, as illustrated in FIGS. 2(A) and 2(B) and FIGS. 3(A) and 3(B), the bypass passage trench 332 on the inlet port for forming the bypass passage 4232 on the inlet port and a first cover 304 for forming the bypass passage 4232 on the inlet port by covering the bypass passage trench 332 on the inlet port are provided in one surface of the thermal flow meter 300. Further, the bypass passage 334 on the outlet port trench for forming the bypass passage 4234 on the outlet port and a second cover 303 for forming the bypass passage 4234 on the outlet port by covering the bypass passage 334 on the outlet port trench are provided in the other surface of the thermal flow meter 300. Although the bypass passage trench 332 on the inlet port is configured such that the through hole 3522 of the drainage passage 3528 is provided in one surface of the thermal flow meter 300, similarly to the above embodiment, it can be suppressed that the water 3552 flowing into from the inlet port 350 of the bypass passage flows in the measurement surface 430 of the circuit package 400. Further, it is possible to prevent the measurement error and the damage caused by the water permeating to the measurement surface 430. The configurations and effects of another embodiment of the embodiment will be described below.

In addition, in the embodiment, as described above with reference to FIGS. 5(A), 5(B), 6(A), and 6(B), the measurement surface 430 serving as the air flow sensing portion is provided to measure the flow rate of the gas flowing through the main passage 124. The housing 302 serving as the air flow sensing portion having a resin bypass passage portion for forming the bypass passage is provided to hold the measurement surface 430. The bypass passage includes the inlet port 350 for making the measurement target gas 30 flow and the outlet port 352 for returning the flowing measurement target gas 30 to the main passage 124. The measurement surface 430 serving as the air flow sensing portion is arranged between the inlet port 350 and the outlet port 352 of the bypass passage and measures the flow rate by performing heat transfer with the measurement target gas 30. The bypass passage 4232 on the inlet port for connecting the inlet port 350 of the bypass passage and the measurement surface 430 serving as the air flow sensing portion is provided in the one surface of the bypass passage portion of the housing 302. The bypass passage 4234 on the outlet port for connecting the measurement surface 430 serving as the air flow sensing portion and the outlet port 352 of the bypass passage is provided in the other surface of the bypass passage portion of the housing 302. The drainage passage 3528 is provided to pass through a wall 4211 between the bypass passage 4232 on the inlet port and the bypass passage 4234 on the outlet port. It is possible to achieve the effect obtained through the resin molding in two stages as described above and the effect obtained by providing the drainage passage 3528. Further, it is possible to provide the thermal flow meter having high measurement accuracy.

In addition, in the embodiment, as illustrated in FIGS. 5(A), 5(B), 6(A), and 6(B), the through hole 3522 of the drainage passage 3528 is provided in a flowing direction of the measurement target gas 30, that is, a side surface direction which is a direction crossing the bypass passage. The pressure added in the flowing direction of the measurement target gas 30 is less applied to the drainage passage 3528 provided in the side surface direction crossing the axial direction of the bypass passage which is the flowing direction of the measurement target gas 30. For this reason, it is possible to suppress the flow rate of the measurement target gas 30 flowing to the drainage passage 3528. Therefore, with the drainage passage 3528, it is possible to reduce the measurement error caused by the leakage of the measurement target gas 30 to the outlet port, and thus the measurement can be performed with high accuracy.

In addition, in the embodiment, as illustrated in FIGS. 5(A), 5(B), 6(A), and 6(B), the bypass passage 4232 on the inlet port is formed gradually narrow in its cross-sectional area of the bypass passage 4232 on the inlet port as it goes from the opening of the through hole 3522 of the drainage passage 3528 toward the measurement surface 430 serving as the air flow sensing portion. With this configuration, as described above, after the water and the measurement target gas 30 are separated through the drainage passage 3528, the water and the separated measurement target gas 30 increase in flow velocity and flow out to the measurement surface 430, so that it is possible to perform measurement with high accuracy without an impurity such as water.

In addition, in the embodiment, as illustrated in FIGS. 5(A), 5(B), 6(A), and 6(B), since the inner diameter of the through hole 3522 of the drainage passage 3528 is smaller than that of the bypass passage, it is difficult for the measurement target gas 30 to flow into the drainage passage 3528. Therefore, it is possible to reduce the measurement error caused by the leakage of the measurement target gas 30 to the outlet port, and the measurement can be performed with high accuracy. Further, for example, the inner diameter of the through hole 3522 of the drainage passage 3528 may be set to fall in a range of 1/10 to 1/20 of the inner diameter of the bypass passage. In addition, the shape of the through hole may be formed in a circular shape as illustrated in FIGS. 5(A), 5(B), 6(A), and 6(B), or may be formed in a rectangular or elliptical shape. In addition, since the water 3552 flowing into the inlet port 350 flows along the bypass outer wall 3914 as described above, the through hole 3522 provided in the wall surface 4212 on a side near the bypass passage 4232 on the inlet port is positioned near the outer wall 3914, the water 3552 easily flows to the through hole 3522.

3.2 Structure of Air Flow Sensing Portion of Bypass Passage and Effects Thereof

FIGS. 7(A) and 7(B) are partially enlarged views illustrating a state that the measurement surface 430 of the circuit package 400 is arranged inside the bypass passage trench as a cross-sectional view taken along the line A-A of FIGS. 6(A) and 6(B). It is noted that FIGS. 7(A) and 7(B) are conceptual diagrams omitted and simplified compared to the specific configuration of FIGS. 5(A), 5(B), 6(A), and 6(B), and details may be slightly modified. The left side of FIGS. 7(A) and 7(B) is a terminated end portion of the bypass passage trench on backside 334, and the right side is a starting end portion of the bypass passage trench on frontside 332. Although not illustrated clearly in FIGS. 7(A) and 7(B), the holes 342 and 341 are provided in both the left and right sides of the circuit package 400 having the measurement surface 430, and the bypass passage trench on backside 334 and the bypass passage trench on frontside 332 are connected to the left and right sides of the circuit package 400 having the measurement surface 430.

The measurement target gas 30 that is received from the inlet port 350 and flows through the bypass passage on backside including the bypass passage trench on backside 334 is guided from the left side of FIGS. 7(A) and 7(B). A part of the measurement target gas 30 flows to a flow path 386 including the front side of the measurement surface 430 of the circuit package 400 and the protrusion 356 provided in the front cover 303 through the hole 342. The other measurement target gas 30 flows to a flow path 387 formed by the backside of measurement surface 431 and the rear cover 304. Then, the measurement target gas 30 flowing through the flow path 387 moves to the bypass passage trench on frontside 332 through the hole 341 and is combined with the measurement target gas 30 flowing through the flow path 386, so that it flows through the bypass passage trench on frontside 332 and is discharged from the outlet port 352 to the main passage 124. It is noted that the protrusion 358 provided in the rear cover 304 protrudes to the backside of measurement surface 431 in the flow path 387.

Since the bypass passage trench is formed such that the flow path of the measurement target gas 30 guided to the flow path 386 through the hole 342 from the bypass passage trench on backside 334 is curved wider than the flow path guided to the flow path 387, a substance having a heavy mass such as a contaminant contained in the measurement target gas 30 is gathered in the flow path 387 being less curved. For this reason, there is nearly no flow of the foreign object into the flow path 386.

The flow path 386 is structured to form an orifice such that the front cover 303 is provided successively to the leading end portion of the bypass passage trench on frontside 332, and the protrusion 356 smoothly protrudes to the measurement surface 430 side. The measurement surface 430 is arranged in one side of the orifice portion of the flow path 386. The measurement surface 430 is provided with the heat transfer surface exposing portion 436 for performing heat transfer between the air flow sensing portion 602 and the measurement target gas 30. In order to perform measurement of the air flow sensing portion 602 with high accuracy, the measurement target gas 30 in the heat transfer surface exposing portion 436 preferably makes a laminar flow having a little vortex. In addition, when the flow velocity becomes fast, the measurement accuracy is more improved. For this reason, the orifice is formed such that the protrusion 356 provided in the front cover 303 facing the measurement surface 430 smoothly protrudes to the measurement surface 430. This orifice reduces a vortex in the measurement target gas 30 to approximate the flow to a laminar flow. Furthermore, since the flow velocity increases in the orifice portion, and the heat transfer surface exposing portion 436 for measuring the flow rate is arranged in the orifice portion, the measurement accuracy of the flow rate is improved.

Figure 7:
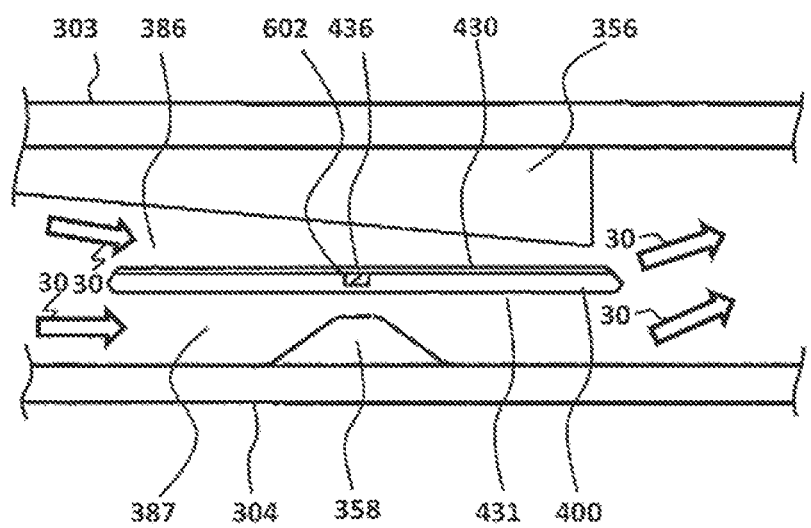
FIG. 7 is a partially enlarged view illustrating a state of a flow path surface arranged in the bypass passage trench.

Since the orifice is formed such that the protrusion 356 protrudes to the inside of the bypass passage trench facing the heat transfer surface exposing portion 436 provided on the measurement surface 430, it is possible to improve measurement accuracy. The protrusion 356 for forming the orifice is provided on the cover facing the heat transfer surface exposing portion 436 provided on the measurement surface 430. In FIG. 7, since the cover facing the heat transfer surface exposing portion 436 provided on the measurement surface 430 is the front cover 303, the heat transfer surface exposing portion 436 is provided in the front cover 303. Alternatively, the protrusion 356 may also be provided in the cover facing the heat transfer surface exposing portion 436 provided on the measurement surface 430 of the front or rear cover 303 or 304. Depending on a surface on which the measurement surface 430 and the heat transfer surface exposing portion 436 in the circuit package 400 are provided, the cover that faces the heat transfer surface exposing portion 436 is changed.

A distribution of the measurement target gas 30 between the flow paths 386 and 387 also relates to the high accuracy measurement. The distribution of the measurement target gas 30 between the flow paths 386 and 387 may be adjusted by causing the protrusion 358 provided in the rear cover 304 to protrude to the flow path 387. In addition, since the orifice portion is provided in the flow path 387, it is possible to increase the flow velocity and guide the foreign object such as a contaminant to the flow path 387. In the embodiment, the orifice formed by the protrusion 358 is used as one of means for adjustment between the flow paths 386 and 387. Alternatively, the aforementioned distribution of the flow rate between the flow paths 386 and 387 may be adjusted by adjusting a width between the backside of measurement surface 431 and the rear cover 304 and the like. In this case, the protrusion 358 provided in the rear cover 304 is not necessary.

Referring to FIGS. 5(A), 5(B), 6(A), and 6(B), a press imprint 442 of the die used in the resin molding process for the circuit package 400 remains on the backside of measurement surface 431 as a rear surface of the heat transfer surface exposing portion 436 provided on the measurement surface 430. The press imprint 442 does not particularly hinder the measurement of the flow rate and does not make any problem even when the press imprint 442 remains. In addition, as described below, it is important to protect a semiconductor diaphragm of the air flow sensing portion 602 when the circuit package 400 is formed through resin molding. For this reason, pressing of the rear surface of the heat transfer surface exposing portion 436 is important. Furthermore, it is important to prevent resin that covers the circuit package 400 from flowing to the heat transfer surface exposing portion 436. For this viewpoint, the inflow of the resin is suppressed by enveloping the measurement surface 430 including the heat transfer surface exposing portion 436 using a die and pressing the rear surface of the heat transfer surface exposing portion 436 using another die. Since the circuit package 400 is made through transfer molding, a pressure of the resin is high, and pressing from the rear surface of the heat transfer surface exposing portion 436 is important. In addition, since a semiconductor diaphragm is used in the air flow sensing portion 602, a ventilation passage for a gap created by the semiconductor diaphragm is preferably formed. In order to hold and fix a plate and the like for forming the ventilation passage, pressing from the rear surface of the heat transfer surface exposing portion 436 is important.

3.3 Shape of Cover of Thermal Flow Meter 300 and Effects Thereof

Figure 8:
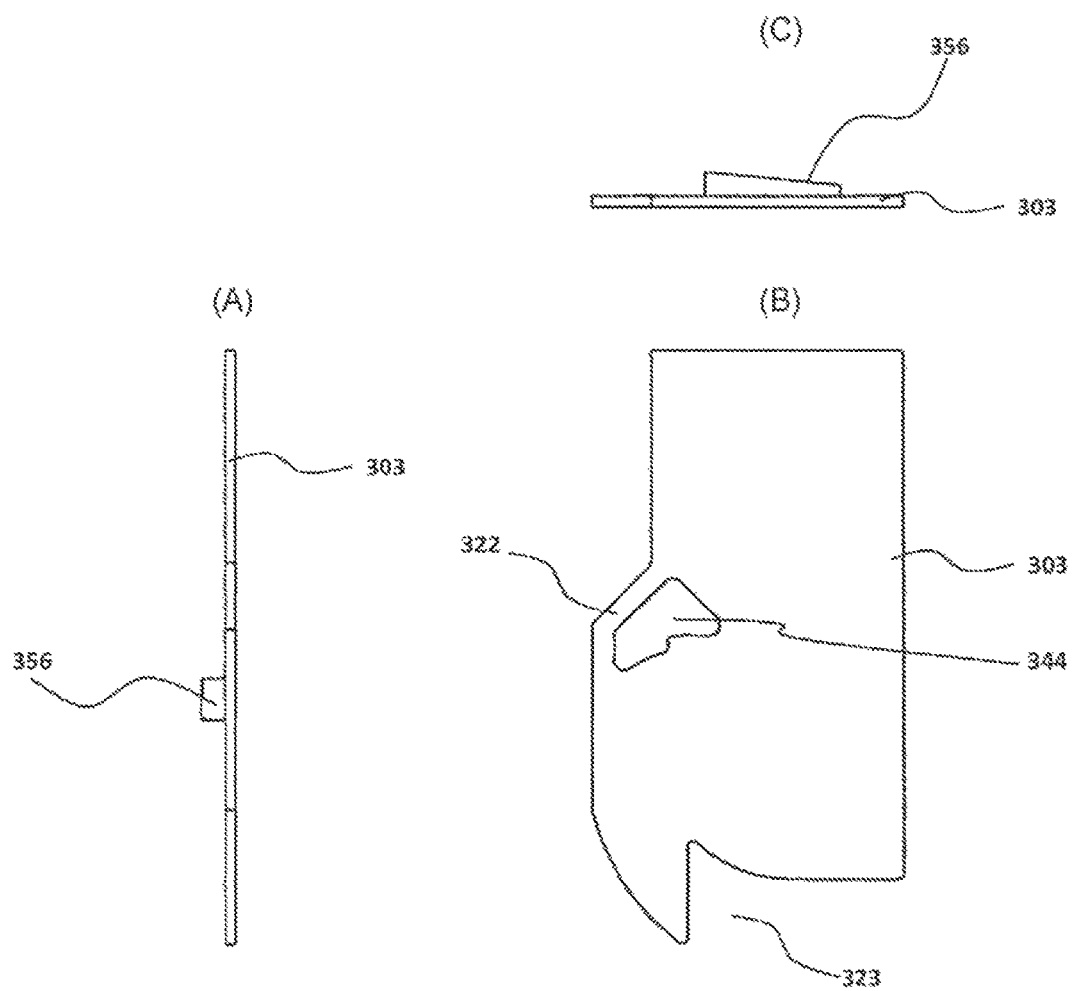
Figure 9:
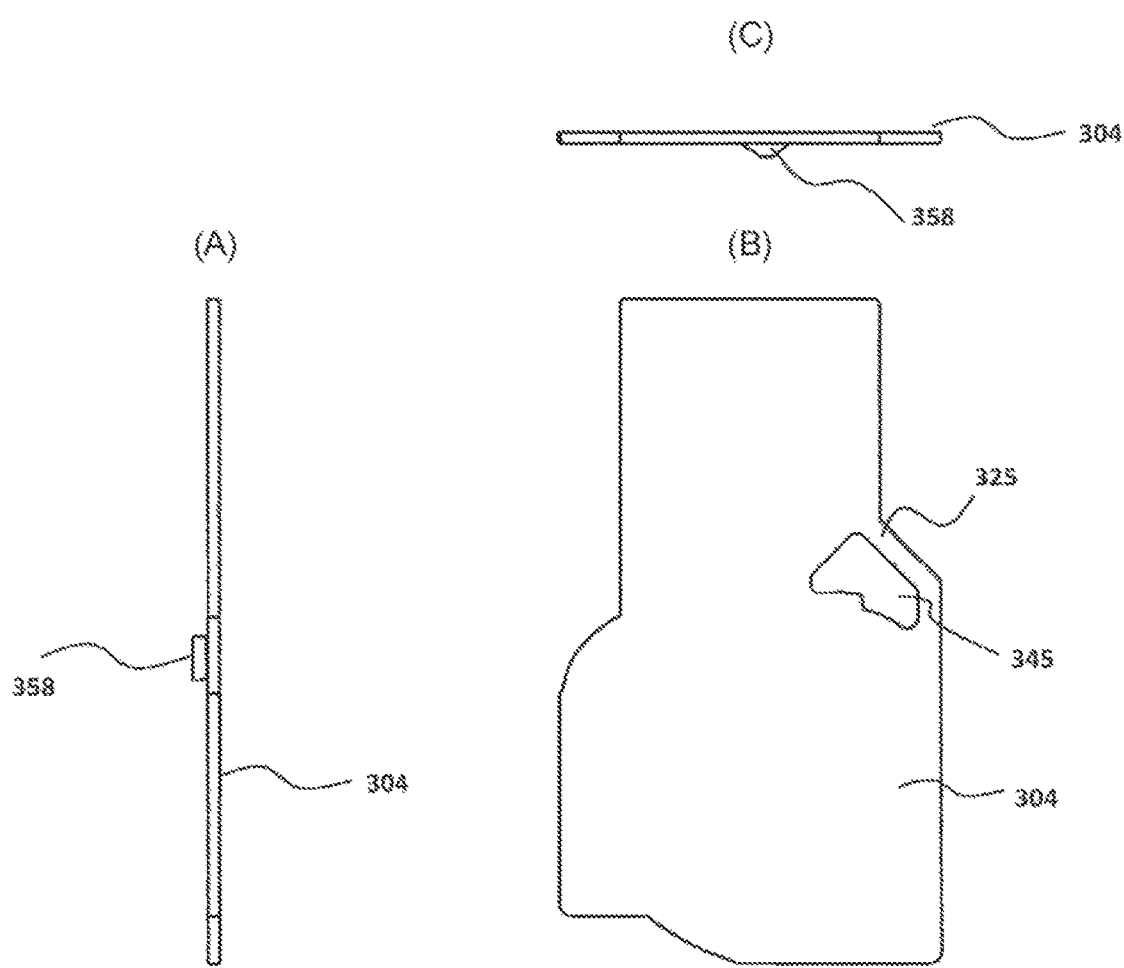

FIGS. 8(A) to 8(C) are diagrams illustrating an appearance of the front cover 303, in which FIG. 8(A) is a left side view, FIG. 8(B) is a front view, and FIG. 8(C) is a plan view. FIGS. 9(A) to 9(C) are diagrams illustrating an appearance of the rear cover 304, in which FIG. 9(A) is a left side view, FIG. 9(B) is a front view, and FIG. 9(C) is a plan view. In FIGS. 8(A), 8(B), 8(C), 9(A), 9(B), and 9(C), the front cover 303 and the rear cover 304 are provided in the front surface and the rear surface of the housing 302. As illustrated in FIGS. 5(A), 5(B), 6(A), and 6(B), the front cover 303 and the rear cover 304 come into close contact with the top portions (that is, the leading end portions in the height direction on the outermost side in the front and rear sides) of the upstream-side outer wall 335 and the downstream-side outer wall 336 serving as the outer walls of the housing 302. In addition, similarly the front cover 303 and the rear cover 304 come into close contact with the leading end portions in the height direction (the outermost side in the front and rear sides of a fixing portion 3721), and further close contact with the flange 312, so that the closed gap 382 is formed therein. Furthermore, the front or rear cover 303 or 304 is used to form the bypass passage by covering the bypass passage trench of the housing 302. In addition, the front or rear cover 303 or 304 is used to provide an orifice provided in the protrusion 356. For this reason, it is preferable to increase molding accuracy. Since the front or rear cover 303 or 304 is formed through a resin molding process by injecting a thermoplastic resin into a die, it is possible to form the front or rear cover 303 or 304 with high molding accuracy.

The front protection portion 322 or the rear protection portion 325 is formed in the front or rear cover 303 or 304 illustrated in FIG. 8(A), 8(B), 8(C), 9(A), 9(B), or 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

The inner side surface of the front cover 303 is provided with the protrusion 356. As illustrated in FIGS. 7(A) and 7(B), the protrusion 356 is arranged to face the measurement surface 430 and has a shape extending along an axis of the flow path of the bypass passage. An orifice is formed in the flow path 386 described above using the measurement surface 430 and the protrusion 356 so as to reduce a vortex generated in the measurement target gas 30 and generate a laminar flow. In this embodiment, the bypass passage having the orifice portion is divided into a trench portion and a lid portion that covers the trench to form a flow path having an orifice, and the trench portion is formed through a second resin molding process for forming the housing 302. Then, the front cover 303 having the protrusion 356 is formed through another resin molding process, and the trench is covered by using the front cover 303 as a lid of the trench to form the bypass passage. In the second resin molding process for forming the housing 302, the circuit package 400 having the measurement surface 430 is also fixed to the housing 302. Since formation of the trench having such a complicated shape is performed through a resin molding process, and a protrusion 356 for the orifice is provided in the front cover 303, it is possible to form the flow path 386 of FIGS. 7(A) and 7(B) with high accuracy. In addition, since an arrangement relationship between the trench and the measurement surface 430 or the heat transfer surface exposing portion 436 can be maintained with high accuracy, it is possible to reduce a variation of the product and as a result obtain a high measurement result. Therefore, it is possible to improve productivity.

This is similarly applied to formation of the flow path 387 using the rear cover 304 and the backside of measurement surface 431. The flow path 387 is divided into a trench portion and a lid portion of the flow path 386. The trench portion is formed through second resin molding process for molding the housing 302 and covered by the rear cover 304 which includes the protrusion 358 so as to form the flow path 387. If the flow path 387 is formed in this manner, it is possible to form the flow path 386 with high accuracy and improve productivity. In addition, although the orifice is provided in the flow path 387 in this embodiment, the flow path 387 without the orifice may also be used in which the protrusion 358 is not used.

In FIG. 8(B), a notch 323 for molding the outlet port 352 is provided on the leading end side of the front cover 303. As illustrated in FIG. 2(B), the outlet port 352 is widened on the front surface side of the housing 302 from the notch 323 as well as the right surface of the housing 302. With this configuration, the fluid resistance of the entire bypass passage is reduced, the measurement target gas 30 guided from the inlet port 350 into the bypass passage is increased. Therefore, the measurement accuracy of the flow rate is improved.

3.4 Structure of Terminal Connector 320 and Effects Thereof

Figure 10:
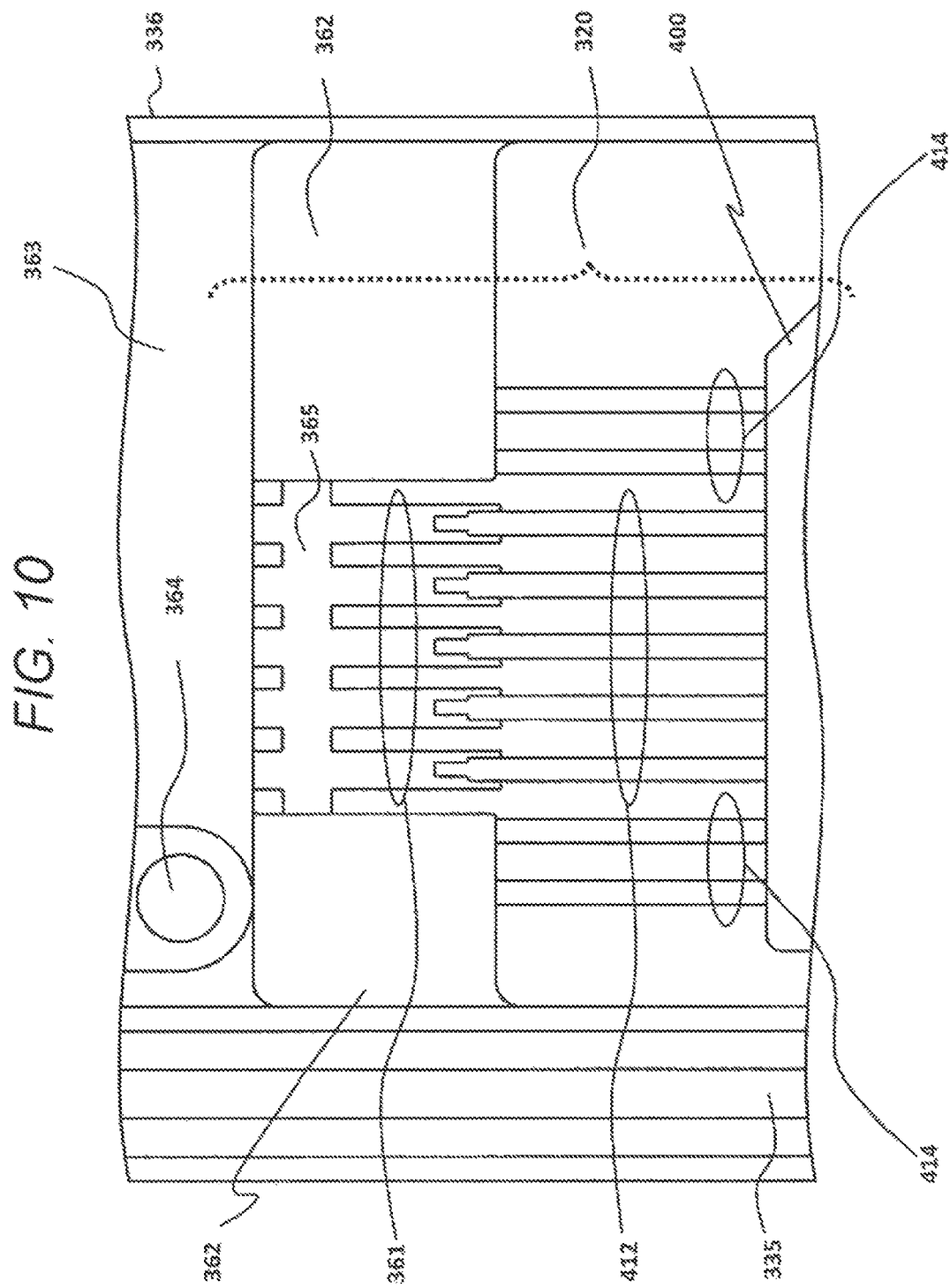
FIG. 10 is a partially enlarged view of a terminal connector.

FIG. 10 is an enlarged view illustrating the terminal connector 320 of the housing 302 of FIGS. 5(A), 5(B), 6(A), and 6(B). However, the terminal connector 320 of FIG. 10 is different from that of FIGS. 5(A), 5(B), 6(A), and 6(B) in the following reasons. Specifically, in FIGS. 5(A), 5(B), 6(A), and 6(B), the inner sockets of external terminals 361 are separated from each other. However, in FIG. 10, the inner sockets of external terminals 361 are not separated from each other but are connected to each other through the link portion 365. While each of the inner sockets of external terminals 361 protruding to the circuit package 400 side of the external terminal 306 are overlapped with or close to the corresponding connection terminals 412, each external terminal 306 is fixed to the housing 302 through resin molding in the second molding process. In order to prevent deformation or a deviation of arrangement of each external terminal 306, according to an embodiment, the external terminal 306 is fixed to the housing 302 through the resin molding process (second resin molding process in the following description) for forming the housing 302 while the inner sockets of external terminals 361 are connected to each other through the link portion 365. Alternatively, the external terminal 306 may be fixed to the housing 302 through the second molding process after the connection terminals 412 and the inner sockets of external terminals 361 are fixed.

3.5 Inspection of Finished Product Through First Resin Molding Process

In the embodiment of FIG. 10, the number of terminals provided in the circuit package 400 is larger than the number of inner sockets of external terminals 361. Out of the terminals of the circuit package 400, each of the connection terminals 412 is connected to each of the inner sockets of external terminals 361, and the terminals 414 are not connected to the inner sockets of external terminals 361. That is, although the terminals 414 are provided in the circuit package 400, they are not connected to the inner sockets of external terminals 361.

In FIG. 10, in addition to the connection terminal 412 connected to the inner socket of external terminal 361, the terminal 414 not connected to the inner socket of external terminal 361 is provided. After the circuit package 400 is produced through the first resin molding process, it is inspected whether or not the circuit package 400 is appropriately operated, and whether or not an abnormality in electrical connection is generated in the first resin molding process. As a result, it is possible to maintain high reliability for each circuit package 400. The terminal 414 not connected to the inner socket of external terminal 361 is used in such an inspection of the circuit package 400. Since the terminal 414 is not used after the inspection work, these unused terminals 414 may be cut out at the base of the circuit package 400 after the inspection or may be buried in the resin serving as the terminal side fixing portion 362 as illustrated in FIG. 10. By providing the terminal 414 not connected to the inner socket of external terminal 361 in this manner, it is possible to inspect whether or not an abnormality is generated in the circuit package 400 produced through the first resin molding process and maintain high reliability.

3.6 Communication Structure (Ventilation Mechanism) Between Gap 382 Inside Housing 302 and Outside and Effects Thereof As illustrated in the partially enlarged view of FIG. 10, a hole 364 is provided in the housing 302. The hole 364 is connected to the opening 309 provided in the inside of the external connector 305 illustrated in FIG. 4(A). According to the embodiment, both sides of the housing 302 are sealed with the front and rear covers 303 and 304. If the hole 364 is not provided, a difference is generated between the air pressure inside the gap 382 and the atmospheric air pressure due to a temperature change of the air inside the gap 382 including the terminal connector 320. It is preferable to reduce such a pressure difference. For this reason, the hole 364 connected to the opening 309 provided in the inside of the external connector 305 is provided inside the gap 382 of the housing 302. The external connector 305 has structure resistant to an adverse effect of water and the like in order to improve reliability of electrical connection. By providing the opening 309 inside the external connector 305, it is possible to prevent intrusion of water and the foreign object such as a contaminant or dust from the opening 309.

4. Structure for Fixing Circuit Package 400 Using Housing 302

4.1 Fixation Structure for Fixing Circuit Package 400 to Housing 302

A fixation structure for fixing the circuit package 400 to the housing 302 will be described using FIGS. 5(A), 5(B), 6(A), and 6(B). The circuit package 400 is embedded with the flow rate detection circuit 601 (refer to FIG. 19) for measuring the flow rate of the measurement target gas 30 flowing through the main passage 124, and fixed to the housing 302 having the bypass passage trench. In the embodiment, the flange 312 and the bypass passage trenches 332 and 334 are connected by the upstream-side outer wall 335 and the downstream-side outer wall 336, a portion forming the bypass passage trench 332 and the bypass passage trench 334 is supported by the flange 312 through the upstream-side outer wall 335 and the downstream-side outer wall 336. Further, the upstream-side outer wall 335 is positioned on the upstream side in the flow of the measurement target gas 30 flowing through the main passage 124, and the downstream-side outer wall 336 is positioned on the downstream side. The fixing portion 3721 is provided to connect the upstream-side outer wall 335 and the downstream-side outer wall 336, and envelops the entire circuit package 400 by the fixing portion 3721 so as to fix the circuit package 400 to the housing 302. Furthermore, the gap 382 surrounded by the upstream-side outer wall 335, the downstream-side outer wall 336, and the flange 312 is formed on a side near the flange of the fixing portion 3721. The bypass passage trenches 332 and 334 are formed on a side near the bypass passage opposite to the flange of the fixing portion 3721, and the bypass passage trenches 332 and 334 are formed to allow the measurement target gas 30 to flow. The fixing portion 3721 operates to maintain airtightness of the gap on a side near the bypass passage.

The outer wall hollow portion 366 provided in the upstream-side outer wall 335 can firmly fix the circuit package 400 still more by using a fixing portion 3723. The above-mentioned fixing portion 3721 envelops the circuit package 400 in a direction (that is, a direction along the long axis of the measurement surface 430) along a flow axis of the measurement target gas 30 in the embodiment in order to connect the upstream-side outer wall 335 and the downstream-side outer wall 336. On the other hand, the outer wall hollow portion 366 of the upstream-side outer wall 335 envelopes the circuit package 400 in a direction crossing the flow axis of the measurement target gas 30. In other words, the fixing portion 3723 is formed different from the fixing portion 3721 in the direction enveloping the circuit package 400, and envelopes the circuit package 400. Since these fixing portions envelope and fix the circuit package 400 in directions different from each other, it is possible to firmly fix the circuit package 400 to the housing 302.

Although the outer wall hollow portion 366 is a part of the upstream-side outer wall 335, the circuit package 400 may be enveloped in a direction different from that of the fixing portion 3721 using the downstream-side outer wall 336 instead of the upstream-side outer wall 335 in order to increase the fixing force. For example, an end portion of the circuit package 400 may be enveloped by the downstream-side outer wall 336, or the circuit package 400 may be enveloped using a hollow hollowed in the upstream direction in the downstream-side outer wall 336 or a protrusion protruding to the upstream direction from the downstream-side outer wall 336. In the embodiment, since the outer wall hollow portion 366 is provided in the upstream-side outer wall 335 to envelop the circuit package 400, it is possible to provide an effect of increasing a thermal resistance between the temperature detecting portion 452 and the upstream-side outer wall 335 in addition to fixation of the circuit package 400. In addition, since the outer wall hollow portion 366 envelopes and fixes the base of the protrusion 424 of the circuit package 400 having the temperature detecting portion 452 (refer to FIG. 11), an operation of protecting the protrusion 424 having the temperature detecting portion 452 (refer to FIG. 11) is also achieved.

The fixing portion 3721 and the fixing portion 3723 have a thick portion and a thin portion in order to reduce a stress added to the circuit package 400. As illustrated in FIG. 5(A) and FIG. 5(B), the fixing portion 3721 includes a thick portion 4714 and a thin portion 4710. The thin portion 4710 is provided such that the resin enveloping the circuit package 400 is formed thin by providing a hollow to the direction of the circuit package 400. The thin portion is further formed on a side near the flange of the thin portion 4710. The thin portion provided on a side near the flange of the thin portion 4710 is formed such that the thickness of the resin enveloping the circuit package 400 is thinner than that of the thick portion 4714, but is formed such that the thickness of the resin enveloping the circuit package 400 is slightly thicker than that of the thin portion 4710. In this way, since the thin portion 4710 and the thin portion on a side near the flange are provided for the thick portion 4714, the fixing portion 3721 secures an area of a predetermined extent for enveloping the circuit package 400 and simultaneously has an effect that the stress added to the circuit package 400 from the fixing portion 3721 can be reduced on the area.

In FIG. 6(B) illustrating the rear surface of FIG. 5(B), the fixing portion 3721 includes the thick portion 4714 and the thin portion formed by a hollow 373. As described above, since the thin portion is provided, the fixing portion 3721 secures the area of a predetermined extent enveloping the circuit package 400 and simultaneously has the effect that the stress added to the circuit package 400 can be reduced on the area. In this way, since the fixing portion 3721 is configured by using the thick portion and the thin portion, the reliability of fixing the circuit package 400 is improved. In other words, the airtightness between the circuit package 400 and the fixing portion 3721 is secured. In addition, in the resin molding process, the stress added from the fixing portion 3721 to the circuit package 400 according to the volumetric shrinkage rising when the fixing portion 3721 is cooled and solidified can be reduced. In addition, since the thin portion is provided, the resin is suppressed from moving during the resin molding process, the temperature decrease of the resin is alleviated and thus a time taken for curing the resin becomes long. The resin of the fixing portion 3721 easily flows into the unevennesses on the surface of the circuit package 400, and thus the airtightness between the circuit package 400 and the fixing portion 3721 is effectively increased.

In addition, since the measurement target gas 30 flows on a side near the bypass passage of the fixing portion 3721, when the airtightness between the circuit package 400 and the fixing portion 3721 is lost, moisture or the like may intrude into the gap 382 in the inside of the housing 302. Since the thin portion is provided, it is possible to increase a contact area between the fixing portion 3721 and the resin of the circuit package 400, the airtightness can be improved, and the intrusion of the moisture into the gap 382 in the inside of the housing 302 can effectively prevented.

In FIGS. 5(B) and 6(B), the upstream-side outer wall 335 includes the outer wall hollow portion 366. The outer wall hollow portion 366 serves as the fixing portion 3723 for fixing the circuit package 400 to the housing 302. The fixing portion 3723 includes a thick portion 4715 and a thin portion 4716. Similarly to the fixing portion 3721, the fixing portion 3723 can secure a wide contact area with respect to the circuit package 400. Furthermore, since the thin portion 4716 applies a less stress on the circuit package 400, it is possible to reduce an influence of the stress applied from the fixing portion 3723 to the circuit package 400. Since the measurement target gas 30 flows on the upstream side of the fixing portion 3723, it is important to secure the airtightness between the fixing portion 3723 and the circuit package 400, and the airtightness between the fixing portion 3723 and the circuit package 400 is easily secured by the thin portion 4716 and the thick portion 4715.

4.2 Structure of Housing 302 Formed by Resin Molding Process

Next, fixation of the circuit package 400 to the housing 302 through a resin molding process will be described again with reference to FIGS. 5(A), 5(B), 6(A), and 6(B). The circuit package 400 is arranged in and fixed to the housing 302 such that the measurement surface 430 formed on the front surface of the circuit package 400 is arranged in a predetermined position of the bypass passage trench for forming the bypass passage, for example, a link portion between the bypass passage trench on frontside 332 and the bypass passage trench on backside 334 in the embodiment of FIGS. 5(A), 5(B), 6(A), and 6(B). The portion where the circuit package 400 is buried and fixed into the housing 302 through the resin molding process is provided on a side near the flange 312 from the bypass passage trench. The circuit package 400 is formed through the first resin molding process which will be described below with reference to FIG. 16. The circuit package 400 formed through the first resin molding process is provided such that when the housing 302 provided with the bypass passage is formed through the second resin molding process, the fixing portion 3721 is formed, and the fixing portion 3721 covers the outer peripheral of the circuit package 400 formed through the first resin molding process to secure and fix the circuit package 400.

As illustrated in FIG. 5(B), a hollow 376 and the hollowed thin portion 4710 are provided in the front surface of the fixing portion 3721. In addition, as illustrated in FIG. 6(B), the hollow 373 serving as the thin portion is formed in the rear surface of the fixing portion 3721. With these hollows, the temperature of the resin can be cooled at the time of forming the fixing portion 3721, and the shrinkage of the volume can be reduced. Therefore, it is possible to reduce the stress added to the circuit package 400. Furthermore, since the flow of the resin is restricted by the die for forming the above-mentioned hollow, the falling speed of the resin temperature can be alleviated, and the resin forming the fixing portion 3721 can easily flow into the unevennesses provided in the surface of the circuit package 400.

The entire surface of the circuit package 400 is not covered by a resin used to form the housing 302, but a portion where the outer wall of the circuit package 400 is exposed is provided in the flange 312 side of the fixing portion 3721. In the embodiment of FIGS. 5(A), 5(B), 6(A), and 6(B), the area of a portion exposed from the resin of the housing 302 but not enveloped by the housing 302 is larger than the area of a portion enveloped by the resin of the housing 302 out of the outer circumferential surface of the circuit package 400. Furthermore, a portion of the measurement surface 430 of the circuit package 400 is also exposed from the resin of the housing 302.

In the second resin molding process for forming the housing 302, the circumference of the circuit package 400 is enveloped by forming the hollow in the front surface or the rear surface of the fixing portion 3721 that covers the outer wall of the circuit package 400 across the entire circumference in a thin band shape. Through the second resin molding process, it is possible to alleviate an excessive stress concentration caused by volume contraction in the course of solidification of the fixing portion 3721. The excessive stress concentration may adversely affect the circuit package 400.

4.3 Improvement of Airtightness Between Housing 302 and Circuit Package 400

In order to more robustly fix the circuit package 400 with a small area by reducing the area of a portion enveloped by the resin of the housing 302 of the outer circumferential surface of the circuit package 400, it is preferable to increase adherence of the circuit package 400 to the outer wall in the fixing portion 3721. When a thermoplastic resin is used to form the housing 302, it is preferable that the thermoplastic resin be penetrated into fine unevennesses on the front surface of the circuit package 400 while it has low viscosity (that is, at a high temperature), and the thermoplastic resin be solidified while it is penetrated into the fine unevennesses of the front surface. In the resin molding process for forming the housing 302, it is preferable that the inlet port of the thermoplastic resin be provided in the fixing portion 3721 and in the vicinity thereof. The viscosity of the thermoplastic resin increases as the temperature decreases, so that the resin is solidified. Therefore, by causing the thermoplastic resin having a high temperature to flow into the fixing portion 3721 or from the vicinity thereof, it is possible to solidify the thermoplastic resin having low viscosity while it abuts on the front surface of the circuit package 400. In addition, by molding the hollow 376, the thin portion 4710 as a hollow, and the hollow 373 to the fixing portion 3721, an obstacle portion for limiting the flow of thermoplastic resin is formed using the die for making these hollows, and thus a movement speed of the thermoplastic resin in the fixing portion 3721 is reduced. As a result, a temperature decrease of the thermoplastic resin is suppressed, and a low viscosity state is maintained, so that adherence between the circuit package 400 and the fixing portion 3721 can be improved.

By roughening the front surface of the circuit package 400, it is possible to improve adherence between the circuit package 400 and the fixing portion 3721. As a method of roughening the front surface of the circuit package 400, there is known a roughening method for forming fine unevennesses on the surface of the circuit package 400, such as a satin-finish treatment, after forming the circuit package 400 through the first resin molding process. As the roughening method for forming fine unevennesses on the surface of the circuit package 400, for example, the roughening may be achieved using sand blasting still more. Furthermore, the roughening may be achieved through a laser machining.

As another roughening method, an uneven sheet is attached on an inner surface of the die used in the first resin molding process, and the resin is pressed to the die having the sheet on the surface. Even using this method, it is possible to form and roughen fine unevennesses on a surface of the circuit package 400. Alternatively, unevennesses may be attached directly on an inner side of the die for forming the circuit package 400 to roughen the surface of the circuit package 400. The surface portion of the circuit package 400 for such roughening is at least a portion where the fixing portion 3721 is provided. In addition, the adherence can be further strengthened by roughening a surface portion of the circuit package 400 where the outer wall hollow portion 366 is provided.

When the unevenness machining is performed for the surface of the circuit package 400 using the aforementioned sheet, the depth of the trench depends on the thickness of the sheet. If the thickness of the sheet increases, the molding of the first resin molding process becomes difficult, so that the thickness of the sheet has a limitation. If the thickness of the sheet decreases, the depth of the unevenness provided on the sheet in advance has a limitation. For this reason, when the aforementioned sheet is used, it is preferable that the depth of the unevenness between the bottom and the top of the unevenness be set to 10 μm or larger and 20 μm or smaller. In the depth smaller than 10 μm, the adherence effect is degraded. The depth larger than 20 μm is difficult to obtain from the aforementioned thickness of the sheet.

In roughening methods other than the aforementioned method of using the sheet, it is preferable to set a thickness of the resin in the first resin molding process for forming the circuit package 400 to 2 mm or smaller. For this reason, it is difficult to increase the depth of the unevenness between the bottom and the top of the unevenness to 1 mm or larger. Conceptually, it is anticipated that adherence between the resin that covers the circuit package 400 and the resin used to form the housing 302 increases as the depth of the unevenness between the bottom and the top of the unevenness on the surface of the circuit package 400 increases. However, for the reason described above, the depth of the unevenness between the bottom and the top of the unevenness is preferably set to 1 mm or smaller. That is, if the unevenness having a thickness of 10 μm or larger and 1 mm or smaller is provided on the surface of the circuit package 400, it is preferable to increase adherence between the resin that covers the circuit package 400 and the resin used to form the housing 302.

A thermal expansion coefficient is different between the thermosetting resin used to form the circuit package 400 and the thermoplastic resin used to form the housing 302 having the fixing portion 3721. It is preferable to prevent an excessive stress generated from this difference of the thermal expansion coefficient from being applied to the circuit package 400. With the hollow 373, the thin portion 4710 as a hollow, and the hollow 376, it is possible to reduce the stress applied to the circuit package 400.

By forming the fixing portion 3721 that envelops the outer circumference of the circuit package 400 in a band shape and narrowing the width of the band, it is possible to alleviate a stress caused by a difference of the thermal expansion coefficient applied to the circuit package 400. A width of the band of the fixing portion 3721 is set to 10 mm or smaller, and preferably 8 mm or smaller. In this embodiment, since the outer wall hollow portion 366 as a part of the upstream-side outer wall 335 of the housing 302 as well as the fixing portion 3721 envelops the circuit package 400 to fix the circuit package 400, it is possible to further reduce the width of the band of the fixing portion 3721. The circuit package 400 can be fixed, for example, if the width is set to 3 mm or larger.

In order to reduce a stress caused by the difference of the thermal expansion coefficient, a portion covered by the resin used to form the housing 302 and an exposed portion without covering are provided on the surface of the circuit package 400. A plurality of portions where the surface of the circuit package 400 is exposed from the resin of the housing 302 are provided, and one of them is to the measurement surface 430 having the heat transfer surface exposing portion 436 described above. In addition, a portion exposed to a part of the flange 312 side relative to the fixing portion 3721 is provided. Furthermore, the outer wall hollow portion 366 is formed to expose a portion of the upstream side relative to the outer wall hollow portion 366, and this exposed portion serves as a support portion that supports the temperature detecting portion 452. A gap is formed such that a portion of the outer surface of the circuit package 400 in the flange 312 side relative to the fixing portion 3721 surrounds the circuit package 400 across its outer circumference, particularly, the side facing the flange 312 from the downstream side of the circuit package 400 and further across the upstream side of the portion close to the terminal of the circuit package 400. Since the gap is formed around the portion where the surface of the circuit package 400 is exposed, it is possible to reduce the heat amount transferred to the circuit package 400 through the flange 312 from the main passage 124 and suppress degradation of measurement accuracy caused by the heat.

A gap is formed between the circuit package 400 and the flange 312, and this gap serves as a terminal connector 320. The connection terminal 412 of the circuit package 400 and the inner socket of external terminal 361 positioned in the housing 302 side of the external terminal 306 are electrically connected to each other using this terminal connector 320 through spot welding, laser welding, and the like. The gap of the terminal connector 320 can suppress heat transfer from the housing 302 to the circuit package 400 as described above and is provided as a space that can be used to perform a connection work between the connection terminal 412 of the circuit package 400 and the inner socket of external terminal 361 of the external terminal 306.

4.4 Formation of Housing 302 Through Second Resin Molding Process and Improvement of Measurement Accuracy In the housing 302 illustrated in FIGS. 5(A), 5(B), 6(A), and 6(B) described above, the circuit package 400 having the air flow sensing portion 602 or the processing unit 604 is manufactured through the first resin molding process. Then, the housing 302 having, for example, the bypass passage trench on frontside 332 or the bypass passage trench on backside 334 for forming the bypass passage where the measurement target gas 30 flows is manufactured through the second resin molding process. Through this second resin molding process, the circuit package 400 is embedded into the resin of the housing 302 and is fixed to the inside of the housing 302 through resin molding. As a result, the air flow sensing portion 602 performs heat transfer with the measurement target gas 30, so that a configuration relationship such as a positional relationship or a directional relationship between the heat transfer surface exposing portion 436 for measuring the flow rate and the bypass passage including, for example, the bypass passage trench on frontside 332 or the bypass passage trench on backside 334 can be maintained with remarkably high accuracy. In addition, it is possible to suppress an error or a deviation generated in each production of the circuit package 400 to a very small value. In addition, when a relationship between the circuit package 400 and the bypass passage through which the measurement target gas 30 flows is fixed through the second resin molding process, the relationship does not vary thereafter. When the fixing is made using an adhesive as in the related art, the relationship may slightly vary even after production. As described in the embodiment, in a case where the relationship between the circuit package 400 and the bypass passage through which the measurement target gas 30 flows does not vary, it is possible to secure very high accuracy by correcting the deviation after the production. As a result, it is possible to remarkably improve measurement accuracy of the circuit package 400. For example, compared to a conventional method in which fixation is performed using an adhesive, it is possible to improve measurement accuracy twice or more. Since the thermal flow meter 300 is typically manufactured in large quantities, it is difficult to use an adhesive while performing strict measurement in each production process and there is a limitation in improvement of measurement accuracy. However, if the circuit package 400 is manufactured through the first resin molding process as in this embodiment, and the bypass passage is then formed in the second resin molding process for forming the bypass passage where the measurement target gas 30 flows while the circuit package 400 and the bypass passage are fixed, it is possible to remarkably reduce a variation of the measurement accuracy and remarkably improve the measurement accuracy of each thermal flow meter 300. This similarly applies to the embodiment of FIG. 7 and the subsequent embodiments as well as the embodiment of FIG. 5(A), 5(B), 6(A), or 6(B).

Further referring to the embodiment of, for example, FIG. 5(A), 5(B), 6(A), or 6(B), it is possible to fix the circuit package 400 to the housing 302 such that a relationship between the bypass passage trench on frontside 332, the bypass passage trench on backside 334, and the heat transfer surface exposing portion 436 is set to a defined relationship. As a result, in each of the thermal flow meters 300 produced in large quantities, a positional relationship or a configuration relationship between the heat transfer surface exposing portion 436 of each circuit package 400 and the bypass passage can be maintained with remarkably high accuracy. The bypass passage trench where the heat transfer surface exposing portion 436 of the circuit package 400 is fixed, for example, the bypass passage trench on frontside 332 and the bypass passage trench on backside 334 can be formed with remarkably high accuracy. In order to form the bypass passage in this bypass passage trench, there is required a work for covering both sides of the housing 302 using the front or rear cover 303 or 304. This work is very simple and is a work process having a few factors of degrading the measurement accuracy. In addition, the front or rear cover 303 or 304 is produced through a resin molding process having high formation accuracy. Therefore, it is possible to form the bypass passage provided in a specific relationship with the heat transfer surface exposing portion 436 of the circuit package 400 with high accuracy. In this manner, it is possible to obtain high productivity in addition to improvement of measurement accuracy.

In comparison, in the related art, the thermal flow meter was produced by fabricating the bypass passage and then bonding the air flow sensing portion for measuring the flow rate to the bypass passage using an adhesive. Such a method of using an adhesive is disadvantageous since a thickness of the adhesive is irregular, and a position or angle of the adhesive is different in each product. For this reason, there was a limitation in improvement of the measurement accuracy. If this work is performed in mass production, it is further difficult to improve the measurement accuracy.

In the embodiment according to the invention, first, the circuit package 400 having the air flow sensing portion 602 is produced through a first resin molding process, and the circuit package 400 is then fixed through resin molding while the bypass passage trench for forming the bypass passage through resin molding is formed through a second resin molding process. As a result, it is possible to form the shape of the bypass passage trench and fix the air flow sensing portion 602 of the flow rate detection circuit 601 (refer to FIG. 19) to the bypass passage trench with significantly high accuracy.

A portion relating to the measurement of the flow rate, such as the heat transfer surface exposing portion 436 of the air flow sensing portion 602 or the measurement surface 430 installed in the heat transfer surface exposing portion 436, is formed on the surface of the circuit package 400. Then, the measurement surface 430 and the heat transfer surface exposing portion 436 are exposed from the resin used to form the housing 302. That is, the heat transfer surface exposing portion 436 and the measurement surface 430 around the heat transfer surface exposing portion 436 are not covered by the resin used to form the housing 302. The measurement surface 430 formed through the resin molding of the circuit package 400 or the heat transfer surface exposing portion 436 is directly used even after the resin molding of the housing 302 to measure a flow rate of the thermal flow meter 300 or a temperature. As a result, the measurement accuracy is improved.

In the embodiment according to the invention, the circuit package 400 is integrally formed with the housing 302 to fix the circuit package 400 to the housing 302 having the bypass passage. Therefore, it is possible to fix the circuit package 400 to the housing 302 with a small fixation area. That is, it is possible to increase the surface area of the circuit package 400 that does not make contact with the housing 302. The surface of the circuit package 400 that does not make contact with the housing 302 is exposed to, for example, a gap. The heat of the intake pipe is transferred to the housing 302 and is then transferred from the housing 302 to the circuit package 400. Even if the contact area between the housing 302 and the circuit package 400 is reduced instead of enveloping the entire surface or most of the surface of the circuit package 400 with the housing 302, it is possible to maintain high reliability with high accuracy and fix the circuit package 400 to the housing 302. For this reason, it is possible to suppress heat transfer from the housing 302 to the circuit package 400 and suppress a decrease of the measurement accuracy caused by the above-mentioned heat transfer.

In the embodiment illustrated in FIG. 5(A), 5(B), 6(A), or 6(B), the area A of the exposed surface of the circuit package 400 can be set to be equal to or larger than the area B covered by a molding material used to form the housing 302. In the embodiment, the area A is larger than the area B. As a result, it is possible to suppress heat transfer from the housing 302 to the circuit package 400. In addition, it is possible to reduce a stress generated by a difference between a thermal expansion coefficient of the thermosetting resin used to form the circuit package 400 and a thermal expansion coefficient of the thermoplastic resin used to form the housing 302.

4.5 Fixation of Circuit Package 400 Through Second Resin Molding Process and Effects Thereof In FIGS. 11(A) to 11(C), the hatching portion indicates a fixation surface 432 and a fixation surface 434 for covering the circuit package 400 using the thermoplastic resin used in the second resin molding process to fix the circuit package 400 to the housing 302 in the second resin molding process. As described above in relation to FIG. 5(A), 5(B), 6(A), or 6(B), it is important to maintain high accuracy to provide a specific relationship between the measurement surface 430, the heat transfer surface exposing portion 436 provided in the measurement surface 430, and the shape of the bypass passage. In the second resin molding process, the bypass passage is formed, and the circuit package 400 is fixed to the housing 302 that forms the bypass passage. Therefore, it is possible to maintain a relationship between the bypass passage, the measurement surface 430, and the heat transfer surface exposing portion 436 with significantly high accuracy. That is, since the circuit package 400 is fixed to the housing 302 in the second resin molding process, it is possible to position and fix the circuit package 400 into the die used to form the housing 302 having the bypass passage with high accuracy. By injecting a thermoplastic resin having a high temperature into this die, the bypass passage is formed with high accuracy, and the circuit package 400 is fixed by the fixing portion 3721 and the fixing portion 3723 with high accuracy.

In this embodiment, the entire surface of the circuit package 400 is not a fixation surface 432 covered by the resin used to form the housing 302, but the front surface is exposed to the connection terminal 412 side of the circuit package 400. That is, a portion not covered by the resin used to form the housing 302 is provided. In the embodiment illustrated in FIGS. 11(A) to 11(C), in the front surface of the circuit package 400, the area that is not enveloped by the resin used to form the housing 302 but is exposed from the resin used to form the housing 302 is larger than the areas of the fixation surface 432 and the fixation surface 434 enveloped by the resin used to form the housing 302.

A thermal expansion coefficient is different between the thermosetting resin used to form the circuit package 400 and the thermoplastic resin used to form the housing 302 having the fixing portion 3721. It is preferable to prevent a stress caused by this difference of the thermal expansion coefficient from being applied to the circuit package 400 as long as possible. By reducing the front surface of the circuit package 400 and the fixation surface 432, it is possible to reduce influence based on the difference of the thermal expansion coefficient. For example, it is possible to reduce the fixation surface 432 on the front surface of the circuit package 400 by providing a band shape having a width L. In addition, since the thick portion and the thin portion are provided in the fixing portion 3721 and the fixing portion 3723 covering the fixation surface 432 as described above, the stress applied to the surface of the circuit package 400 can be suppressed based on the thin portion. Further, it is possible to suppress that a large stress is applied to the circuit package 400. Even though the airtightness between the fixing portion 3723 and the fixation surface 432 of the circuit package 400 is increased by making the fixation surface 432 relatively wide, it is possible to reduce the influence of the stress to the circuit package 400 by suppressing the stress using the thin portion. Since the flow rate detection circuit 601 is embedded in the circuit package 400, when a large stress is applied to the circuit package 400, the flow rate detection circuit 601 may be adversely influenced, the measurement accuracy of the flow rate may be reduced, and in some cases a failure in its operation may occur. However, such influences can be reduced.

It is possible to increase a mechanical strength of the protrusion 424 by providing the fixation surface 432 in the base of the protrusion 424. It is possible to more robustly fix the circuit package 400 and the housing 302 to each other by providing, on the front surface of the circuit package 400, a band-shaped fixation surface along a flow axis of the measurement target gas 30 and a fixation surface across the flow axis of the measurement target gas 30. On the fixation surface 432, a portion surrounding the circuit package 400 in a band shape having a width L along the measurement surface 430 is the fixation surface along the flow axis of the measurement target gas 30 described above, and a portion that covers the base of the protrusion 424 is the fixation surface across the flow axis of the measurement target gas 30. These both fixation surfaces are enveloped by the fixing portion 3721 or the fixing portion 3723 having the thick portion and the thin portion and fixed to the housing 302.

In FIGS. 11(A), 11(B), and 11(C), the circuit package 400 is formed through the first resin molding process as described above. It is noted that the hatching portion in the appearance of the circuit package 400 indicates the fixation surface 432 and the fixation surface 434 where the circuit package 400 is covered by the resin used in the second resin molding process when the housing 302 is formed through the second resin molding process after the circuit package 400 is manufactured through the first resin molding process. FIG. 11(A) is a left side view illustrating the circuit package 400, FIG. 11(B) is a front view illustrating the circuit package 400, and the FIG. 11(C) is a rear view illustrating the circuit package 400. The circuit package 400 is embedded with the air flow sensing portion 602 or the processing unit 604 described below, and they are integrally molded using a thermosetting resin. On the surface of the circuit package 400 of FIG. 11(B), the measurement surface 430 serving as a plane for the flow of the measurement target gas 30 is formed in a shape extending in a flow direction of the measurement target gas 30. In this embodiment, the measurement surface 430 has a rectangular shape extending in the flow direction of the measurement target gas 30. The measurement surface 430 is formed to be thinner than other portions as illustrated in FIG. 11(A), and a part thereof is provided with the heat transfer surface exposing portion 436. The embedded air flow sensing portion 602 performs heat transfer to the measurement target gas 30 through the heat transfer surface exposing portion 436 to measure a condition of the measurement target gas 30 such as a flow velocity of the measurement target gas 30 and output an electric signal representing the flow rate of the main passage 124.

In order to measure a condition of the measurement target gas 30 with high accuracy using the embedded air flow sensing portion 602 (refer to FIGS. 19 and 20), the gas flowing through the vicinity of the heat transfer surface exposing portion 436 preferably makes a laminar flow having a little vortex. For this reason, it is preferable that there be no height difference between the flow path side surface of the heat transfer surface exposing portion 436 and the plane of the measurement surface 430 that guides the gas. In this configuration, it is possible to suppress an irregular stress or a distortion from being applied to the air flow sensing portion 602 while maintaining high flow rate measurement accuracy. It is noted that the aforementioned height difference may be provided if it does not affect the flow rate measurement accuracy.

On the rear surface of the measurement surface 430 of the heat transfer surface exposing portion 436, a press imprint 442 of the die that supports an internal substrate or plate during the resin molding of the circuit package 400 remains as illustrated in FIG. 11(C). The heat transfer surface exposing portion 436 is used to perform heat exchange with the measurement target gas 30. In order to accurately measure a condition of the measurement target gas 30, it is preferable to appropriately perform heat transfer between the air flow sensing portion 602 and the measurement target gas 30. For this reason, it is necessary to avoid a part of the heat transfer surface exposing portion 436 from being covered by the resin in the first resin molding process. Dies are installed in both the heat transfer surface exposing portion 436 and the backside of measurement surface 431 as a rear surface thereof, and an inflow of the resin to the heat transfer surface exposing portion 436 is prevented using this die. A press imprint 442 having a concave shape is formed on the rear surface of the heat transfer surface exposing portion 436. In this portion, it is preferable to arrange a device serving as the air flow sensing portion 602 or the like in the vicinity to discharge the heat generated from the device to the outside as much as possible. The formed concave portion is less influenced by the resin and easily discharges heat.

The heat transfer surface exposing portion 436 is internally provided with the semiconductor diaphragm serving as the air flow sensing portion 602, and a gap is molded in the rear surface of the semiconductor diaphragm. The semiconductor diaphragm can be obtained by forming a gap on the rear surface of the air flow sensing portion 602. If the gap is covered, the semiconductor diaphragm is deformed, and the measurement accuracy is degraded due to a change of the pressure inside the gap caused by a change of the temperature. For this reason, in this embodiment, an opening 438 communicating with the gap of the rear surface of the semiconductor diaphragm is provided on the front surface of the circuit package 400, and a link channel for linking the gap of the rear surface of the semiconductor diaphragm and the opening 438 is provided inside the circuit package 400. It is noted that the opening 438 is provided in the portion not hatched in FIGS. 11(A) to 11(C) in order to prevent the opening 438 from being covered by the resin through the second resin molding process.

The opening 438 is formed through the first resin molding process. An inflow of the resin to the portion of the opening 438 is suppressed by matching dies to both a portion of the opening 438 and a rear surface thereof and pressing the dies. Thus, the opening 438 is formed. Formation of the opening 438 and the link channel that connects the gap on the rear surface of the semiconductor diaphragm and the opening 438 will be described below.

In the circuit package 400, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By molding a portion of the heat transfer surface exposing portion 436 in this manner, it is possible to measure the flow rate of the measurement target gas 30 with significantly high accuracy. In addition, since the resin does not remain at all or less in the portion of the press imprint 442 through the second resin molding process, a hear radiation effect is increased. In a case where a second plate 536 is used as the lead, the neighboring circuits can be effectively heated and radiated through the lead.

Figure 12:
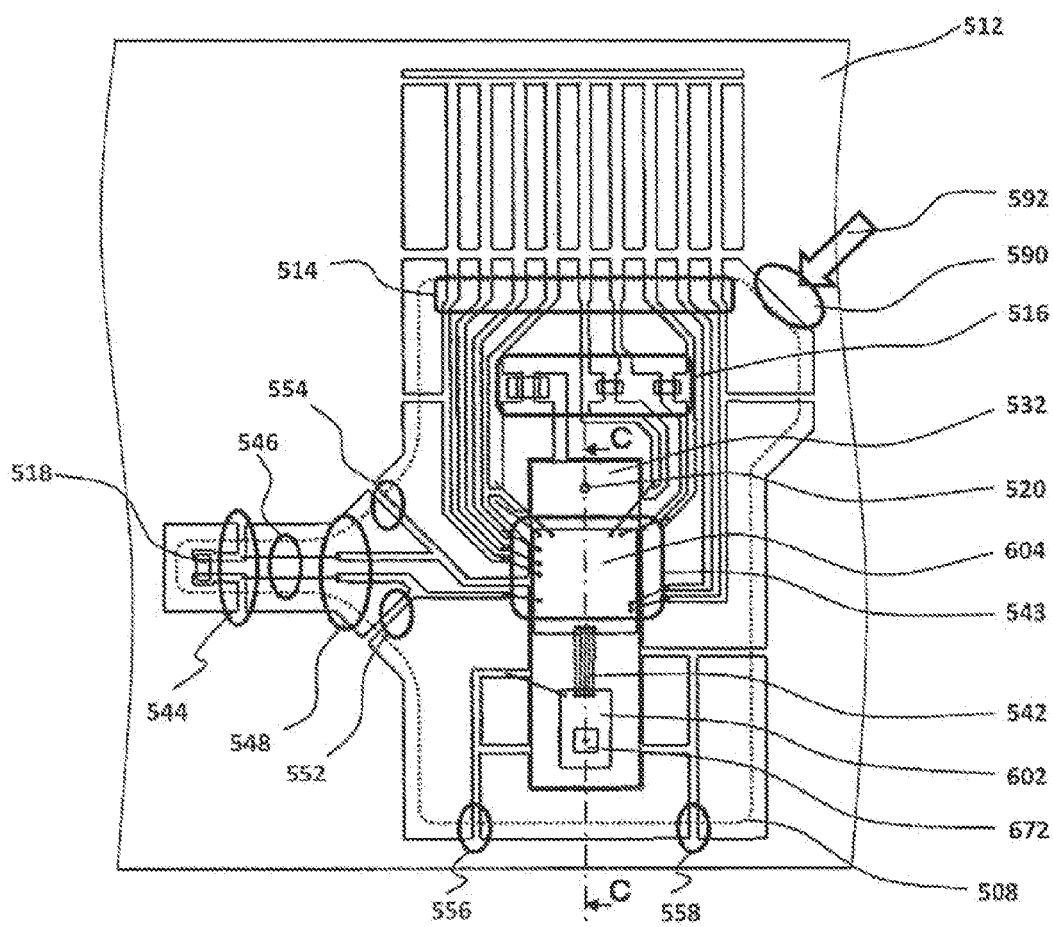
FIG. 12 is a diagram illustrating a state that circuit components are mounted on a frame of the circuit package.

5. Mounting of Circuit Components to Circuit Package 5.1 Mounting Frame and Circuit Components of Circuit Package FIG. 12 illustrates a frame 512 of the circuit package 400 and a mounting state of a chip as a circuit component 516 mounted on the frame 512. It is noted that the dotted line 508 indicates a portion covered by the die used to mold the circuit package 400. A lead 514 is mechanically connected to the frame 512, and a plate 532 is mounted in the center of the frame 512. A chip-like air flow sensing portion 602 and a processing unit 604 as a larger scale integrated (LSI) circuit are mounted on the plate 532. A diaphragm 672 is provided in the air flow sensing portion 602. Each terminal of the air flow sensing portion 602 described below and the processing unit 604 are connected using a wire 542. Moreover, each terminal of the processing unit 604 and a corresponding lead 514 are connected using a wire 543. In addition, the lead 514 positioned between a portion corresponding to the connection terminal of the circuit package 400 and the plate 532 is connected to the chip-like circuit component 516 therebetween.

The air flow sensing portion 602 having the diaphragm 672 is arranged in the most leading end side when the circuit package 400 is obtained in this manner. The processing unit 604 is arranged in the side corresponding to the connection terminal for the air flow sensing portion 602 in an LSI state. In addition, a connection wire 543 is arranged in the terminal side of the processing unit 604. By sequentially arranging the air flow sensing portion 602, the processing unit 604, the wire 543, the circuit component 516, and the connection lead 514 in this order from the leading end side of the circuit package 400 to the connection terminal, the entire circuit package 400 becomes simple and concise.

A thick lead is provided to support the plate 532, and this lead is fixed to the frame 512 using the lead 556 or 558. It is noted that a lead surface having the same area as that of the plate 532 connected to the thick lead is provided on the lower surface of the plate 532, and the plate 532 is mounted on the lead surface. This lead surface is grounded. As a result, it is possible to suppress noise by commonly grounding the circuit of the air flow sensing portion 602 or the processing unit 604 using the lead surface, so that measurement accuracy of the measurement target gas 30 is improved. In addition, a lead 544 is provided in the upstream side of the flow path from the plate 532, that is, so as to protrude along an axis directed across the axis of the air flow sensing portion 602, the processing unit 604, or the circuit component 516 described above. A temperature detection element 518, for example, a chip-like thermistor is connected to this lead 544. In addition, a lead 548 is provided in the vicinity of the processing unit 604 which is a base of the protrusion, and the leads 544 and 548 are electrically connected using a thin connection line 546. As the leads 548 and 544 are directly connected, the heat is transferred to the temperature detection element 518 through the leads 548 and 544, so that it may be difficult to accurately measure a temperature of the measurement target gas 30. For this reason, by connecting a wire having a small cross-sectional area and a large thermal resistance, it is possible to increase a thermal resistance between the leads 548 and 544. As a result, it is possible to improve temperature measurement accuracy of the measurement target gas 30 so as to prevent influence of the heat from reaching the temperature detection element 518.

The lead 548 is fixed to the frame 512 through the lead 552 or 554. A connection portion between the lead 552 or 554 and the frame 512 is fixed to the frame 512 while it is inclined against the protruding direction of the protruding temperature detection element 518, and the die is also inclined in this area. As the molding resin flows along in this inclination in the first resin molding process, the molding resin of the first resin molding process smoothly flows to the leading end portion where the temperature detection element 518 is provided, so that reliability is improved.

In FIG. 12, an arrow 592 indicates a resin injection direction. The lead frame where a circuit component is mounted is covered by the die, and a pressed fitting hole 590 for resin injection to the die is provided in a circled position, so that a thermosetting resin is injected into the die along the direction of the arrow 592. The circuit component 516 or the temperature detection element 518 and the lead 544 for holding the temperature detection element 518 are provided along the direction of the arrow 592 from the pressed fitting hole 590. In addition, the plate 532, the processing unit 604, and the air flow sensing portion 602 are arranged in a direction close to the arrow 592. In this arrangement, the resin smoothly flows in the first resin molding process. In the first resin molding process, a thermosetting resin is used, so that it is important to widen the resin before solidification. For this reason, arrangement of a circuit component of the lead 514 or a wire and a relationship between the pressed fitting hole 590 and the injection direction become important.

Figure 13:
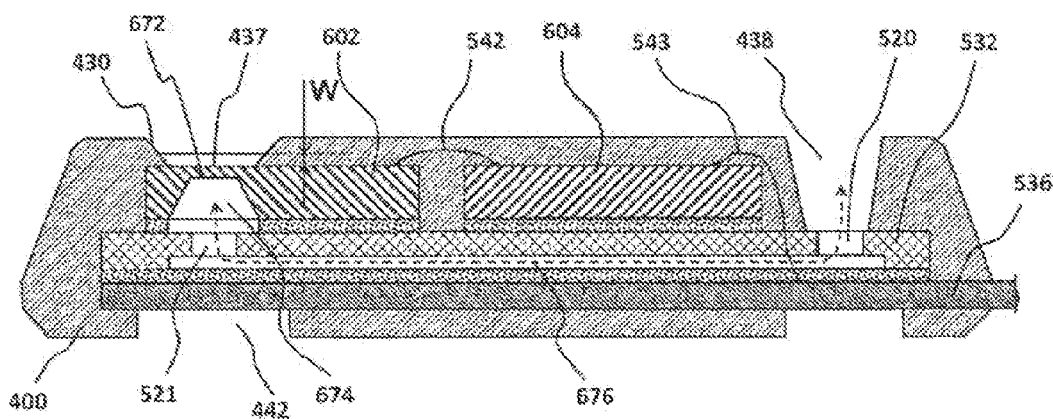
FIG. 13 is an explanatory diagram illustrating a diaphragm and a link channel that connects an opening and a gap inside the diaphragm.

5.2 Structure for Connecting Gap on Rear Surface of Diaphragm and Opening and Effects Thereof FIG. 13 is a diagram illustrating a part of the cross section taken along a line C-C of FIG. 12 for describing a communication hole 676 that connects a gap 674 provided inside the diaphragm 672 and the air flow sensing portion (flow rate detecting element) 602 and the hole 520. As described below, the air flow sensing portion 602 for measuring the flow rate of the measurement target gas 30 is provided with a diaphragm 672, and a gap 674 is provided on the rear surface of the diaphragm 672. Although not illustrated, the diaphragm 672 is provided with an element for exchanging heat with the measurement target gas 30 and measuring the flow rate thereby. If the heat is transferred to the elements formed in the diaphragm 672 through the diaphragm 672 separately from the heat exchange with the measurement target gas 30, it is difficult to accurately measure the flow rate. For this reason, it is preferable to increase a thermal resistance of the diaphragm 672 and form the diaphragm 672 as thin as possible.

The air flow sensing portion (flow rate detection element) 602 is buried and fixed into the thermosetting resin of the circuit package 400 formed through the first resin molding process such that the heat transfer surface 437 of the diaphragm 672 is exposed. The surface of the diaphragm 672 is provided with the elements (not illustrated) described above. The elements perform heat transfer with the measurement target gas 30 (not illustrated) through the heat transfer surface 437 on the surface of the elements in the heat transfer surface exposing portion 436 corresponding to the diaphragm 672. The heat transfer surface 437 may be provided on the surface of each element or may be provided with a thin protection film thereon. It is preferable that heat transfer between the elements and the measurement target gas 30 be smoothly performed, and direct heat transfers between the elements should be reduced as much as possible.

A portion of the air flow sensing portion (flow rate detection element) 602 where the elements are provided is arranged in the heat transfer surface exposing portion 436 of the measurement surface 430, and the heat transfer surface 437 is exposed from the resin used to form the measurement surface 430. The outer circumference of the air flow sensing portion (flow rate detection element) 602 is covered by the thermosetting resin used in the first resin molding process for forming the measurement surface 430. If only the side face of the air flow sensing portion (flow rate detection element) 602 is covered by the thermosetting resin, and the surface side of the outer circumference of the air flow sensing portion (flow rate detection element) 602 is not covered by the thermosetting resin, a stress generated in the resin used to form the measurement surface 430 is received only by the side face of the air flow sensing portion (flow rate detection element) 602, so that a distortion may generated in the diaphragm 672, and characteristics may be deteriorated. The distortion of the diaphragm 672 is reduced by covering the outer circumference portion of the air flow sensing portion (flow rate detection element) 602 with the thermosetting resin as illustrated in FIG. 13. Meanwhile, if a height difference between the heat transfer surface 437 and the measurement surface 430 where the measurement target gas 30 flows is large, the flow of the measurement target gas 30 is disturbed, so that measurement accuracy is degraded. Therefore, it is preferable that a height difference W between the heat transfer surface 437 and the measurement surface 430 where the measurement target gas 30 flows be small.

The diaphragm 672 is formed thin in order to suppress heat transfer between the respective elements, and a gap 674 is formed in the rear surface of the air flow sensing portion (flow rate detection element) 602. If this gap 674 is sealed, a pressure of the gap 674 formed on the rear surface of the diaphragm 672 changes depending on a temperature change. As a pressure difference between the gap 674 and the surface of the diaphragm 672 increases, the diaphragm 672 receives the pressure, and a distortion is generated, so that high accuracy measurement becomes difficult. For this reason, a hole 520 connected to the opening 438 (refer to FIGS. 11(A), 11(B), 11(C), 15(A), and 15(B)) opened to the outside is provided in the plate 532, and a communication hole 676 that connects this hole 520 and the gap 674 is provided. This communication hole 676 is formed by, for example, a pair of plates including first and second plates 534 and 536. The first plate 534 is provided with holes 520 and 521 and a trench for forming the communication hole 676. The communication hole 676 is formed by covering the trench and the holes 520 and 521 with the second plate 536. Using the communication hole 676 and the hole 520, the pressures applied to the front and rear surfaces of the diaphragm 672 becomes approximately equal, so that the measurement accuracy is improved.

As described above, the communication hole 676 can be formed by covering the trench and the holes 520 and 521 with the second plate 536. Alternatively, the lead frame may be used as second plate 536. As described in relation to FIG. 12, the diaphragm 672 and the LSI circuit serving as the processing unit 604 are provided on the plate 532. A lead frame for supporting the plate 532 where the diaphragm 672 and the processing unit 604 are mounted is provided thereunder. Therefore, using the lead frame, the structure becomes simpler. In addition, the lead frame may be used as a ground electrode. If the lead frame serves as the second plate 536, and the communication hole 676 is formed by covering the holes 520 and 521 formed in the first plate 534 using the lead frame and covering the trench formed in the first plate 534 using the lead frame in this manner, it is possible to simplify the entire structure. In addition, it is possible to reduce influence of noise from the outside of the diaphragm 672 and the processing unit 604 because the lead frame serves as a ground electrode.

Figure 11:
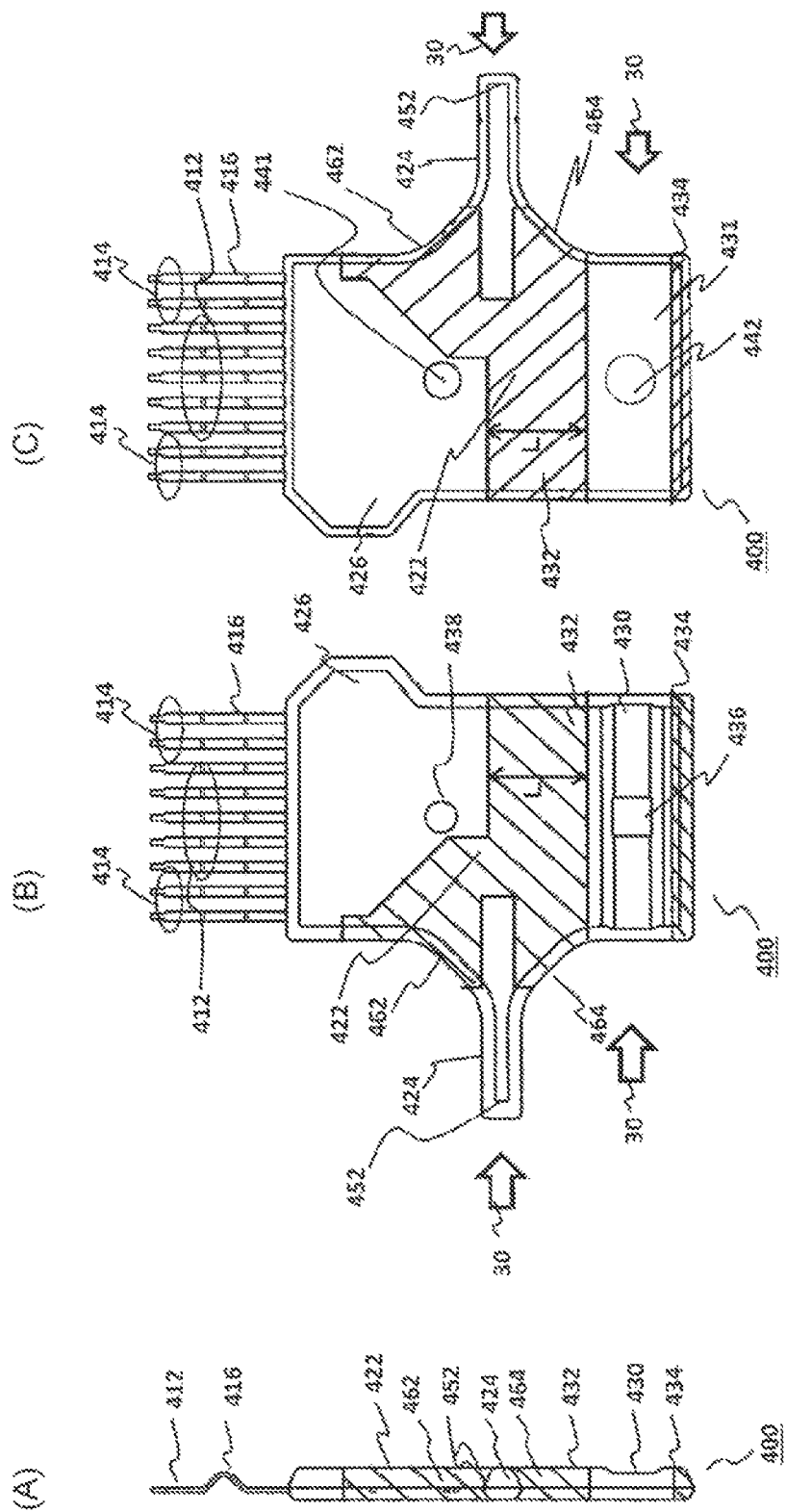

In the circuit package 400 illustrated in FIG. 11, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high accuracy.

Figure 14:
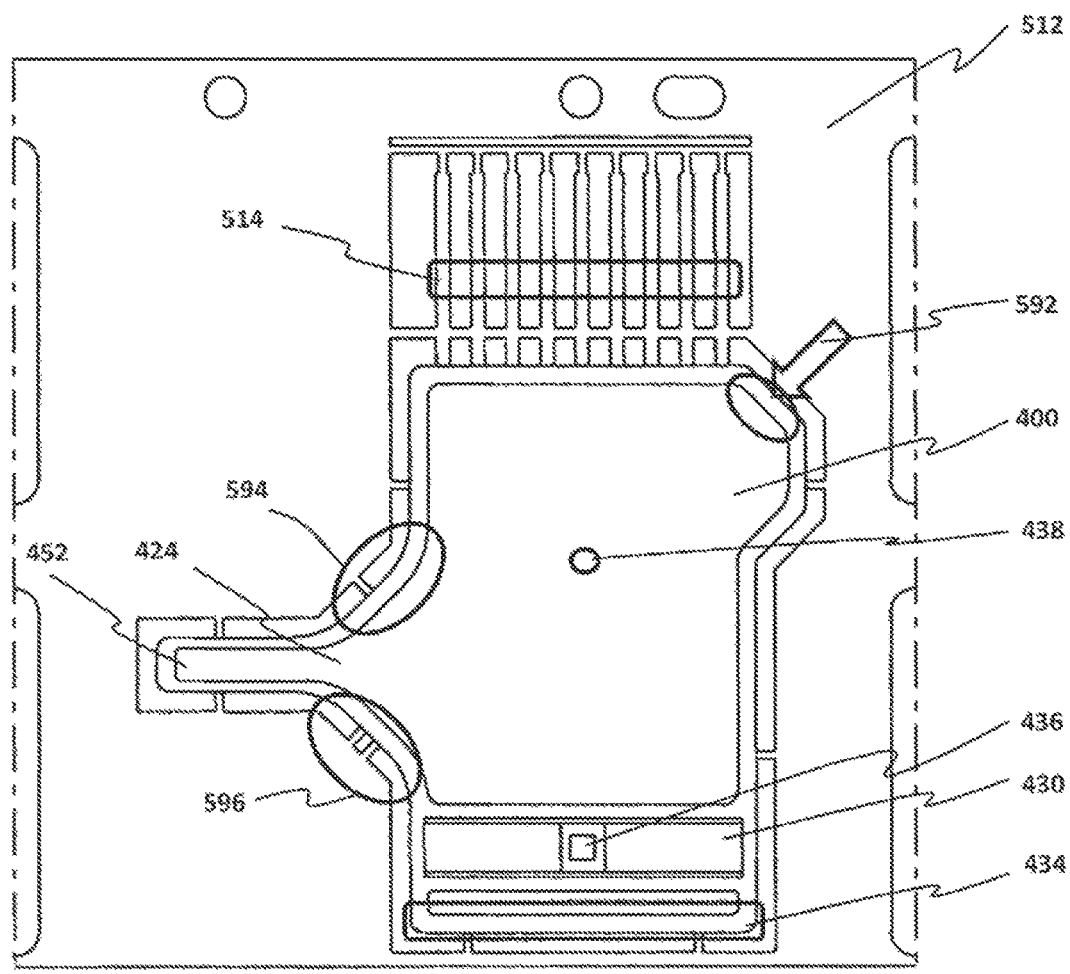
FIG. 14 is a diagram illustrating a condition of the circuit package after a first resin molding process.

FIG. 14 illustrates a state that the frame of FIG. 12 is molded with a thermosetting resin through the first resin molding process and is covered by the thermosetting resin. Through this molding, the measurement surface 430 is formed on the front surface of the circuit package 400, and the heat transfer surface exposing portion 436 is provided on the measurement surface 430. In addition, the gap 674 on the rear surface of the diaphragm 672 arranged inside the heat transfer surface exposing portion 436 is connected to the opening 438. The temperature detecting portion 452 for measuring a temperature of the measurement target gas 30 is provided in the leading end of the protrusion 424, and the temperature detection element 518 (refer to FIG. 12) is embedded inside. As illustrated in FIG. 12, inside the protrusion 424, in order to suppress heat transfer, a lead for extracting the electric signal of the temperature detection element 518 is segmented, and a connection line 546 having a large thermal resistance is arranged. As a result, it is possible to suppress heat transfer from the base of the protrusion 424 to the temperature detecting portion 452 and influence from the heat.

A slope portion 594 or 596 is formed in the base of the protrusion 424 in FIG. 14. A flow of the resin in the first resin molding process becomes smooth. In addition, the measurement target gas 30 measured by the temperature detecting portion 452 smoothly flows from the protrusion 424 to its base using the slope portion 594 or 596 while the temperature detecting portion 452 is installed and operated in a vehicle, so as to cool the base of the protrusion 424. Therefore, it is possible to reduce influence of the heat to the temperature detecting portion 452. After the state of FIG. 14, the lead 514 is separated from each terminal so as to be the connection terminal 412 or the terminal 414.

In the first resin molding process, it is necessary to prevent an inflow of the resin to the heat transfer surface exposing portion 436 or the opening 438. For this reason, in the first resin molding process, an inflow of the resin is suppressed in a position of the heat transfer surface exposing portion 436 or the opening 438. For example, an insertion die larger than the diaphragm 672 is installed, and a press is installed in the rear surface thereof, so that it is pressed from both surfaces. In FIG. 11(C), the press imprint 442 or 441 remains on the rear surface corresponding to the heat transfer surface exposing portion 436 or the opening 438 of FIG. 14 or the heat transfer surface exposing portion 436 or the opening 438 of FIG. 11(B).

In FIG. 14, a cutout surface of the lead separated from the frame 512 is exposed from the resin surface, so that moisture or the like may intrude into the inside on the cutout surface of the lead during the use. It is important to prevent such a problem from the viewpoint of durability or reliability. For example, a portion of the fixation surface 434 of FIG. 14 is covered by the resin through the second resin molding process, and the cutout surface is exposed. In addition, the lead cutout portion of the slope portion 594 or 596 is covered by the resin through the second resin molding process, and the cutout surface between the lead 552 or 554 and the frame 512 illustrated in FIG. 12 is covered by the resin. As a result, it is possible to prevent erosion of the lead 552 or 554 or intrusion of water from the cutout portion. The cutout portion of the lead 552 or 554 adjoins an important lead portion that transmits the electric signal of the temperature detecting portion 452. Therefore, it is preferable that the cutout portion be covered in the second resin molding process.

5.3 Another Embodiment of Circuit Package 400 and Effects Thereof

FIGS. 15(A) and 15(B) illustrate another embodiment of the circuit package 400, in which FIG. 15(A) is a front view of the circuit package 400 and FIG. 15(B) is a rear view. Like reference numerals denote like elements as in other drawings, and the description will be made about only a part thereof for the sake of avoiding the complexity. In the embodiment described above in relation to FIGS. 11(A) to 11(C), the connection terminal 412 and the terminal 414 of the circuit package 400 are provided in the same side of the circuit package 400. In comparison, in the embodiment of FIGS. 15(A) and 15(B), the connection terminal 412 and the terminal 414 are provided in different sides. The terminal 414 is a terminal not connected to the connection terminal connected to the outside in the thermal flow meter 300. If the connection terminal 412 connected to the outside in the thermal flow meter 300 and the terminal 414 not connected to the outside are provided in different directions in this manner, it is possible to widen a distance between the connection terminal 412 and the terminal and improve workability. In addition, if the terminal 414 extends to a direction different from that of the connection terminal 412, it is possible to prevent the lead inside the frame 512 of FIG. 12 from being concentrated on a part and facilitate arrangement of the lead inside the frame 512. In particular, a chip capacitor as the circuit component 516 is connected to a portion of the lead corresponding to the connection terminal 412. A slightly large space is necessary to provide such a circuit component 516. In the embodiment of FIGS. 15(A) and 15(B), it is possible to easily obtain a space for the lead corresponding to the connection terminal 412.

Figure 15:
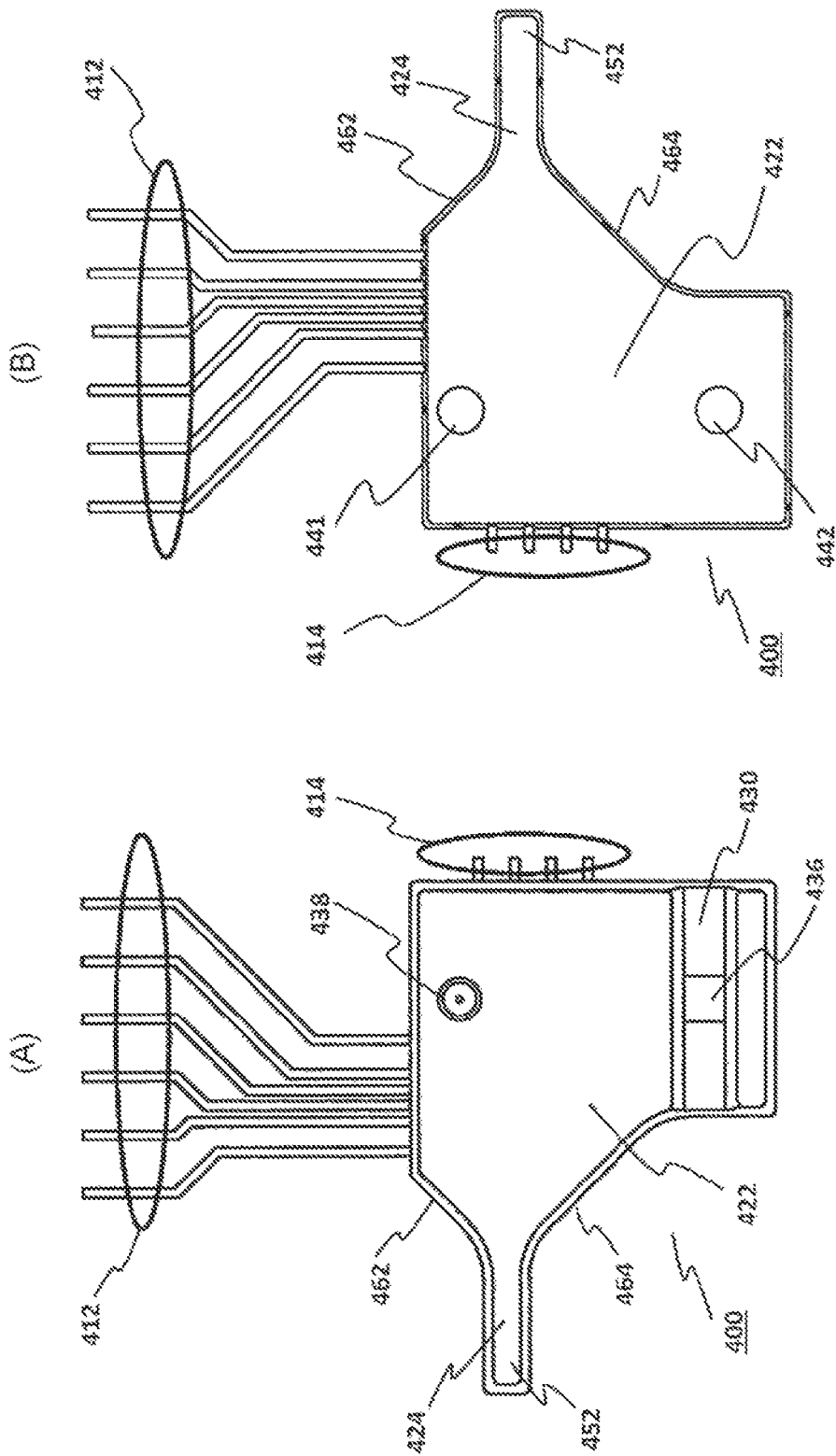

Similarly to the circuit package 400 illustrated in FIG. 11, the circuit package 400 illustrated in FIG. 15 is provided with a slope portion 462 and a slope portion 464 having a smoothly-changing thickness. The slope portions are molded in the neck portion of the protrusion 424 protruding from a package body 422. The effects of these configurations are equal to those described with reference to FIG. 11. In other words, in FIG. 15, the protrusion 424 protrudes in a shape extending to the upstream direction of the measurement target gas 30 from the side surface of the package body 422. The temperature detecting portion 452 is provided in the leading end portion of the protrusion 424, and the temperature detection element 518 is buried in the inside of the temperature detecting portion 452. The slope portions 462 and 464 are provided in a portion connecting the protrusion 424 and the package body 422. The protrusion 424 is formed such that the base thereof becomes thick by the slope portion 462 or the slope portion 464, and the neck portion of the protrusion 424 is formed gradually thin as it goes to the leading end direction. In other words, assuming that the protruding direction is an axis, the neck portion of the protrusion 424 is provided such that a cross-sectional area crossing the axis in the protruding direction is formed gradually reduced as it goes to the leading end of the protrusion 424.

With such a shape, in a case where the circuit package 400 is molded through the resin molding, it is possible to use a method of attaching a sheet inside the die for the purpose of protection of the element. In this case, the sheet and the inner surface of the die abut securely, so that the reliability of the circuit package 400 is improved. In addition, the mechanical strength of the protrusion 424 is weak, so that it may be easily folded. The protrusion 424 is made thick in its base portion, and has the shape being gradually thin as it goes to the leading end direction, so that the stress concentration on the base can be alleviated and the mechanical strength becomes excellent. In addition, in a case where the protrusion 424 is formed through the resin molding, the protrusion is easily bent under the influence of a volume change when the resin is solidified. Such an influence can be reduced. In order to detect the temperature of the measurement target gas 30 as accurate as possible, it is preferable that the protrusion be formed long. The heat transfer from the package body 422 onto the temperature detection element 518 provided in the temperature detecting portion 452 becomes easily reduced by forming the protrusion 424 long.

As illustrated in FIGS. 11(B) and 11(C), in another embodiment illustrated in FIGS. 15(A) and 15(B), the base of the protrusion 424 is formed thick and the base of the protrusion 424 is surrounded by the housing 302, and thus the circuit package 400 is fixed to the housing 302. In this way, since the base of the protrusion 424 is covered with the resin of the housing 302, it is possible to prevent the protrusion 424 from taking damage due to the mechanical impact. In addition, various effects described with reference to FIG. 11 are achieved.

Descriptions for the opening 438, the heat transfer surface exposing portion 436, the measurement surface 430, the press imprint 441, and the press imprint 442 in FIGS. 15(A) and 15(B) are similar to those described above, and they have the same functional effects. Detailed descriptions will not be repeated for simplicity purposes.

6. Process of Producing Thermal Flow Meter 300

6.1 Process of Producing Circuit Package 400

Figure 16:
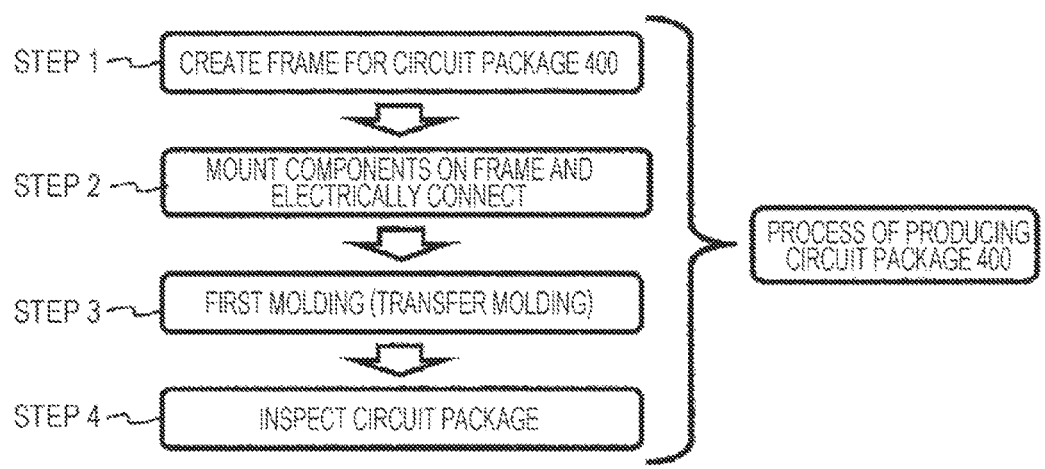
FIG. 16 is a diagram illustrating a production process of the circuit package.
Figure 17:
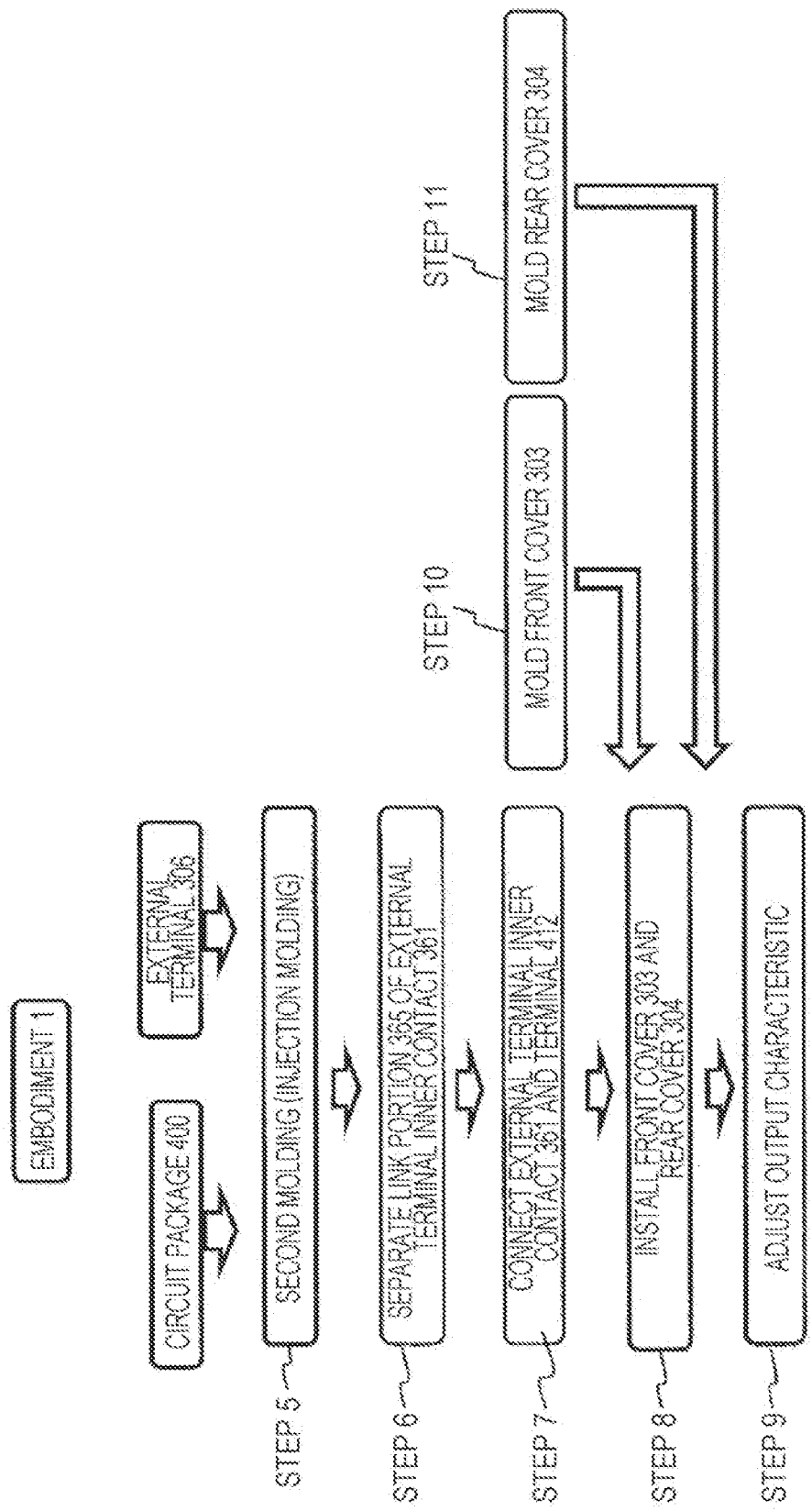
FIG. 17 is a diagram illustrating a production process of the thermal flow meter.
Figure 18:
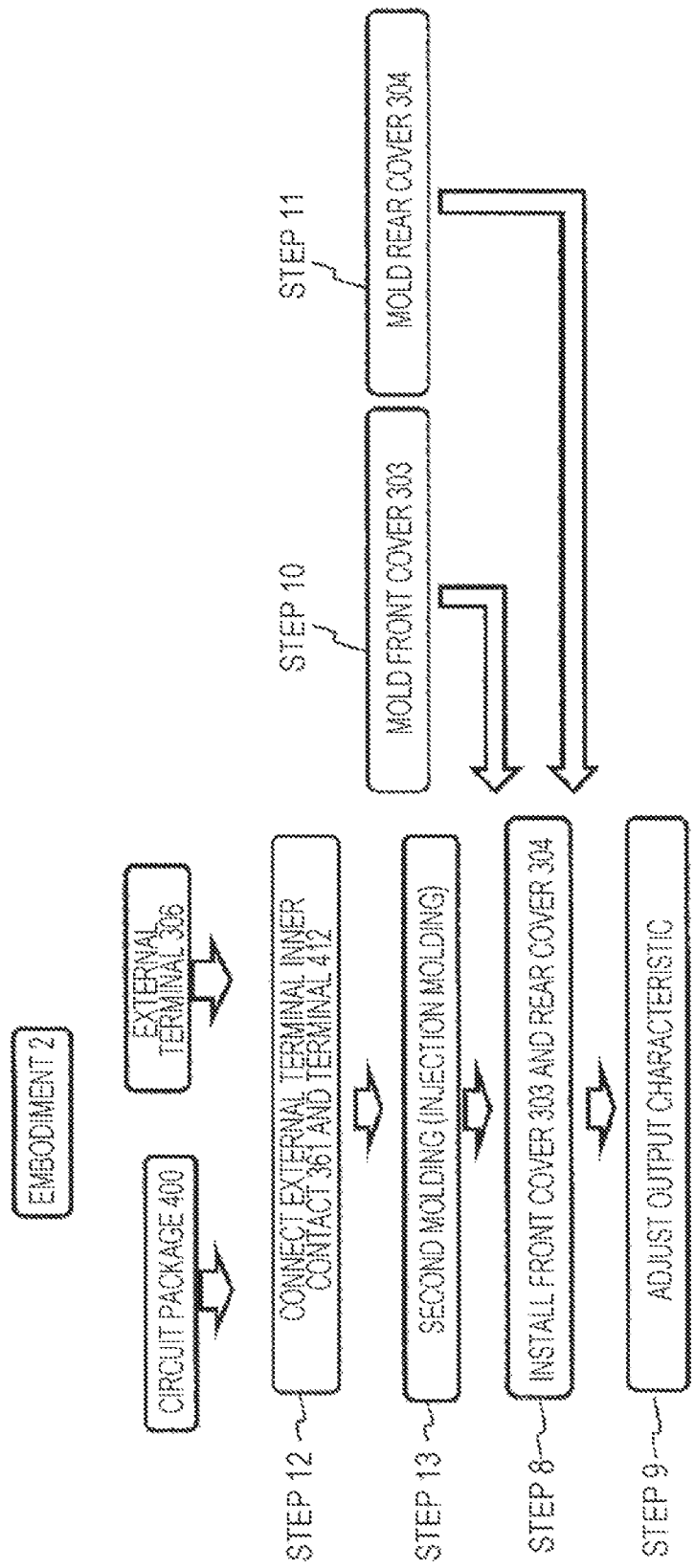
FIG. 18 is a diagram illustrating another embodiment of the production process of the thermal flow meter.

FIG. 16 illustrates a process of producing the circuit package 400 in a process of producing the thermal flow meter 300. FIG. 17 illustrates a process of producing the thermal flow meter 300, and FIG. 18 illustrates another embodiment of a process of producing the thermal flow meter 300. In FIG. 16, step 1 shows a process of producing a frame of FIG. 12. This frame is formed, for example, through press machining. In step 2, the plate 532 is first mounted on the frame obtained through the step 1, and the air flow sensing portion 602 or the processing unit 604 is further mounted on the plate 532. Then, the temperature detection element 518 and the circuit component such as a chip capacitor are mounted. In step 2, electrical wiring is performed between circuit components, between the circuit component and the lead, and between the leads. In step 2, the leads 544 and 548 are connected using a connection line 546 for increasing a thermal resistance. In step 2, the circuit component illustrated in FIG. 12 is mounted on the frame 512, and the electrical wiring is further performed, so that an electric circuit is formed.

Then, in step 3, through the first resin molding process, the electric circuit illustrated in FIG. 12 in which the circuit components are mounted and electrically connected is molded by a thermosetting resin, and the circuit package 400 is produced. The circuit package 400 in a molded state is illustrated in FIG. 14. In addition, in step 3, each of the connected leads is separated from the frame 512, and the leads are separated from each other, so that the circuit package 400 of FIG. 11(A), 11(B), 11(C), 15(A), or 15(B) is obtained. In this circuit package 400, as illustrated in FIG. 11(A), 11(B), 11(C), 15(A), or 15(B), the measurement surface 430 or the heat transfer surface exposing portion 436 is formed. Another embodiment of the circuit package 400 illustrated in FIGS. 15(A) and 15(B) is equal to the basic producing method.

In step 4, a visual inspection or an operational inspection is performed for the obtained circuit package 400. In the first resin molding process of step 3, transfer molding is performed. The electric circuit obtained in step 2 is fixed to the inside of the die, and a high temperature resin is injected into the die with a high pressure. Therefore, it is preferable to inspect whether or not there is an abnormality in the electric component or the electric wiring. For this inspection, the terminal 414 is used in addition to the connection terminal 412 of FIG. 11(A), 11(B), 11(C), 15(A), or 15(B). It is noted that, since the terminal 414 is not used thereafter, it may be cut out from the base after this inspection. For example, referring to FIGS. 15(A) and 15(B), the terminal 414 is cut out from the base after the use.

6.2 Process of Producing Thermal Flow Meter 300 and Calibration of Measurement Characteristics In FIG. 17, the circuit package 400 already produced according to FIG. 16 and the external terminal 306 already produced according to a method (not illustrated) are used. In step 5, the housing 302 is formed through the second resin molding process. In this housing 302, a bypass passage trench formed of resin, the flange 312, and the external connector 305 are formed, and the hatching portion of the circuit package 400 illustrated in FIGS. 11(A) to 11(C) is covered by the resin in the second resin molding process, so that the circuit package 400 is fixed to the housing 302. By combining the production (step 3) of the circuit package 400 through the first resin molding process and the formation of the housing 302 of the thermal flow meter 300 through the second resin molding process, the flow rate detection accuracy is remarkably improved. In step 6, each inner socket of external terminal 361 of FIG. 10 is separated. In step 7, the connection terminal 412 and the inner socket of external terminal 361 are connected.

First, as described with reference to FIGS. 5(B) and 6(B), the fixing portion 3721 and the fixing portion 3723 for fixing the circuit package 400 to the housing 302 includes the thin portion 4710 and the thin portion 4716 in addition to the thick portion 4714 and the thick portion 4715. When both the fixing portion 3721 and the fixing portion 3723 enveloping the circuit package 400 are formed by the thick portion, a large force is applied to the surface of the circuit package 400 due to the shrinkage of the resin according to a decrease in temperature of the discharged resin in the second resin molding process in step 5 of FIG. 17. When a large force is applied to the surface of the circuit package 400 by the shrinkage of the resin forming the fixing portion 3721 or the fixing portion 3723, the electric circuit embedded in the circuit package 400 illustrated in FIG. 12 may be damaged. In the embodiment, since the fixing portion 3721 or the fixing portion 3723 is partially formed thin not only by the thick portion, the thickness of the resin formed in the second resin molding process of covering the surface of the circuit package 400 is made by the thin portion. Therefore, a force applied on the surface of the circuit package 400 becomes small. Alternatively, a force applied on a unit area of the circuit package 400 becomes small. Therefore, the electric circuit embedded in the circuit package 400 illustrated in FIG. 12 is less damaged.

In addition, in the housing 302, when the fixing portion 3721 or the fixing portion 3723 of the housing 302 is largely shrank, the housing 302 may be bent or distorted. In particular, the fixing portion 3721 or the fixing portion 3723 is connected to the upstream-side outer wall 335 or the downstream-side outer wall 336 which connects the bypass passage and the flange 312, and a force caused by the shrinkage of the fixing portion 3721 or the fixing portion 3723 is applied to the upstream-side outer wall 335 or the downstream-side outer wall 336. Since the upstream-side outer wall 335 and the downstream-side outer wall 336 are formed in an elongated shape, the distortion or the bending occurs easily. Since the thin portion is provided, a force applied to the upstream-side outer wall 335 or the downstream-side outer wall 336 can be reduced or distributed, so that it is possible to suppress the bending or the distortion of the upstream-side outer wall 335 or the downstream-side outer wall 336.

The housing 302 is obtained in step 7. Then, in step 8, the front and rear covers 303 and 304 are installed in the housing 302, so that the inside of the housing 302 is sealed with the front and rear covers 303 and 304, the bypass passage for flowing the measurement target gas 30 is completed, and the thermal flow meter 300 is obtained. In addition, an orifice structure described in relation to FIG. 7 is formed by the protrusion 356 or the protrusion 358 provided in the front or rear cover 303 or 304. It is noted that the front cover 303 is formed through the molding of step 10, and the rear cover 304 is formed through the molding of step 11. In addition, the front and rear covers 303 and 304 are formed through separate processes using different dies.

In step 9, a characteristic test on the flow rate of the measurement target gas 30 is performed by guiding a given amount of gas to the bypass passage of the completed thermal flow meter 300 in practice. Since a relationship between the bypass passage and the air flow sensing portion is maintained with high accuracy as described above, significantly high measurement accuracy is obtained by performing a characteristic calibration to obtain accurate measurement characteristics based on the characteristic test on the flow rate. In addition, since the molding is performed with a positioning or configuration relationship between the bypass passage and the air flow sensing portion is determined through the first resin molding process and the second resin molding process, the characteristic does not change much even in a long time use, and high reliability is obtained in addition to the high accuracy.

6.3 Another Embodiment of Process of Producing Thermal Flow Meter 300

FIG. 18 is another embodiment for producing the thermal flow meter 300. In FIG. 18, the circuit package 400 already produced as illustrated in FIG. 16 and the external terminal 306 already produced according to a method (not illustrated) are used, and in step 12 before the second resin molding process, the connection terminal 412 of the circuit package 400 and the inner socket of external terminal 361 are connected. In this case or in the process prior to step 12, each inner socket of external terminal 361 illustrated in FIG. 10 is separated. In step 13, the housing 302 is formed through the second resin molding process. In the housing 302, the resin bypass passage trench, the flange 312, and the external connector 305 are formed, and the hatching portion of the circuit package 400 illustrated in FIGS. 11(A) to 11(C) is covered by the resin in the second resin molding process, so that the circuit package 400 is fixed to the housing 302. By combining production (step 3) of the circuit package 400 through the first resin molding process and formation of the housing 302 of the thermal flow meter 300 through the second resin molding process, the flow rate detection accuracy is remarkably improved as described above.

As the housing 302 is obtained in step 13, then, in step 8, the front and rear covers 303 and 304 are installed in the housing 302, and the inside of the housing 302 is sealed with the front and rear covers 303 and 304, so that the bypass passage for flowing the measurement target gas 30 is obtained. In addition, the orifice structure described in relation to FIG. 7 is formed by the protrusion 356 or the protrusion 358 provided in the front or rear cover 303 or 304. As described above, it is noted that the front cover 303 is formed through the molding of step 10, and the rear cover 304 is formed through the molding of step 11. In addition, the front and rear covers 303 and 304 are formed through separate processes using different dies.

In step 9, a characteristic test is performed by guiding a regulated amount of air to the bypass passage in practice. Since a relationship between the bypass passage and the air flow sensing portion is maintained with high accuracy as described above, significantly high measurement accuracy is obtained by performing a characteristic calibration through a characteristic test. In addition, since the molding is performed with a positioning or configuration relationship between the bypass passage and the air flow sensing portion is determined through the first resin molding process and the second resin molding process, the characteristic does not change much even after using for a long time, and high reliability is obtained in addition to the high accuracy. Furthermore, the above-mentioned various effects are obtained by using FIG. 17.

7. Circuit Configuration of Thermal Flow Meter 300

7.1 Overview of Circuit Configuration of Thermal Flow Meter 300

Figure 19:
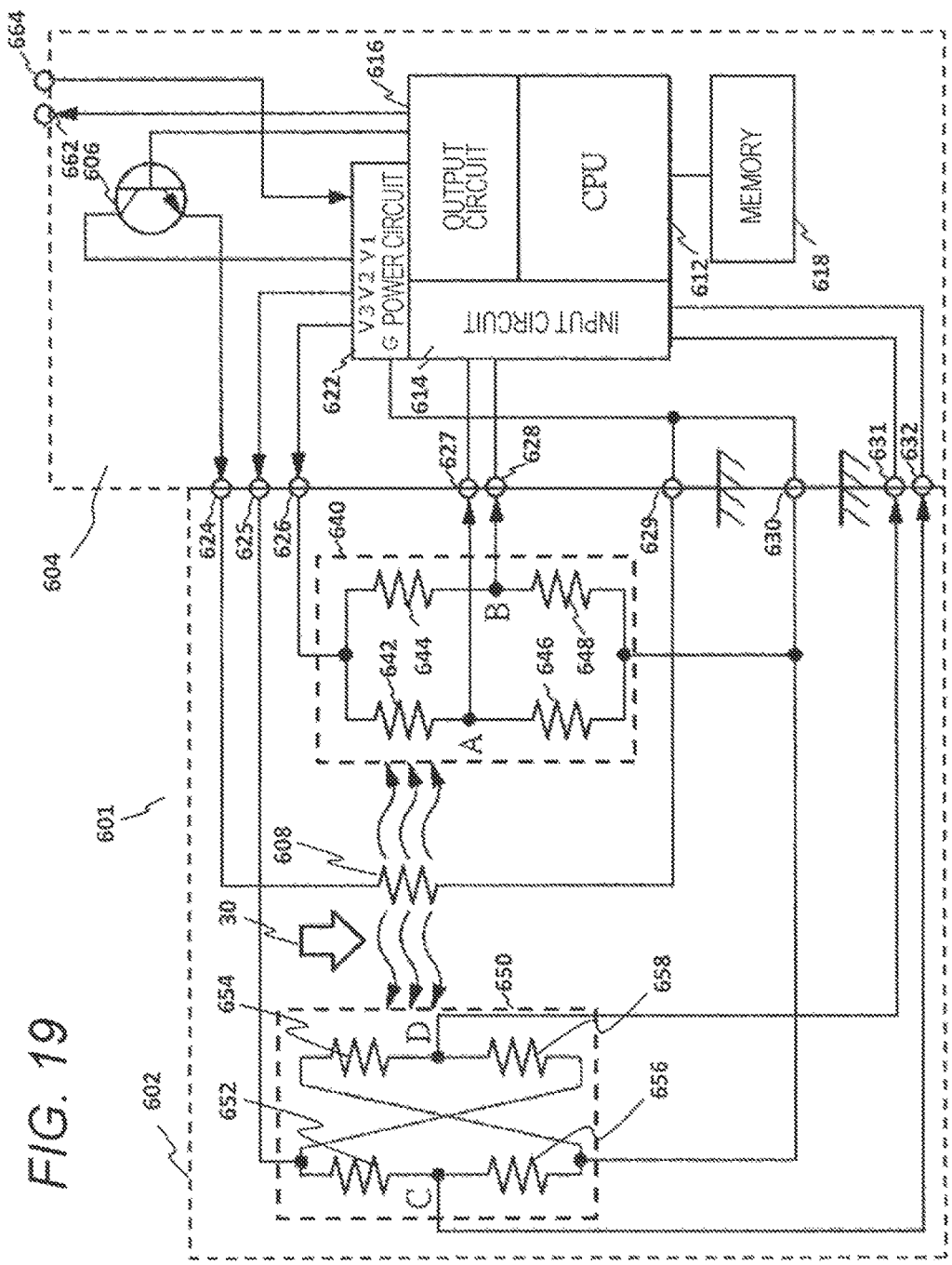
FIG. 19 is a circuit diagram illustrating a flow rate detection circuit of the thermal flow meter.

FIG. 19 is a circuit diagram illustrating the flow rate detection circuit 601 of the thermal flow meter 300. It is noted that the measurement circuit relating to the temperature detecting portion 452 described in the aforementioned embodiment is also provided in the thermal flow meter 300, but is not illustrated intentionally in FIG. 19. The flow rate detection circuit 601 of the thermal flow meter 300 includes the air flow sensing portion 602 having the heat generator 608 and the processing unit 604. The processing unit 604 control a heat amount of the heat generator 608 of the air flow sensing portion 602 and outputs a signal representing the flow rate through the terminal 662 based on the output of the air flow sensing portion 602. For this processing, the processing unit 604 includes a central processing unit (hereinafter, referred to as "CPU") 612, an input circuit 614, an output circuit 616, a memory 618 for storing data representing a relationship between the calibration value or the measurement value and the flow rate, and a power circuit 622 for supplying a certain voltage to each necessary circuit. The power circuit 622 is supplied with DC power from an external power supply such as a vehicle-mount battery through a terminal 664 and a ground terminal (not illustrated).

The air flow sensing portion 602 is provided with a heat generator 608 for heating the measurement target gas 30. A voltage V1 is supplied from the power circuit 622 to a collector of a transistor 606 included in a current supply circuit of the heat generator 608, and a control signal is applied from the CPU 612 to a base of the transistor 606 through the output circuit 616. Based on this control signal, a current is supplied from the transistor 606 to the heat generator 608 through the terminal 624. The current amount supplied to the heat generator 608 is controlled by a control signal applied from the CPU 612 to the transistor 606 of the current supply circuit of the heat generator 608 through the output circuit 616. The processing unit 604 controls the heat amount of the heat generator 608 such that a temperature of the measurement target gas 30 increases by a predetermined temperature, for example, 100° C. from an initial temperature by heating using the heat generator 608.

The air flow sensing portion 602 includes a heating control bridge 640 for controlling a heat amount of the heat generator 608 and a bridge circuit of air flow sensing 650 for measuring a flow rate. A predetermined voltage V3 is supplied to one end of the heating control bridge 640 from the power circuit 622 through the terminal 626, and the other end of the heating control bridge 640 is connected to the ground terminal 630. In addition, a predetermined voltage V2 is applied to one end of the bridge circuit of air flow sensing 650 from the power circuit 622 through the terminal 625, and the other end of the bridge circuit of air flow sensing 650 is connected to the ground terminal 630.

The heating control bridge 640 has a resistor 642 which is a resistance temperature detector having a resistance value changing depending on the temperature of the heated measurement target gas 30, and the resistors 642, 644, 646, and 648 constitute a bridge circuit. A potential difference between a node A between the resistors 642 and 646 and a node B between the resistors 644 and 648 is input to the input circuit 614 through the terminals 627 and 628, and the CPU 612 controls the current supplied from the transistor 606 to control the heat amount of the heat generator 608 such that the potential difference between the nodes A and B is set to a predetermined value, for example, zero voltage in this embodiment. The flow rate detection circuit 601 illustrated in FIG. 19 heats the measurement target gas 30 using the heat generator 608 such that a temperature increases by a predetermined temperature, for example, 100° C. from an initial temperature of the measurement target gas 30 at all times. In order to perform this heating control with high accuracy, resistance values of each resistor of the heating control bridge 640 are set such that the potential difference between the nodes A and B becomes zero when the temperature of the measurement target gas 30 heated by the heat generator 608 increases by a predetermined temperature, for example, 100° C. from an initial temperature at all times. Therefore, in the flow rate detection circuit 601 of FIG. 19, the CPU 612 controls the electric current supplied to the heat generator 608 such that the potential difference between the nodes A and B becomes zero.

The bridge circuit of air flow sensing 650 includes four resistance temperature detectors of resistors 652, 654, 656, and 658. The four resistance temperature detectors are arranged along the flow of the measurement target gas 30 such that the resistors 652 and 654 are arranged in the upstream side in the flow path of the measurement target gas 30 with respect to the heat generator 608, and the resistors 656 and 658 are arranged in the downstream side in the flow path of the measurement target gas 30 with respect to the heat generator 608. In addition, in order to increase the measurement accuracy, the resistors 652 and 654 are arranged such that distances to the heat generator 608 are approximately equal, and the resistors 656 and 658 are arranged such that distances to the heat generator 608 are approximately equal.

A potential difference between a node C between the resistors 652 and 656 and a node D between the resistors 654 and 658 is input to the input circuit 614 through the terminals 631 and 632. In order to increase the measurement accuracy, each resistance of the bridge circuit of air flow sensing 650 is set, for example, such that a positional difference between the nodes C and D is set to zero while the flow of the measurement target gas 30 is set to zero. Therefore, while the potential difference between the nodes C and D is set to, for example, zero, the CPU 612 outputs, from the terminal 662, an electric signal indicating that the flow rate of the main passage 124 is zero based on the measurement result that the flow rate of the measurement target gas 30 is zero.

When the measurement target gas 30 flows along the arrow direction in FIG. 19, the resistor 652 or 654 arranged in the upstream side is cooled by the measurement target gas 30, and the resistors 656 and 658 arranged in the downstream side of the measurement target gas 30 are heated by the measurement target gas 30 heated by the heat generator 608, so that the temperature of the resistors 656 and 658 increases. For this reason, a potential difference is generated between the nodes C and D of the bridge circuit of air flow sensing 650, and this potential difference is input to the input circuit 614 through the terminals 631 and 632. The CPU 612 searches data indicating a relationship between the flow rate of the main passage 124 and the aforementioned potential difference stored in the memory 618 based on the potential difference between the nodes C and D of the bridge circuit of air flow sensing 650 to obtain the flow rate of the main passage 124. An electric signal indicating the flow rate of the main passage 124 obtained in this manner is output through the terminal 662. It is noted that, although the terminals 664 and 662 illustrated in FIG. 19 are denoted by new reference numerals, they are included in the connection terminal 412 of FIG. 5(A), 5(B), 6(A), 6(B), or 10 described above.

As described with reference to FIG. 1, the thermal flow meter 300 is mounted on the intake pipe of the internal combustion engine and used for measuring the intake air amount of the internal combustion engine. In a specific operation state of the internal combustion engine, the intake air flowing through the intake pipe pulsates, and flows toward an intake valve of the internal combustion engine and also flows backward. In FIG. 19, in the above-mentioned reflux state, the intake air flows in a direction opposite to an arrow of the measurement target gas 30. In other words, a reverse flow occurs. In the reflux state, the resistors 652 and 654 are warmed up by the measurement target gas 30 warmed by the heat generator 608. On the other hand, the resistors 656 and 658 are cooled by the measurement target gas 30 flowing backward. In this way, the operation becomes reverse to that in a forward direction of the flow of the measurement target gas 30, and a potential difference reverse to the flow rate in the forward direction is generated between the nodes C and D. The direction of the flow of the measurement target gas 30 can be detected from the polarity of the voltage detected through the terminals 631 and 632. It is possible to calculate the flow rate of the intake air actually flowing into the internal combustion engine by reducing the flow rate in the reverse direction detected from the detected flow rate in the forward direction.

The memory 618 stores the data indicating a relationship between the potential difference between the nodes C and D and the flow rate of the main passage 124 in addition to a reflux state. Further, calibration data for reducing a measurement error such as a variation, obtained based on the actual measurement value of the gas after production of the thermal flow meter 300, is stored. It is noted that the actual measurement value of the gas after production of the thermal flow meter 300 and the calibration value based thereon are stored in the memory 618 using the external terminal 306 or the calibration terminal 307 illustrated in FIGS. 4(A) and 4(B). In this embodiment, the thermal flow meter 300 is produced while an arrangement relationship between the bypass passage for flowing the measurement target gas 30 and the measurement surface 430 or an arrangement relationship between the bypass passage for flowing the measurement target gas 30 and the heat transfer surface exposing portion 436 is maintained with high accuracy and a little variation. Therefore, it is possible to obtain a measurement result with remarkably high accuracy through calibration using the calibration value.

7.2 Configuration of Flow Rate Detection Circuit 601

Figure 20:
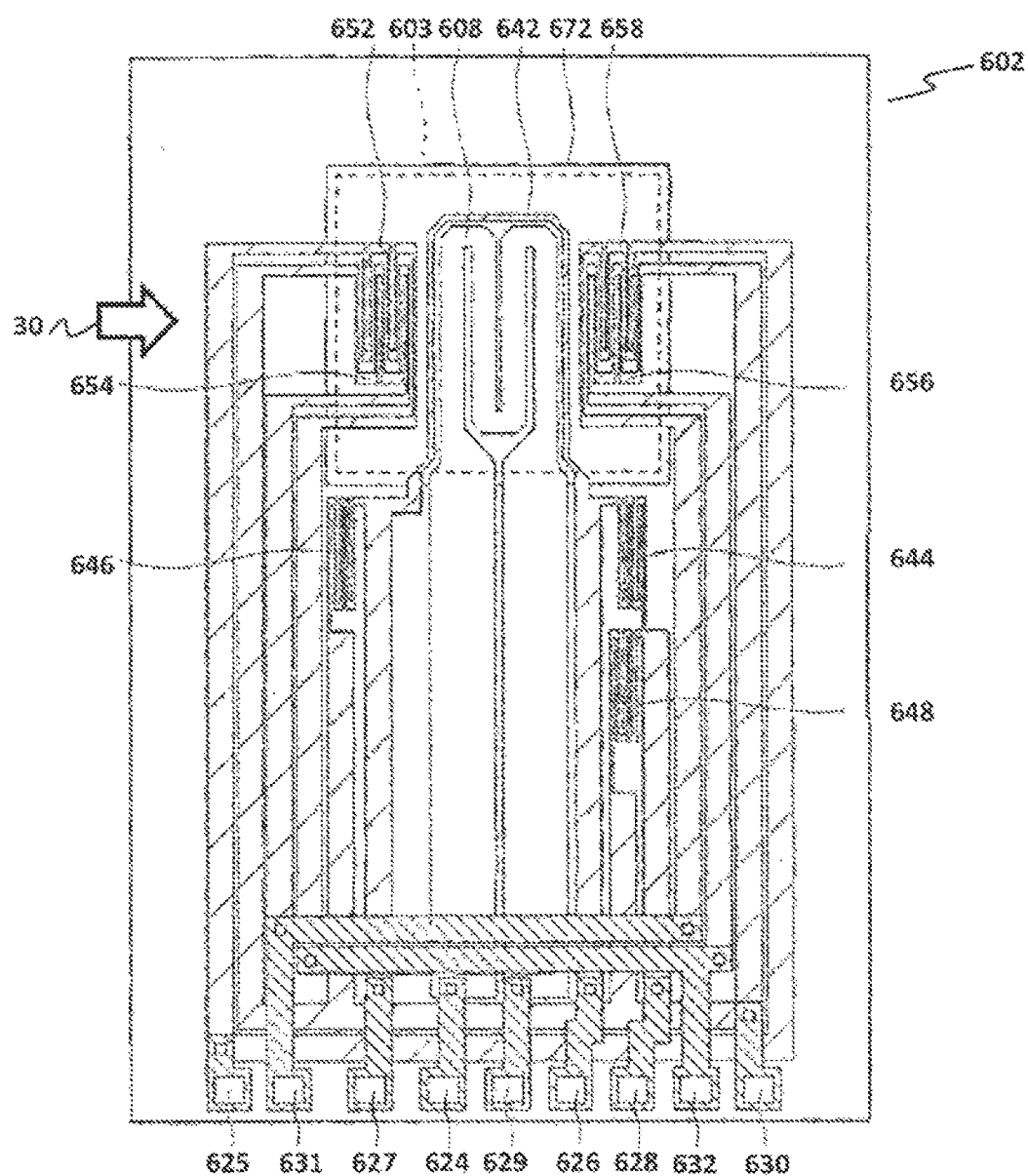
FIG. 20 is an explanatory diagram for describing an air flow sensing portion of the flow rate detection circuit.

FIG. 20 is a circuit configuration diagram illustrating a circuit arrangement of the air flow sensing portion 602 of FIG. 19 described above. The air flow sensing portion 602 is manufactured from a semiconductor chip having a rectangular shape. The measurement target gas 30 flows along the arrow direction from the left side to the right side of the air flow sensing portion 602 illustrated in FIG. 20. However, in a state where the reflux occurs, measurement target gas 30 flows in a direction reverse to the direction of arrow. In other words, a reverse flow occurs. The air flow sensing portion 602 illustrated in FIG. 20 performs heat transfer with the measurement target gas 30, so that not only the flow rate of the flow in the forward direction but also the flow rate of the flow in the reverse direction can be detected. A diaphragm 672 having a rectangular shape is formed in the air flow sensing portion 602. The diaphragm 672 is provided with a thin area 603 (indicated by the dotted line) with the thin semiconductor chip. The gap is formed in the rear surface side of the thin area 603 and communicates with the opening 438 illustrated in FIGS. 11(A) to 11(C), FIGS. 5(A) and 5(B) or the like, so that the gas pressure inside the gap depends on the pressure of the gas guided from the opening 438.

By reducing the thickness of the diaphragm 672 of the thin area 603, the thermal conductivity is lowered, and heat transfer to the resistors 652, 654, 658, and 656 provided in the thin area 603 through the diaphragm 672 is suppressed, so that the temperatures of the resistors are approximately set through heat transfer with the measurement target gas 30.

The heat generator 608 is provided in the center of the thin area 603 of the diaphragm 672, and the resistor 642 of the heating control bridge 640 is provided around the heat generator 608. In addition, the resistors 644, 646, and 648 of the heating control bridge 640 are provided in the outer side of the thin area 603. The resistors 642, 644, 646, and 648 formed in this manner constitute the heating control bridge 640.

In addition, the resistors 652 and 654 as upstream resistance temperature detectors and the resistors 656 and 658 as downstream resistance temperature detectors are arranged to interpose the heat generator 608. The resistors 652 and 654 as upstream resistance temperature detectors are arranged in the upstream side in the arrow direction where the measurement target gas 30 flows with respect to the heat generator 608. The resistors 656 and 658 as downstream resistance temperature detectors are arranged in the downstream side in the arrow direction where the measurement target gas 30 flows with respect to the heat generator 608. In this manner, the bridge circuit of air flow sensing 650 is formed by the resistors 652, 654, 656, and 658 arranged in the thin area 603. Further, the above description has been made on the assumption that the measurement target gas 30 flows in the forward direction, but in a case where the reflux occurs, the actual flow of the measurement target gas 30 is made from the downstream to the upstream.

Both ends of the heat generator 608 are connected to each of the terminals 624 and 629 illustrated in the lower half of FIG. 20. Here, as illustrated in FIG. 19, the current supplied from the transistor 606 to the heat generator 608 is applied to the terminal 624, and the terminal 629 is grounded.

The resistors 642, 644, 646, and 648 of the heating control bridge 640 are connected to each other and are connected to the terminals 626 and 630. As illustrated in FIG. 19, the terminal 626 is supplied with a predetermined voltage V3 from the power circuit 622, and the terminal 630 is grounded. In addition, the node between the resistors 642 and 646 and the node between the resistors 646 and 648 are connected to the terminals 627 and 628, respectively. As illustrated in FIG. 20, the terminal 627 outputs an electric potential of the node A between the resistors 642 and 646, and the terminal 627 outputs an electric potential of the node B between the resistors 644 and 648. As illustrated in FIG. 19, the terminal 625 is supplied with a predetermined voltage V2 from the power circuit 622, and the terminal 630 is grounded as a ground terminal. In addition, a node between the resistors 654 and 658 is connected to the terminal 631, and the terminal 631 outputs an electric potential of the node B of FIG. 19. The node between the resistors 652 and 656 is connected to the terminal 632, and the terminal 632 outputs an electric potential of the node C illustrated in FIG. 19.

As illustrated in FIG. 20, since the resistor 642 of the heating control bridge 640 is formed in the vicinity of the heat generator 608, it is possible to measure the temperature of the gas heated by the heat from the heat generator 608 with high accuracy. Meanwhile, since the resistors 644, 646, and 648 of the heating control bridge 640 are arranged distant from the heat generator 608, they are not easily influenced by the heat generated from the heat generator 608. The resistor 642 is configured to respond sensitively to the temperature of the gas heated by the heat generator 608, and the resistors 644, 646, and 648 are configured not to be influenced by the heat generator 608. For this reason, the detection accuracy of the measurement target gas 30 using the heating control bridge 640 is high, and the control for heating the measurement target gas 30 by only a predetermined temperature from its initial temperature can be performed with high accuracy.

In this embodiment, a gap is formed in the rear surface side of the diaphragm 672 and communicates with the opening 438 illustrated in FIG. 11(A) to 11(C) or 5(A) and 5(B), so that a difference between the pressure of the gap in the rear side of the diaphragm 672 and the pressure in the front side of the diaphragm 672 does not increase. It is possible to suppress a distortion of the diaphragm 672 caused by this pressure difference. This contributes to improvement of the flow rate measurement accuracy.

As described above, the heat conduction through the diaphragm 672 is suppressed as small as possible by forming the thin area 603 and reducing the thickness of the thin area 603 in the diaphragm. Therefore, while influence of the heat conduction through the diaphragm 672 is suppressed, the bridge circuit of air flow sensing 650 or the heating control bridge 640 more strongly tends to operate depending on the temperature of the measurement target gas 30, so that the measurement operation is improved. For this reason, high measurement accuracy is obtained.

8. Temperature Detection of Measurement Target Gas 30

8.1 Structure of Temperature Detecting Portion 452 and Effects Thereof

As illustrated in FIGS. 2(A), 2(B), 3(A), 3(B), 4(A), 4(B), 5(A), 5(B), 6(A) and 6(B), the temperature of the measurement target gas 30 is measured by the temperature detecting portion 452 which is provided in the thermal flow meter 300. The temperature detecting portion 452 protrudes outwardly from the housing 302 toward the upstream side, and comes in direct contact with the measurement target gas 30. With such a structure, the measurement accuracy of the temperature detection of the measurement target gas 30 is improved.

In addition, the temperature of the gas flowing from the upstream side in a direction along the flow of the measurement target gas 30 to the inlet port 343 is measured by the temperature detecting portion 452, and the gas flows toward the neck portion of the temperature detecting portion 452 which supports the temperature detecting portion 452. Therefore, the temperature of the portion supporting the temperature detecting portion 452 is cooled in a direction approaching the temperature of the measurement target gas 30. With such a structure, the measurement accuracy is improved.

The temperature of the intake pipe serving as a main passage 124 increases considerably compared to the typical measurement target gas 30, and the heat is transferred to the portion for supporting the temperature detecting portion 452 through the upstream-side outer wall inside the measuring portion 310 from the flange 312 or the thermal insulation 315, so that the temperature measurement accuracy may be influenced. As described above, the support portion is cooled as the measurement target gas 30 is measured by the temperature detecting portion 452 and then flows along the support portion of the temperature detecting portion 452. Therefore, it is possible to suppress the heat from being transferred to the portion for supporting the temperature detecting portion 452 through the upstream-side outer wall inside the measuring portion 310 from the flange 312 or the thermal insulation 315.

In particular, in the support portion of the temperature detecting portion 452, the upstream-side outer wall inside the measuring portion 310 has a shape concave to the downstream side. Therefore, it is possible to increase a distance between the upstream-side outer wall inside the measuring portion 310 and the temperature detecting portion 452. While the heat transfer length increases, a distance of the cooling portion using the measurement target gas 30 increases. Therefore, it is also possible to reduce influence of the heat from the flange 312 or the thermal insulation 315. Accordingly, the measurement accuracy is improved.

Since the upstream-side outer wall has a shape concave to the downstream side, that is, the inside of the housing 302, it can be fixed by the upstream-side outer wall 335 of the housing 302 and the fixation of the circuit package 400 becomes easy. In addition, it is also effective to the strength of the protrusion 424 (refer to FIGS. 11(A), 11(B), and 11(C)) having the temperature detecting portion 452.

As illustrated above with reference to FIGS. 2(A), 2(B), 3(A), and 3(B), the inlet port 343 is provided on the upstream side of the measurement target gas 30 in the case 301. The measurement target gas 30 guided from the inlet port 343 passes through the vicinity of the temperature detecting portion 452 and is guided to the main passage 124 from the front side outlet port 344 and the rear side outlet port 345. The temperature detecting portion 452 measures the temperature of the measurement target gas 30. The electric signal representing the measured temperature is output from the external terminal 306 of the external connector 305. The case 301 of the thermal flow meter 300 includes the front cover 303, the rear cover 304, and the housing 302. The housing 302 includes the hollow for molding the inlet port 343. The hollow is formed by the outer wall hollow portion 366 (refer to FIGS. 5(A), 5(B), 6(A), and 6(B)). In addition, the front side outlet port 344 or the rear side outlet port 345 is molded by the hole provided in the front cover 303 or the rear cover 304. As described above, the temperature detecting portion 452 is provided with the leading end portion of the protrusion 424, and has a weak mechanical strength. The front cover 303 or the rear cover 304 serves to protect the protrusion 424 against the mechanical impact.

In addition, the front protection portion 322 or the rear protection portion 325 is molded in the front or rear cover 303 or 304 illustrated in FIG. 8(A), 8(B), 8(C), 9(A), 9(B), or 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

In addition, as illustrated in FIG. 11(A), 11(B), 11(C), 15(A), or 15(B), the neck portion of the protrusion 424 supporting the temperature detecting portion 452 is formed gradually thicker compared to the leading end. Since the measurement target gas 30 received from the inlet port 343 flows along the neck portion gradually thicker, the cooling effect is increased. The neck portion of the protrusion 424 approaches the flow rate detection circuit, and is easily influenced by the heat of the flow rate detection circuit. Furthermore, the lead 548 for connecting the temperature detection element 518 provided in the temperature detecting portion 452 is buried in the neck portion of the protrusion 424. Therefore, it is possible to transfer the heat through the lead 548. Since the contact area with respect to the measurement target gas 30 is increased by making the neck portion of the protrusion 424 thick, it is possible to increase the cooling effect.

8.2 Formation of Temperature Detecting Portion 452 and Protrusion 424 and Effects Thereof The circuit package 400 includes the circuit package body 422 and the protrusion 424 embedding the air flow sensing portion 602 and the processing unit 604 for measuring the flow rate. As illustrated in FIGS. 2(A) and 2(B), the protrusion 424 protrudes in a shape extending to the upstream direction of the measurement target gas 30 from the side surface of the circuit package body 422. The temperature detecting portion 452 is provided in the leading end portion of the protrusion 424, and as illustrated in FIG. 12 the temperature detection element 518 is buried in the inside of the temperature detecting portion 452. As illustrated in FIG. 11(A), 11(B), 11(C), 15(A), or 15(B), the slope portions 462 and 464 are provided in a portion connecting the protrusion 424 and the circuit package body 422. The protrusion 424 is formed such that the base thereof becomes thick by the slope portion 462 or the slope portion 464, and the neck portion of the protrusion 424 is formed gradually thin as it goes to the leading end direction. The cross-sectional area crossing an axis in the protruding direction is reduced in the neck portion of the protrusion 424 as it goes in the leading end direction.

As described above, since the connection portion between the front surface of the circuit package 400 and the front surface of the protrusion 424 is gradually changed, in a case where the circuit package 400 is formed through the resin molding process, a method of causing the resin to flow to the sheet inside the die for the purpose of the protection of the element can be used, so that the sheet comes into close contact with the inside of the die and the reliability is improved. In a case where the front surface is steeply changed, an excessive force is applied to the sheet to cause a deviation in the contact portion between the sheet and the inner wall surface of the die, so that the resin molding is not satisfyingly performed. In addition, the mechanical strength of the protrusion 424 is weak, and the base is easily folded. When the base of the protrusion 424 is formed thick and becomes thin as it goes in the leading end direction, the concentrated stress onto the base can be alleviated and the mechanical strength becomes excellent. In addition, in a case where the protrusion 424 is formed through the resin molding process, the bending or the like may occur under an influence of the volume change when the resin is solidified. Such an influence can be reduced. It is preferable that the protruding length be long in order to measure the temperature of the measurement target gas 30 as accurate as possible. The heat transfer from the circuit package body 422 to the temperature detection element 518 provided in the temperature detecting portion 452 is easily reduced by forming the protruding length of the protrusion 424 long.

As illustrated in FIGS. 11(B) and 11(C), the base of the protrusion 424 is formed thick and the base of the protrusion 424 is surrounded by the resin of the housing 302, and thus the circuit package 400 is fixed to the housing 302. In this way, since the base of the protrusion 424 is covered with the resin of the housing 302, it is possible to prevent the protrusion 424 from taking damage due to the mechanical impact.

In order to detect the temperature of the measurement target gas 30 with high accuracy, it is preferable that the heat transfer with portions other than the measurement target gas 30 be suppressed as less as possible. The leading end portion of the protrusion 424 supporting the temperature detecting portion 452 is formed in a narrow shape by the base thereof, and the temperature detecting portion 452 is provided in the leading end portion. With such a shape, the influence of the heat from the neck portion of the protrusion 424 to the temperature detecting portion 452 is reduced.

In addition, after the temperature of the measurement target gas 30 is detected by the temperature detecting portion 452, the measurement target gas 30 flows along the protrusion 424, and the temperature of the protrusion 424 approaches the temperature of the measurement target gas 30. Therefore, the influence of the temperature of the neck portion of the protrusion 424 on the temperature detecting portion 452 is suppressed. Specifically, in the embodiment, the vicinity of the protrusion 424 provided with the temperature detecting portion 452 is formed thin and becomes thick as it goes to the base of the protrusion 424. For this reason, the measurement target gas 30 flows along the structure of the protrusion 424, and thus the protrusion 424 is efficiently cooled.

In FIGS. 11(A), 11(B), and 11(C), the hatching portion of the neck portion of the protrusion 424 is a fixation surface 432 covered by the resin used to mold the housing 302 in the second resin molding process. A hollow is provided in the hatching portion of the neck portion of the protrusion 424. This shows that a portion of the hollow shape not covered by the resin of the housing 302 is provided. If such a portion having a hollow shape not covered by the resin of the housing 302 in the neck portion of the protrusion 424 is provided in this manner, it is possible to further easily cool the protrusion 424 using the measurement target gas 30. In FIGS. 15(A) and 15(B), the hatching portion is also the same as FIGS. 11(A), 11(B), and 11(C) while not illustrated.

The circuit package 400 is provided with the connection terminal 412 in order to supply electric power for operating the embedded air flow sensing portion 602 or the processing unit 604 and output the flow rate measurement value or the temperature measurement value. In addition, a terminal 414 is provided in order to inspect whether or not the circuit package 400 is appropriately operated, or whether or not an abnormality is generated in a circuit component or connection thereof. In this embodiment, the circuit package 400 is formed by performing transfer molding for the air flow sensing portion 602 or the processing unit 604 using a thermosetting resin through the first resin molding process. By performing the transfer molding, it is possible to improve dimensional accuracy of the circuit package 400. However, in the transfer molding process, since a high pressure resin is pressed into the inside of the sealed die where the air flow sensing portion 602 or the processing unit 604 is embedded, it is preferable to inspect whether or not there is a defect in the air flow sensing portion 602 or the processing unit 604 and such a wiring relationship for the obtained circuit package 400. In this embodiment, an inspection terminal 414 is provided, and inspection is performed for each of the produced circuit packages 400. Since the inspection terminal 414 is not used for measurement, the terminal 414 is not connected to the inner socket of external terminal 361 as described above. In addition, each connection terminal 412 is provided with a curved portion 416 in order to increase a mechanical elastic force. If the mechanical elastic force is provided in each connection terminal 412, it is possible to absorb a stress caused by a difference of the thermal expansion coefficient between the resin of the first resin molding process and the resin of the second resin molding process. That is, each connection terminal 412 is influenced by thermal expansion caused by the first resin molding process, and the inner socket of external terminal 361 connected to each connection terminal 412 is influenced by the resin of the second resin molding process. Therefore, it is possible to absorb the generated stress caused by the difference of the resin.

8.3 Operation of Slope Portions 462 and 464 Formed in Neck Portion of Protrusion 424 and Effects Thereof As described above with reference to FIG. 11(A), 11(B), 11(C), 14, 15(A), or 15(B), the slope portions 462 and 464 are provided in the neck portion of the protrusion 424. With the slope portion 462 or the slope portion 464, the neck portion of the protrusion 424 is formed such that the base of the protrusion 424 is thick and becomes thin as it goes in the leading end direction. In other words, assuming that the protruding direction is an axis, the neck portion of the protrusion 424 is provided such that a cross-sectional area crossing the axis in the protruding direction is formed gradually reduced.

In a case where the circuit package 400 is formed through the resin molding process and the resin flows to the sheet inside the die for the purpose of the protection of the element, the sheet comes into close contact with the inside of the die and the reliability is improved. In addition, the mechanical strength of the protrusion 424 is weak, so that it may be easily folded. The protrusion 424 is made thick in its base portion, and has the shape being gradually thin as it goes to the leading end direction, so that the stress concentration on the base can be alleviated and the mechanical strength becomes excellent. In addition, in a case where the protrusion 424 is formed through the resin molding, the protrusion is easily bent under the influence of a volume change when the resin is solidified. Such an influence can be reduced. In order to detect the temperature of the measurement target gas 30 as accurate as possible, it is preferable that the protrusion be formed long. The heat transfer from the package body 422 onto the temperature detection element 518 provided in the temperature detecting portion 452 becomes easily reduced by forming the protrusion 424 long.

As illustrated in FIGS. 11(B) and 11(C), the base of the protrusion 424 is formed thick and the base of the protrusion 424 is surrounded by the housing 302, and thus the circuit package 400 is fixed to the housing 302. In this way, since the base of the protrusion 424 is covered with the resin of the housing 302, it is possible to prevent the protrusion 424 from taking damage due to the mechanical impact.

Since the slope portion 463 is provided in the base of the protrusion 424, the neck portion of the protrusion 424 can be provided such that the base of the protrusion 424 can be thick and becomes thin as it goes in the leading end direction. With such a shape, in a case where the circuit package 400 is molded through the resin molding, it is possible to use a method of attaching a sheet inside the die for the purpose of protection of the element. In this case, the sheet and the inner surface of the die abut securely, so that the reliability is improved. In addition, the mechanical strength of the protrusion 424 is weak, so that it may be easily folded. The protrusion 424 is made thick in its base portion, and has the shape being gradually thin as it goes to the leading end direction, so that the stress concentration on the base can be alleviated and the mechanical strength becomes excellent. In addition, in a case where the protrusion 424 is formed through the resin molding, the protrusion is easily bent under the influence of a volume change when the resin is solidified. Such an influence can be reduced. In order to detect the temperature of the measurement target gas 30 as accurate as possible, it is preferable that the protrusion be formed long. The heat transfer from the package body 422 onto the temperature detection element 518 provided in the temperature detecting portion 452 becomes easily reduced by forming the protrusion 424 long.

In FIG. 11(A), 11(B), 11(C), 21(A), 21(B), or 21(C), the base of the protrusion 424 is formed thick. The base of the protrusion 424 is covered by the resin of the housing 302 which forms the bypass passage by surrounding the base using the fixing portion 3723 of the housing 302. Therefore, the base becomes strong against a mechanical impact, and it is possible to prevent the damage of the protrusion 424. Further, in FIG. 11(A), 11(B), 11(C), the hatching portion in the appearance of the circuit package 400 indicates the fixation surface 432, the fixing portion 3723, and the fixation surface 434 where the circuit package 400 is covered by the resin used in the second resin molding process when the housing 302 is formed through the second resin molding process after the circuit package 400 is manufactured through the first resin molding process. In other words, the mechanical strength of the circuit package 400 is increased by these fixation surfaces, and in particular, the mechanical strength of the base of the protrusion 424 can be improved by the fixation surface 432. In addition, various effects described with reference to FIGS. 11(A), 11(B), 11(C) are achieved.

9. Shape of Cover for Temperature Measurement of Measurement Target Gas 30

9.1 Overview of Temperature Measurement of Measurement Target Gas 30 and Effects Thereof As illustrated in FIGS. 2(A), 2(B), 3(A), and 3(B), the measurement target gas 30 is guided from the inlet port 343 opened to the upstream side, the temperature of the measurement target gas 30 guided to the temperature detecting portion 452 provided in the leading end portion of the protrusion 424 is measured. The temperature detecting portion 452 is provided in the circuit package 400 for measuring the flow rate, and the thermal flow meter 300 is fixed to a measurement target, for example, the intake pipe to measure the temperature of the measurement target gas 30 as well as the flow rate, so that it is excellent in workability. In addition, the protrusion 424 having the temperature detecting portion 452 is arranged in the inside of the inlet port 343 surrounded by the front cover 303, the rear cover 304, and the housing 302, so that it is excellent in stability.

In order to measure the temperature of the measurement target gas 30 with high accuracy, it is preferable that the measurement target gas 30 come into contact with the temperature detecting portion 452 as much as possible. In addition, it is preferable that heat be hardly transferred from another hear source to the temperature detecting portion 452. As described above with reference to FIG. 5(A), 5(B), 6(A), or 6(B), the temperature detecting portion 452 is provided on the leading end side of the protrusion 424. Therefore, the measurement target gas 30 guided from the inlet port 343 opened to the upstream side comes easily contact with the temperature detecting portion 452, and the protrusion 424 is formed long, so that the heat is hardly transferred from the base to the leading end. In addition, since the measurement target gas 30 guided from the inlet port 343 flows along the protrusion 424, the heat transferred from the base of the protrusion 424 to the leading end falls by the measurement target gas 30. With this structure, the influence from another heat source hardly occurs. For this reason, the temperature of the measurement target gas 30 can be measured with high accuracy.

Furthermore, as described above with reference to FIG. 12, the lead 548 which transmits the electric signal of the temperature detection element 518 (which is provided in the temperature detecting portion 452 and measures the temperature) to the processing unit 604 serving as a control circuit for measuring the temperature is disconnected from the lead 544 to which the temperature detection element 518 is connected, so that the electric signal of the temperature detection element 518 is transmitted to the lead 548 through the connection line 546 having a large thermal resistance. With this configuration, it is possible to reduce the influence of the heat transferred through the lead 548. As a result, the measurement accuracy is improved.

On the other hand, since the temperature detection element 518 is connected to the lead 544, the temperature detection element 518 is securely held by the lead 544, so that a high reliability is secured. Then the circuit illustrated in FIG. 12 is subjected to a transfer molding process to form the protrusion 424. Since the temperature detection element 518 is fixed to the lead 544, it is less likely to be damaged by the transfer molding process. Therefore, the productivity is also excellent.

As illustrated in FIG. 2(A), 2(B), 3(A), or 3(B), the front protection portion 322 or the rear protection portion 325 for protecting the leading end of the protrusion 424 is provided in the front cover 303 or the rear cover 304. Therefore, the protrusion 424 is mechanically protected. Furthermore, the front side outlet port 344 or the rear side outlet port 345 is provided in the neck portion of the protrusion 424. The outside surfaces of the front cover 303 and the rear cover 304 are flat, the flow velocity of the measurement target gas 30 flowing to the outside of the front side outlet port 344 or the rear side outlet port 345 is high and the pressure becomes lowered compared to the inside of the front side outlet port 344 or the rear side outlet port 345. Therefore, the measurement target gas 30 guided from the inlet port 343 is discharged from the front side outlet port 344 or the rear side outlet port 345 to the outside. In addition, since the inlet port 343 is opened to the upstream side, a dynamic pressure of the measurement target gas 30 is applied to the inlet port 343. With this configuration, the measurement target gas 30 is sufficiently guided from the inlet port 343, the protrusion 424 is cooled while the temperature is measured, and then the measurement target gas 30 is discharged from the front side outlet port 344 or the rear side outlet port 345 into the main passage 124. In this way, the temperature of the measurement target gas 30 is measured with high accuracy.

Figure 21:
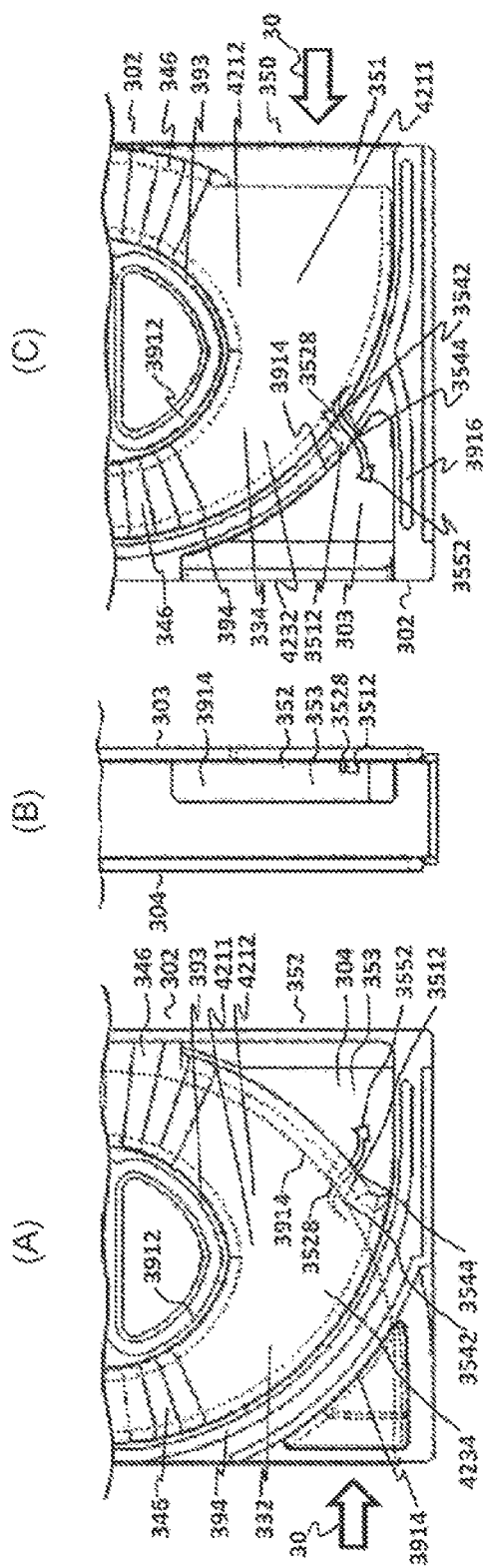

10 Shape of Drainage Passage for Discharging Water Flowing into Bypass Passage 10.1 Another Embodiment of Drainage Passage FIGS. 21(A) to 21(C) illustrate another embodiment of the thermal flow meter of FIG. 5(A), 5(B), 6(A), or 6(B), and the same configurations will be denoted with the same symbols, in which FIG. 21(A) is a front view, FIG. 21(B) is a left side view, and FIG. 21(C) is a rear view. The bypass passage includes a wall 4211, an inner wall 3912, and an outer wall 3914. In addition, in the embodiment, a drainage passage 3528 for communicating the outer wall 3914 of the bypass passage 4232 on the inlet port is provided. The drainage passage 3528 includes a through hole 3512. The through hole 3512 includes an inlet port 3542 opened to the inner surface of the bypass outer wall 3914 of the bypass passage 4232 on the inlet port and an outlet port 3544 opened to the outer wall 3914.

As described in the embodiment with reference to FIG. 5(A), 5(B), 6(A), or 6(B), in a case where the longitudinal direction of the thermal flow meter 300 is attached at an angle crossing the gravitational direction, the water flowing into from the inlet port 350 of the bypass passage is likely to remain in the bypass passage. As illustrated in FIG. 21(C), since the through hole 3512 is provided in the bypass outer wall 3914, the water flowing into from the inlet trench 351 flows along the inner surface of the bypass outer wall 3914 and is guided to the through hole 3512 of the drainage passage 3528 provided in the bypass outer wall 3914 of the bypass passage 4232 on the inlet port. The water is guided to the bypass passage 3544 on the outlet port through the drainage passage 3528, and discharged from the bypass passage 3544 on the outlet port to the main passage 124. Similarly to the description of the above embodiment, in a case where the drainage passage is communicated to the outside of the thermal flow meter 300, the flow velocity of the measurement target gas 30 on the outside of the thermal flow meter 300 increases, and the pressure of the measurement target gas 30 in the bypass passage is more likely to be lowered. Therefore, the measurement target gas 30 for measuring the flow rate of the water flowing in the bypass passage may leak to the outside of the thermal flow meter 300 through the drainage passage 3528, and results in a decrease of the flow rate measurement accuracy.

In the embodiment, since the drainage passage 3528 communicates the bypass passage 4232 on the inlet port and the bypass passage 4234 on the outlet port, the leakage of the measurement target gas 30 through the drainage passage 3528 can be reduced for the following reasons. As one of the reasons that the leakage can be reduced, there is little difference in the flow velocity of the measurement target gas between the inside of the bypass passage 4232 on the inlet port and the inside of the bypass passage 3544 on the outlet port. In other words, there is little difference in pressure between the inside of the bypass passage 4232 on the inlet port and the inside of the bypass passage 3544 on the outlet port. In addition, as another reason, the outlet port of the through hole 3512 of the drainage passage 3528 is arranged in the side portion of the bypass passage 3544 on the outlet port or beside the bypass passage. Since the flow is very gentle in the side portion of the bypass passage 3544 on the outlet port or beside the bypass passage, the pressure of the outlet port of the through hole 3512 is high, and thus it is possible to reduce the amount of leakage through the through hole 3512. As a result, high measurement accuracy is maintained.

The water which flows into from the inlet port 350 of the bypass passage and is in the bypass passage 4232 on the inlet port flows along the inner surface of the bypass outer wall 3914 as depicted with the arrow 3552, passes through the through hole 3512 of the drainage passage 3528 provided in the bypass outer wall 3914 of the bypass passage 4232 on the inlet port, and guided to the bypass passage 3544 on the outlet port through the drainage passage 3528 having the through hole 3512. The water guided to the bypass passage 3544 on the outlet port is discharged from the outlet port trench 353 to the main passage 124. Therefore, there is no inflow to the measurement surface 430 of the circuit package 400. In this way, since the drainage passage 3528 is provided to communicate the outer wall 3914 of the bypass passage 4232 on the inlet port, the water flowing into from the inlet port 350 of the bypass passage does not adversely affect the measurement surface 430 of the circuit package 400. Therefore, it is possible to suppress the measurement error of the flow rate and the damage such as the erosion of the flow rate detection circuit. Similarly to the above-mentioned embodiment, it is possible to perform the measurement with high accuracy.

In FIG. 21(C), the outlet port of the through hole 3512 is provided in a portion interposed between the bypass outer wall 3914 and a bypass outer wall 3916. Since the flow velocity in the portion interposed between the bypass outer wall 3914 and the bypass outer wall 3916 is low and the pressure therein is high compared to other portions, the leakage of the measurement target gas 30 in the bypass passage can be reduced and the high measurement accuracy can be maintained. Furthermore, since the portion is covered by a cover and the top portions of the bypass outer wall 3914 and the bypass outer wall 3916 in the height direction come into close contact with the cover, the pressure in this portion is further increased, and thus the leakage is suppressed.

10.2 Still Another Embodiment of Structure for Measuring Temperature of Measurement Target Gas 30

Figure 22:
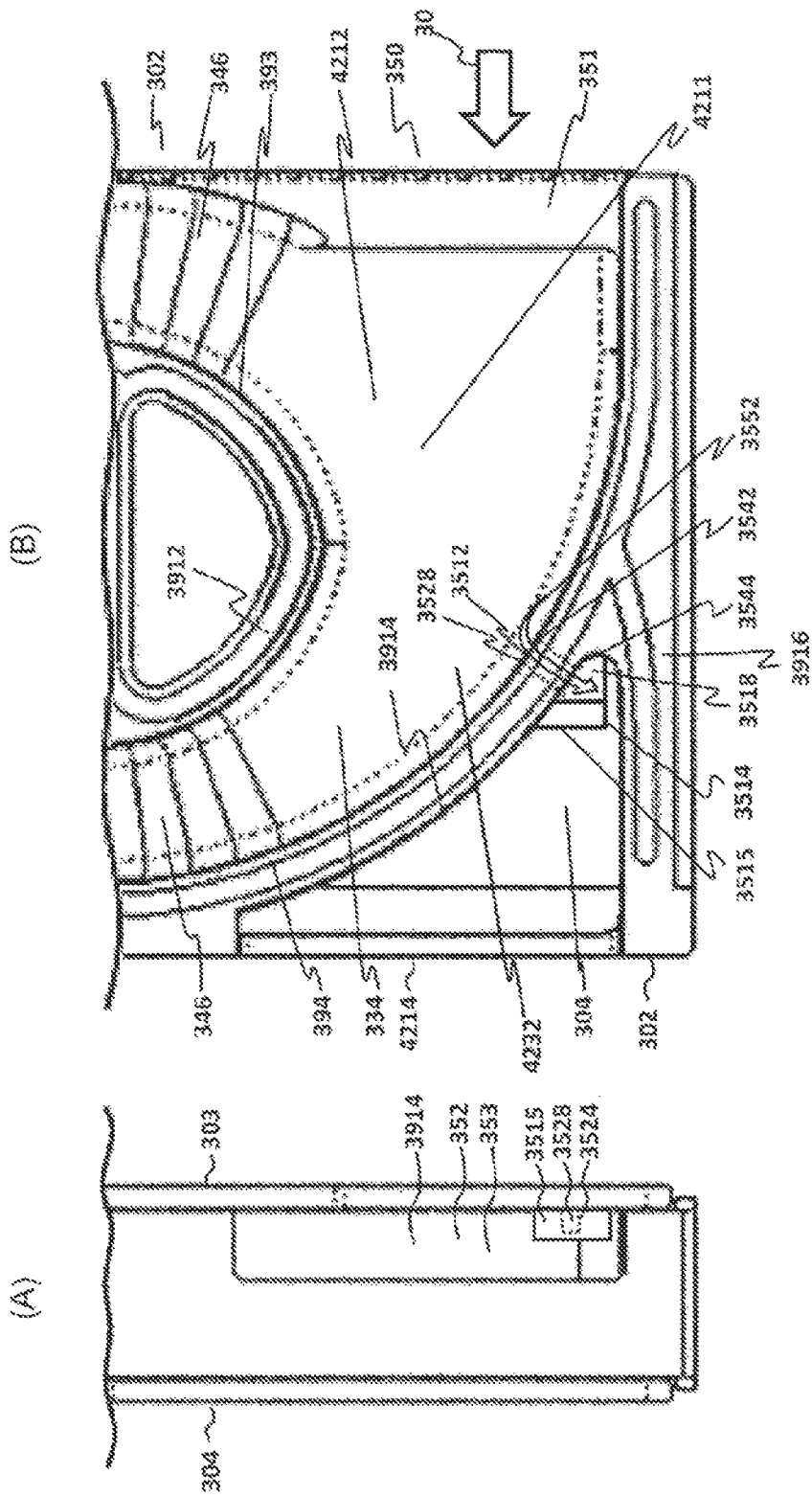

FIGS. 22(A) and 22(B) are partially enlarged views illustrating still another embodiment, in which FIG. 22(A) is a left side view, and FIG. 22(B) is a partially enlarged rear view. The bypass passage includes a wall 4211, an inner wall 3912, and an outer wall 3914. In the embodiment, similarly to the embodiment of FIGS. 21(A) to 21(C), the drainage passage 3528 communicating the outer wall 3914 of the bypass passage 4232 on the inlet port is provided. The drainage passage 3528 includes the through hole 3512. The through hole 3512 includes the inlet port 3542 which is opened in the inner surface of the bypass outer wall 3914 of the bypass passage 4232 on the inlet port and the outlet port 3544 which is opened in the outer surface (that is, the rear surface) of the outer wall 3914. In the embodiment, a protrusion 3515 is further provided to suppress the flow of the gas on the downstream side of the through hole 3512 in the drainage passage 3528. The drainage passage 3528 is formed by taking a detour round a leading end 3514 of the protrusion 3515. Since the protrusion 3515 is provided, the length of the drainage passage 3528 is extended. In addition, the fluid resistance becomes large, and the leakage of the measurement target gas 30 through the through hole 3512 can be reduced.

According to the drainage passage 3528, similarly to the above-mentioned embodiment, the water flowing into from the inlet port 350 of the bypass passage is guided to the through hole 3512 of the drainage passage 3528 provided in the bypass outer wall 3914 of the bypass passage 4232 on the inlet port. The water is guided to the bypass passage 3544 on the outlet port through the drainage passage 3528, and discharged from the bypass passage 3544 on the outlet port to the main passage 124. FIGS. 22(A) and 22(B) basically illustrate the similar structure to that of FIGS. 21(A) to 21(C), so that the leakage of the measurement target gas 30 through the drainage passage 3528 can be suppressed, and the high measurement accuracy can be maintained.

In the embodiment, a protrusion 3515 is further provided to suppress the flow of the gas on the downstream side of the through hole 3512 in the drainage passage 3528. The drainage passage 3528 is formed by taking a detour round a leading end 3514 of the protrusion 3515. Therefore, it is possible to extend the length of the drainage passage 3528 of which the width is small. The water 3552 flowing into through the through hole 3512 in the drainage passage 3528 flows along the wall surface. The water flowing along the wall surface suppresses the leakage of the measurement target gas 30.

Since the protrusion 3515 is provided in the drainage passage 3528, an air pressure of the outlet port of the through hole 3512 becomes high, and the leakage through the through hole 3512 can be reduced. With such a structure, it is possible to suppress the measurement error and the high measurement accuracy can be maintained. Further, the fluid resistance on a side near the outlet port of the through hole 3512 of the drainage passage 3528 becomes high by providing a wall 3518 between the protrusion 3515 and the outlet port 3544. As a result, the leakage of the measurement target gas 30 through the through hole 3512 can be reduced.

Figure 23:
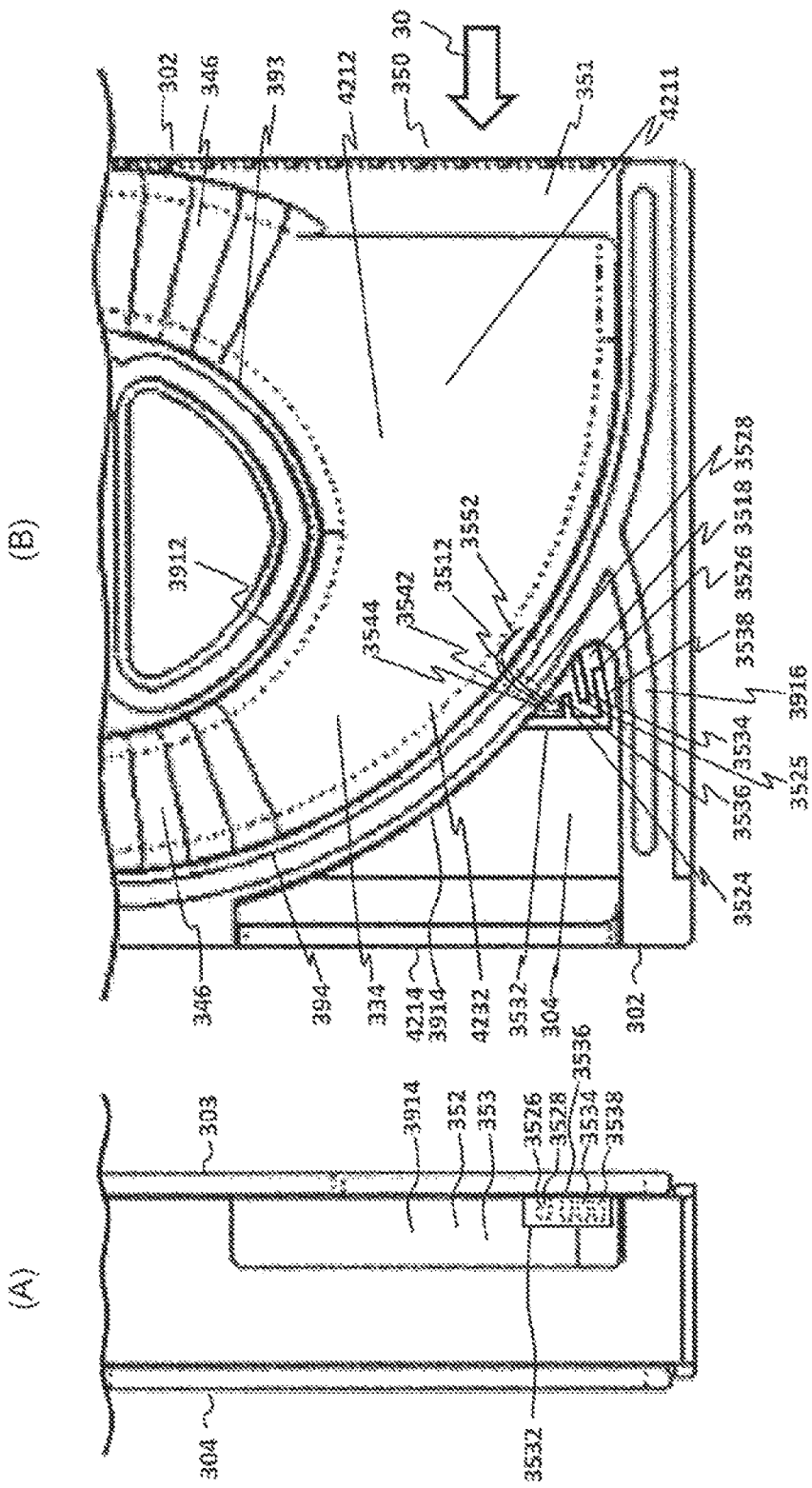

FIGS. 23(A) and 23(B) are partially enlarged views illustrating still another embodiment, in which FIG. 23(A) is a left side view, and FIG. 23(B) is a partially enlarged rear view. The bypass passage includes a wall 4211, an inner wall 3912, and an outer wall 3914. In the embodiment, similarly to the embodiments illustrated in FIGS. 21(A) to 21(C) and FIGS. 22(A) and 22(B), there is provided the drainage passage 3528 which has the through hole 3512 for communicating the outer wall 3914 of the bypass passage 4232 on the inlet port. In the embodiment, a protrusion 3532 and a protrusion 3534 include a protrusion 3536 and a protrusion 3538 and are provided on the downstream side of the through hole 3512 in the drainage passage 3528 in order to suppress the flow of the gas. The drainage passage 3528 is provided by taking a detour round a leading end 3524, a leading end 3525, and a leading end 3526 of the protrusion 3534, the protrusion 3536, and the protrusion 3538. The involved drainage passage 3528 is formed by providing the protrusion 3534, the protrusion 3536, and the protrusion 3538, and the fluid resistance is increased. With this configuration, the leakage of the measurement target gas 30 in the bypass passage is reduced.

With such a shape of the drainage passage 3528, similarly to the above-mentioned embodiment, the flow velocity on the downstream side of the through hole 3512 is reduced, the pressure of the through hole 3512 is maintained high, and the leakage of the measurement target gas 30 can be prevented. The water flows along the front surface of the protrusion. Even though the protrusion 3532 is formed, the water is sufficiently discharged. On the other hand, the leakage of the measurement target gas 30 in the bypass passage is suppressed by the fluid resistance. With the structure, the leakage of the measurement target gas 30 in the bypass passage can be suppressed, and the high measurement accuracy of the flow rate is maintained.

INDUSTRIAL AVAILABILITY

The present invention is applicable to a measurement apparatus for measuring a gas flow rate as described above.

REFERENCE SIGNS LIST 300 thermal flow meter
302 housing
303 front cover
304 rear cover
305 external connector
306 external terminal
307 calibration terminal
310 measuring portion
320 terminal connector
332 bypass passage trench on frontside
334 bypass passage trench on backside
356, 358 protrusion
359 resin portion
361 inner socket of external terminal
365 link portion
400 circuit package
412 connection terminal
414 terminal
422 package body
424 protrusion
430 measurement surface
432, 434 fixation surface
436 heat transfer surface exposing portion
438 opening
452 temperature detecting portion
590 pressed fitting hole
594, 596 slope portion
601 flow rate detection circuit
602 air flow sensing portion
604 processing unit
608 heat generator
640 heating control bridge
650 bridge circuit of air flow sensing
672 diaphragm
3512, 3522 through hole
3528 drainage passage
4232 bypass passage on the inlet port
4234 bypass passage on the outlet port

The invention claimed is:

1. A thermal flow meter comprising:
a bypass passage for flowing a part of a measurement target gas flowing through a main passage; and
a flow rate detection circuit for measuring a flow rate of the measurement target gas flowing through the main passage by performing heat transfer with the measurement target gas flowing through the bypass passage, wherein
the bypass passage includes an inlet port for flowing the measurement target gas, an outlet port for returning the measurement target gas to the main passage, and an air flow sensing portion arranged between the inlet port and the outlet port that measures the flow rate by performing heat transfer between the flow rate detection circuit and the measurement target gas, wherein the air flow sensing portion has a measurement surface disposed in a plane parallel to the main passage,
a through passage is provided to communicate the bypass passage inlet port, between the bypass passage inlet port and the air flow sensing portion, and the bypass passage outlet port, between the bypass passage outlet port and the air flow sensing portion, and
the through passage includes a through passage inlet port, which passes through a wall surface forming the bypass passage inlet port and opens in the bypass passage inlet port, and an outlet port, which opens at a rear side of the wall surface forming the bypass passage inlet port, wherein
the through passage is perpendicular to the measurement surface of the air flow sensing portion.

2. The thermal flow meter according to claim 1, wherein a flange for supporting the thermal flow meter is provided, the bypass passage inlet port and the bypass passage outlet port are arranged at an end portion of the thermal flow meter opposite to the flange,
the air flow sensing portion is arranged closer to the flange than the bypass passage inlet and outlet ports,
the bypass passage inlet port is formed to approach the air flow sensing portion while being curved,
the bypass passage inlet port is formed to include a bypass passage trench and a cover for covering the bypass passage trench, and
the through passage is positioned in the bypass passage trench.

3. The thermal flow meter according to claim 1, wherein a protrusion for suppressing the flow of the measurement target gas is provided on a downstream side of the through passage, and
the through passage is formed by taking a detour around a leading end of the protrusion.

4. The thermal flow meter according to claim 1, wherein the bypass passage is formed such that a cross-sectional area of the bypass passage inlet port is gradually narrowed from the opening of the through passage toward the air flow sensing portion.

5. A thermal flow meter comprising:
a bypass passage for flowing a part of a measurement target gas flowing through a main passage; and
a flow rate detection circuit for measuring a flow rate of the measurement target gas flowing through the main passage by performing heat transfer with the measurement target gas flowing through the bypass passage, wherein
the bypass passage includes an inlet port for flowing the measurement target gas, an outlet port for returning the measurement target gas to the main passage, and an air flow sensing portion arranged between the inlet port and the outlet port that measures the flow rate by performing heat transfer between the flow rate detection circuit and the measurement target gas,
a through passage is provided to communicate the bypass passage inlet port, between the bypass passage inlet port and the air flow sensing portion, and the bypass passage outlet port, between the bypass passage outlet port and the air flow sensing portion,
the through passage includes a through passage inlet port, which passes through a wall surface forming the bypass passage inlet port and opens in the bypass passage inlet port, and an outlet port, which opens at a rear side of the wall surface forming the bypass passage inlet port,
an inlet port bypass passage trench in one surface of the thermal flow meter and a first cover for forming the bypass passage inlet port by covering the inlet port bypass passage trench are provided, an outlet port bypass passage trench in another surface of the thermal flow meter and a second cover for forming the bypass passage outlet port by covering the outlet port bypass passage are provided, and the through passage opens in the inlet port bypass passage trench provided in the one surface of the thermal flow meter.

* * * * *